(12) United States Patent
Oshikiri et al.

(10) Patent No.: US 10,964,080 B2
(45) Date of Patent: Mar. 30, 2021

(54) APPARATUS FOR DIAGNOSING AND RECORDING DEFECTS IN STRUCTURAL OBJECTS

(71) Applicants: Kohji Oshikiri, Kanagawa (JP); Katsuyuki Kaji, Tokyo (JP)

(72) Inventors: Kohji Oshikiri, Kanagawa (JP); Katsuyuki Kaji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/433,469

(22) Filed: Jun. 6, 2019

(65) Prior Publication Data

US 2019/0378315 A1 Dec. 12, 2019

(30) Foreign Application Priority Data

Jun. 8, 2018 (JP) .............................. JP2018-109974

(51) Int. Cl.
*G06T 11/60* (2006.01)
*G01N 21/88* (2006.01)
*G06T 11/20* (2006.01)

(52) U.S. Cl.
CPC .......... *G06T 11/60* (2013.01); *G01N 21/8803* (2013.01); *G01N 21/8851* (2013.01); *G06T 11/20* (2013.01)

(58) Field of Classification Search
CPC ..... G06T 11/20; G06T 11/60; G01N 21/8803; G01N 21/8851

USPC ......................................................... 345/619
See application file for complete search history.

(56) References Cited

U.S. PATENT DOCUMENTS

| 10,373,387 B1* | 8/2019 | Fields ..................... G06Q 40/08 |
| 2018/0068200 A1* | 3/2018 | Nonaka ................. G06K 9/4638 |
| 2018/0182090 A1* | 6/2018 | Yamagishi ................ G06T 7/97 |

FOREIGN PATENT DOCUMENTS

| JP | 2002-288180 | 10/2002 |
| JP | 2019-061405 | 4/2019 |

* cited by examiner

*Primary Examiner* — Jacinta M Crawford
(74) *Attorney, Agent, or Firm* — Oblon, McClelland, Maier & Neustadt, L.L.P.

(57) ABSTRACT

An apparatus for drawing an image on a development-view image of a structural object includes circuitry configured to display a first development-view image of the structural object captured at a first time, a first diagnosis target element image drawn for at least a part of a diagnosis target in the first development-view image, and a second development-view image of the structural object captured at a second time later than the first time superimposed one to another; receive a drawing of a second diagnosis target element image for at least a part of the diagnosis target in the second development-view image captured at the second time; and store first position information indicating a position of the first diagnosis target element image in the first development-view image and second position information indicating a position of the second diagnosis target element image in the second development-view image in association with each other.

11 Claims, 49 Drawing Sheets

FIG. 4

INSPECTION DATE: 2017.5.10

500T

| DIAGNOSIS REGION NUMBER | SPAN NUMBER (FORMWORK NUMBER) | THIRD POSITION INFORMATION XY3 || PHOTO-GRAPH NUMBER | TYPE OF OBSERVED FINDINGS AND ABNORMALITY | EVALUA-TION RESULT | DETAIL INFORMATION |
|---|---|---|---|---|---|---|---|
| | | POSITIONAL COORDINATES OF DIAGNOSIS REGION WITHIN SPAN | HEIGHT AND WIDTH OF DIAGNOSIS REGION | | | | |
| 1 | S001 | (x1, y1) | (x100, y100) | - | CRACK | S | NEAR COORDINATES (x1, y1), CRACK WIDTH: 0.6 mm, CRACK LENGTH: xxx mm |
| 2 | S001 | (x2, y2) | (x200, y200) | 1 | WATER LEAKAGE | B | NEAR COORDINATES (x2, y2), WIDTH: 100 cm, HEIGHT: 250 cm, WATER LEAKAGE ON WALL |
| 3 | S002 | (x3, y3) | (x300, y300) | 2 | CRACK | C | NEAR COORDINATES (x3, y3), CRACK WIDTH: 3.0 mm, CRACK LENGTH: xxx mm |
| 3 | S002 | (x3, y3) | (x300, y300) | 2 | CALCIFICATION | A | NEAR COORDINATES (x3, y3), CALCIFICATION NEAR CRACK |
| 3 | S002 | (x3, y3) | (x300, y300) | 2 | WATER LEAKAGE | A | NEAR COORDINATES (x3, y3), SOME WATER LEAKAGE NEAR CRACK |
| ⋮ | ⋮ | ⋮ | ⋮ | ⋮ | ⋮ | ⋮ | ⋮ |

FIG. 5

INSPECTION DATE: 2017.5.10

600T — FIRST POSITION INFORMATION XY1

| DIAGNOSIS REGION NUMBER | SPAN NUMBER (FORMWORK NUMBER) | ELEMENT NUMBER | POSITIONAL COORDINATES OF START POINT OF DIAGNOSIS TARGET ELEMENT IMAGE | POSITIONAL COORDINATES OF END POINT OF DIAGNOSIS TARGET ELEMENT IMAGE | WIDTH OF DIAGNOSIS TARGET ELEMENT (mm) |
|---|---|---|---|---|---|
| 1 | S001 | 1 | (x11, y11) | (x12, y12) | 0.3 |
| 1 | S001 | 2 | (x12, y12) | (x13, y13) | 0.5 |
| 2 | S001 | 1 | (x21, y21) | (x22, y22) | — |
| 2 | S001 | 2 | (x22, y22) | (x23, y23) | — |
| 2 | S001 | 3 | (x23, y23) | (x24, y24) | — |
| 2 | S001 | 4 | (x24, y24) | (x25, y25) | — |
| 2 | S001 | 5 | (x25, y25) | (x26, y26) | — |
| 3 | S002 | 1 | (x31, y31) | (x32, y32) | 2.0 |
| 3 | S002 | 2 | (x32, y32) | (x33, y33) | 2.5 |
| 3 | S002 | 3 | (x33, y33) | (x34, y34) | 3.0 |
| 3 | S002 | 4 | (x34, y34) | (x35, y35) | 2.5 |
| ⋮ | ⋮ | ⋮ | ⋮ | ⋮ | ⋮ |

FIG. 7B

| Inspection Form | Tunnel inspection result summary table | | | | | | | | | | | | |
|---|---|---|---|---|---|---|---|---|---|---|---|---|---|
| Name | tunnel name_1 | | | | | | | | | jurisidiction1_1 | | Code management office | |
| location | from | location(from)_1 | | | road name_1 | | | jurisdiction | | | | Tunnel Code | TN001 |
| | to | location(to)_1 | | | distance mark | from | 1km + 1m | jurisidiction2_1 | | | | Prepared date | 20xx/xx/xx |
| | | | | | | to | 1km + 1m | | | | | inspection date | 20xx/xx/xx |
| Constructed year | 2000 | | | | width | total width | 16.00m | left side | | right side | | traffic load | |
| inspection date | 20xx/xx/xx | | | | | effective width | 14.50m | sidewalk width | rode width | lane | road width | lane | sidewalk width | Managed road width | |
| inspection type | inspection type_1 | | | | | | | 1.20m | 3.00m | | 13.10m | 1 | 1.30m | 1.50m | Large vehicle mix |
| inspector | inspector_1 | | | | Used tool | Hammer | | | | | | traffic condition | |
| Record No. | | | | | Remarks | One side alternating traffic regulation | | | | | | | |
| inspection result | ID | diagnosis region No. | Span No. | inspection object | inspection portion | Evaluation | finding/ abnormality | Photo No. | Detail information | | | | |
| | 1 | 1 | S001 | tunnel main unit | lining (right side wall) | S | cracks | — | Near coordinates (x1, y1), crack width: 0.6 mm, crack length: xxx mm | | | | |
| | 2 | 2 | S001 | tunnel main unit | lining (left side wall) | B | water leakage | 001 | Near coordinates (x2, y2), width: 100 cm, height: 250 cm, water leakage on wall | | | | |
| | 3 | 3 | S002 | tunnel main unit | lining (right side wall) | C | cracks | 002 | Near coordinates (x3, y3), crack width: 3.0 mm, crack length: xxx mm | | | | |
| | 4 | 3 | S002 | tunnel main unit | lining (right side wall) | A | calcification | 002 | Near coordinates (x3, y3), calcification Near crack | | | | |
| | 5 | 3 | S002 | tunnel main unit | lining (right side wall) | A | water leakage | 002 | Near coordinates (x3, y3), some water leakage Near crack | | | | |
| | 6 | ... | ... | tunnel main unit | ... | ... | ... | ... | ... | | | | |

FIG. 7D

| inspection form | Inspection findings photo ledger | | | | | | | |
|---|---|---|---|---|---|---|---|---|
| Name | Tunnel name_1 | | | | | | code management office | |
| location | from | location(from)_1 | Road name | Road name_1 | | jurisdiction | jurisdiction1_1 | |
| | to | location(to)_1 | distance mark | from | 1km + 1m | | jurisdiction2_1 | tunnel code | TN001 |
| | | | | to | 1km + 1m | | | prepared date | 20xx/xx/xx |
| Photo No. | 001 | | | | | Photo No. | 003 | |
| Span No. | S001 | | | | | Span No. | | |
| inspection object | tunnel main unit | | | | | inspection object | | |
| inspection portion | lining (left wall) | | | | | inspection portion | | |
| finding/ abnormality | water leakage | | | | | finding/ abnormality | | |
| evaluation | B | | | | | evaluation | | |
| comment | Near coordinates (x, y), width: xxx cm, height: xxx cm, water leakage on wall | | | | | comment | | |
| Photo No. | 002 | | | | | Photo No. | 004 | |
| Span No. | S003 | | | | | Span No. | | |
| inspection object | tunnel main unit | | | | | inspection object | | |
| inspection portion | lining (right wall) | | | | | inspection portion | | |
| finding/ abnormality | cracks, calcification, water leakage | | | | | finding/ abnormality | | |
| evaluation | C | | | | | evaluation | | |
| comment | Near coordinates (x, y), crack width: 0.6 mm, crack length: xxx mm | | | | | comment | | |

DIAGNOSIS INFORMATION INPUT SCREEN SC4

| COMMENT INPUT/LAYER SELECTION | ☒ |
|---|---|

LINK WITH PREVIOUS INFORMATION: [SELECT] : NOT SELECT
INSPECTION OBJECT : [TUNNEL MAIN UNIT ▼]
INSPECTION PORTION : [ ▼ ]

| NUMBER | TYPE OF FINDINGS/ABNORMALITY | EVALUATION | COMMENT |
|---|---|---|---|
| 1 | CRACK ▼ | | |
| 2 | CRACK ▼ | | |
| 3 | CRACK ▼ | | |
| 4 | CRACK ▼ | | |
| 5 | CRACK ▼ | | |

[single]   [CANCEL]  [OK]

INPUT SWITCHING BUTTON "bs"

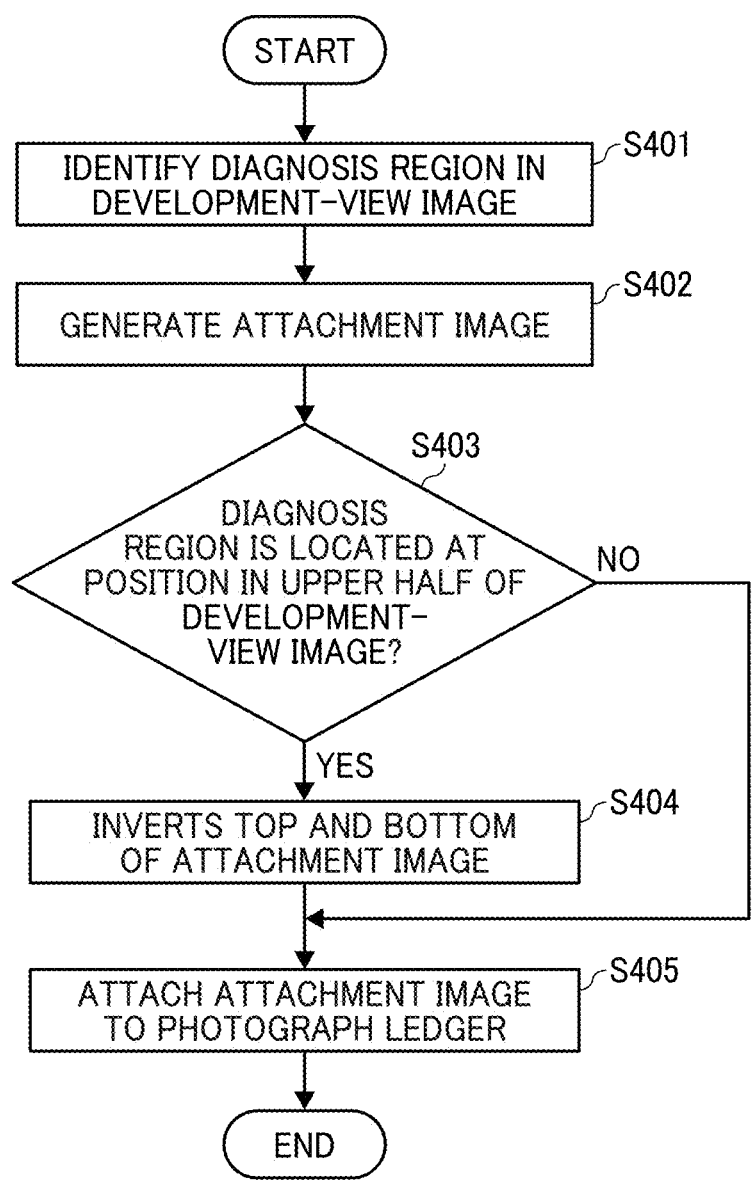

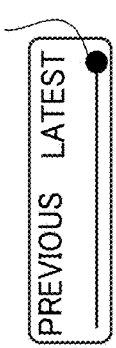
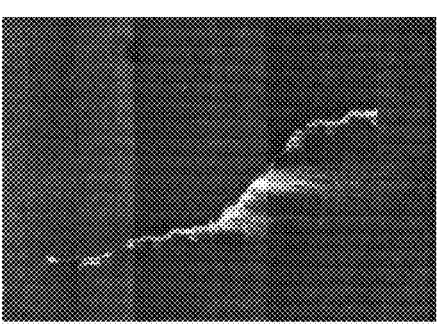
FIG. 40A
TRANSMITTANCE SETTING POINTER "tp"
PREVIOUS IMAGE 0%
LATEST IMAGE 100%
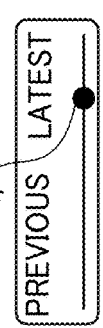
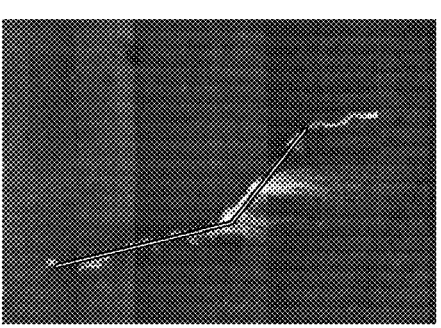
FIG. 40B
PREVIOUS IMAGE 25%
LATEST IMAGE 75%
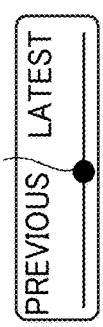
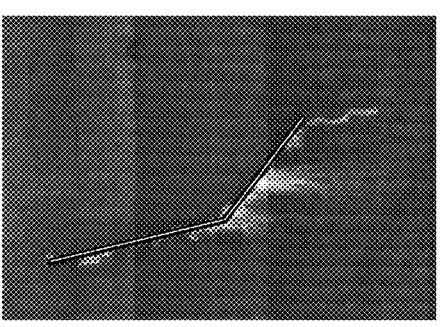
FIG. 40C
PREVIOUS IMAGE 50%
LATEST IMAGE 50%
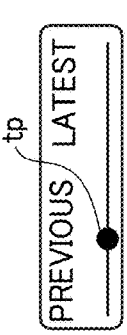
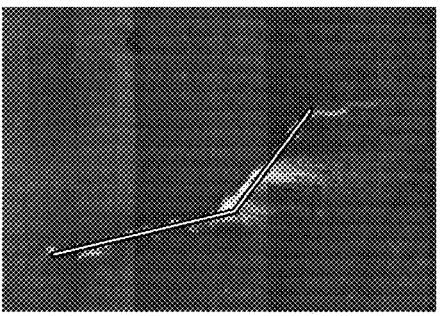
FIG. 40D
PREVIOUS IMAGE 75%
LATEST IMAGE 25%
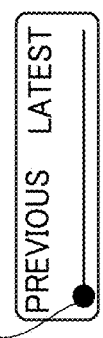
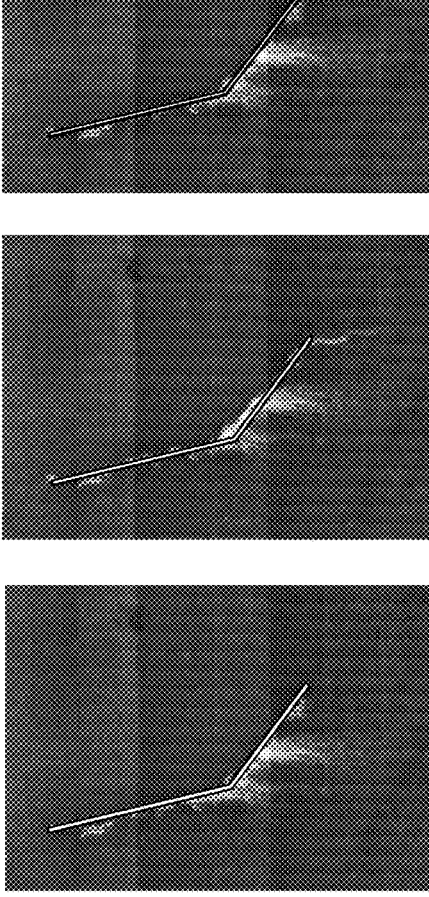
FIG. 40E
PREVIOUS IMAGE 100%
LATEST IMAGE 0%

FIG. 45

INSPECTION DATE: 2018.5.25

| DIAGNOSIS REGION NUMBER | SPAN NUMBER (FORMWORK NUMBER) | ELEMENT NUMBER | POSITIONAL COORDINATES OF START POINT OF DIAGNOSIS TARGET ELEMENT IMAGE | POSITIONAL COORDINATES OF END POINT OF DIAGNOSIS TARGET ELEMENT IMAGE | WIDTH OF DIAGNOSIS TARGET ELEMENT (mm) |
|---|---|---|---|---|---|
| 1 | S001 | 1 | (x11, y11) | (x12, y12) | 0.3 |
| 1 | S001 | 2 | (x12, y12) | (x13, y13) | 0.5 |
| 1 | S001 | 3 | (x13, y13) | (x14, y14) | 0.6 |
| 2 | S001 | 1 | (x21, y21) | (x22, y22) | — |
| 2 | S001 | 2 | (x22, y22) | (x23, y23) | — |
| 2 | S001 | 3 | (x23, y23) | (x24, y24) | — |
| 2 | S001 | 4 | (x24, y24) | (x25, y25) | — |
| 2 | S001 | 5 | (x25, y25) | (x26, y26) | — |
| 3 | S002 | 1 | (x31, y31) | (x32, y32) | 2.0 |
| 3 | S002 | 2 | (x32, y32) | (x33, y33) | 2.5 |
| 3 | S002 | 3 | (x33, y33) | (x34, y34) | 3.0 |
| 3 | S002 | 4 | (x34, y34) | (x35, y35) | 2.5 |
| ... | ... | ... | ... | ... | ... |

FIRST POSITION INFORMATION XY1

SECOND POSITION INFORMATION XY2

APPARATUS FOR DIAGNOSING AND RECORDING DEFECTS IN STRUCTURAL OBJECTS

CROSS-REFERENCE TO RELATED APPLICATION

This application claims priority pursuant to 35 U.S.C. § 119(a) to Japanese Patent Application No. 2018-109974, filed on Jun. 8, 2018 in the Japan Patent Office, the disclosure of which is incorporated by reference herein in its entirety.

BACKGROUND

Technical Field

This disclosure relates to an apparatus, a method of drawing, and a storage medium.

Background Art

Structural objects such as tunnels are covered with lining such as concrete. When concrete properties change over time, cracks or the like can occur. If the aged concrete of a tunnel is not maintained properly, concrete pieces might peel off from a wall of the tunnel, causing damage to vehicles and people on a road. Therefore, under the regulations and instructions of national and local government offices that monitor tunnels, inspection contractors or firms conduct periodic inspections of the tunnels, and reports inspection results of the tunnels to the government offices. The inspection contractors are required to submit inspection reports using a given document format regulated by the national and local governments in some countries.

SUMMARY

As one aspect of the present invention, an apparatus for drawing an image on a development-view image of a structural object is devised. The apparatus includes circuitry configured to display a first development-view image of the structural object captured at a first time, a first diagnosis target element image drawn for at least a part of a diagnosis target in the first development-view image of the structural object, and a second development-view image of the structural object captured at a second time that is later than the first time, the first development-view image and the second development-view image superimposable one to another; receive a drawing of a second diagnosis target element image for at least a part of the diagnosis target in the second development-view image of the structural object captured at the second time; and store first position information indicating a position of the first diagnosis target element image in the first development-view image and second position information indicating a position of the second diagnosis target element image in the second development-view image in a memory in association with each other.

As another aspect of the present invention, a method of assisting of drawing of an image on a development-view image of a structural object is devised. The method includes displaying a first development-view image of the structural object captured at a first time, a first diagnosis target element image drawn for at least a part of a diagnosis target in the first development-view image of the structural object, and a second development-view image of the structural object captured at a second time that is later than the first time, the first development-view image and the second development-view image superimposable one to another; receiving a drawing of a second diagnosis target element image for at least a part of the diagnosis target in the second development-view image of the structural object captured at the second time; and storing first position information indicating a position of the first diagnosis target element image in the first development-view image and second position information indicating a position of the second diagnosis target element image in the second development-view image in a memory in association with each other.

As another aspect of the present invention, a non-transitory computer readable storage medium storing one or more instructions that, when performed by one or more processors, cause the one or more processors to execute a method of assisting of drawing of an image on a development-view image of a structural object is devised. The method includes displaying a first development-view image of the structural object captured at a first time, a first diagnosis target element image drawn for at least a part of a diagnosis target in the first development-view image of the structural object, and a second development-view image of the structural object captured at a second time that is later than the first time, the first development-view image and the second development-view image superimposable one to another; receiving a drawing of a second diagnosis target element image for at least a part of the diagnosis target in the second development-view image of the structural object captured at the second time; and storing first position information indicating a position of the first diagnosis target element image in the first development-view image and second position information indicating a position of the second diagnosis target element image in the second development-view image in a memory in association with each other.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4 is an example of a diagnosis information management table;

FIG. 5 is an example of a diagnosis target element management table;

FIGS. 7A, 7B, 7C, and 7D (FIG. 7) illustrate a scheme of creating submission document according to an embodiment;

FIG. 14 is an example of a screen when inputting a diagnosis target image (e.g., drawing of an area) on a diagnosis position input screen;

FIG. 20 is another example of a diagnosis information input screen;

FIG. 34 is an example of a flowchart illustrating the steps of attaching an attachment image to a photograph ledger;

FIGS. 40A, 40B, 40C, 40 D, and 40E (FIG. 40) indicate relationships between a position of a transmittance setting pointer, a development-view image, a diagnosis target image, and display transmittance;

FIG. 45 is an example of the latest diagnosis target element management table.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Figure 46:
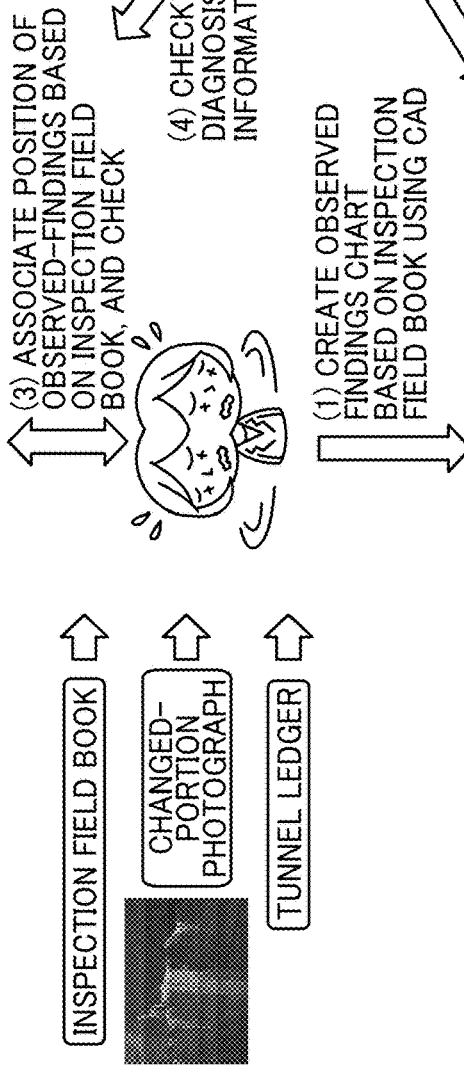
FIG. 46 illustrates a conventional scheme of creating submission document.

Hereinafter, a description is given of conventional procedure of acquiring and handling data performed by an inspection contractor with reference to FIG. 46. FIG. 46 illustrates a scheme of conventional inspection processing performed by the inspection contractor.

When the inspection contractor inspects a tunnel, an inspector takes notes of observed conditions of the tunnel (comment of the tunnel) on a field inspection book, captures images of changed-portions of the tunnel as changed-portion photographs, and then creates a final inspection report, to be submitted to the national and local government offices, describing tunnel properties (e.g., name, location, length, age) using a tunnel ledger obtained from the government offices. The final inspection report includes, for example, an observed inspection findings chart, a photograph-captured position chart, a photograph ledger, and a tunnel inspection result summary table as illustrated in FIG. 46. The observed inspection findings chart includes the photograph-captured position chart.

The inspection findings indicate any kind of findings observed on the tunnel surface, such as potential or imminent abnormalities (e.g., initial defects, aging defects, damages, deformations) that may cause problems, and non-abnormalities portions (e.g., stains) that may not cause problems. The final inspection report can be created using conventional procedure as illustrated in FIG. 46.

(1) The observed inspection findings chart represents drawings of inspection findings (e.g., cracks) observed at portions during the inspection. When the inspection contractor creates the observed inspection findings chart, the inspection contractor refers to various field inspection records, such as the field inspection book, the observed-inspection findings photographs, and the tunnel ledger to draw lines representing the inspection findings (e.g., cracks), and input a width of the lines, such as crack lines using a computer-aided design (CAD) program.

(2) The photograph ledger includes evaluation (assessment) results of the observed-inspection findings, such as cracks, associated with the observed-inspection findings photographs. The inspection contractor manually attaches the photographs including observed-inspection findings on the photograph ledger, and inputs diagnosis information including the evaluation results by referring to detail information of the inspection findings (comment) recorded on the field inspection book during the inspection. Further, to clarify which portion of the tunnel corresponds to the observed-inspection findings photograph attached to the photograph ledger, the observed inspection findings chart is added with an identification number of the observed-inspection findings photograph attached to the photograph ledger.

(3) The tunnel inspection result summary table includes various information of the tunnel, such as tunnel properties (e.g., tunnel length) and the diagnosis information including the evaluation results. Specifically, the inspection contractor inputs the tunnel properties (e.g., tunnel length) in the tunnel inspection result summary table based on the tunnel ledger, and the diagnosis information including the evaluation results of the observed inspection findings based on the field inspection book.

(4) In order to associate the inspection findings-observed portions related to the evaluation results and the observed-inspection findings photograph attached to the photograph ledger, the inspection contractor inputs an identification number associated with the observed-inspection findings photograph attached to the photograph ledger on the tunnel inspection result summary table.

However, the observed-inspection findings may include some parts that need to be repaired immediately, such as cracks, while other parts that may be monitored alone without repairing. Typically, the number of other parts that may be monitored along the time line alone without repairing may gradually increase. Therefore, when the inspection contractor tries to draw a crack line or the like using computer aided design (CAD) of a personal computer or the like, the inspection contractor is required to draw a large number of findings, which takes a longer time to perform the drawing operation.

Hereinafter, a description is given of a diagnosis system 1 according to an embodiment with reference to the drawings. In this description, the "diagnosis" and "diagnostic" may be interchangeably used.

Figure 1:
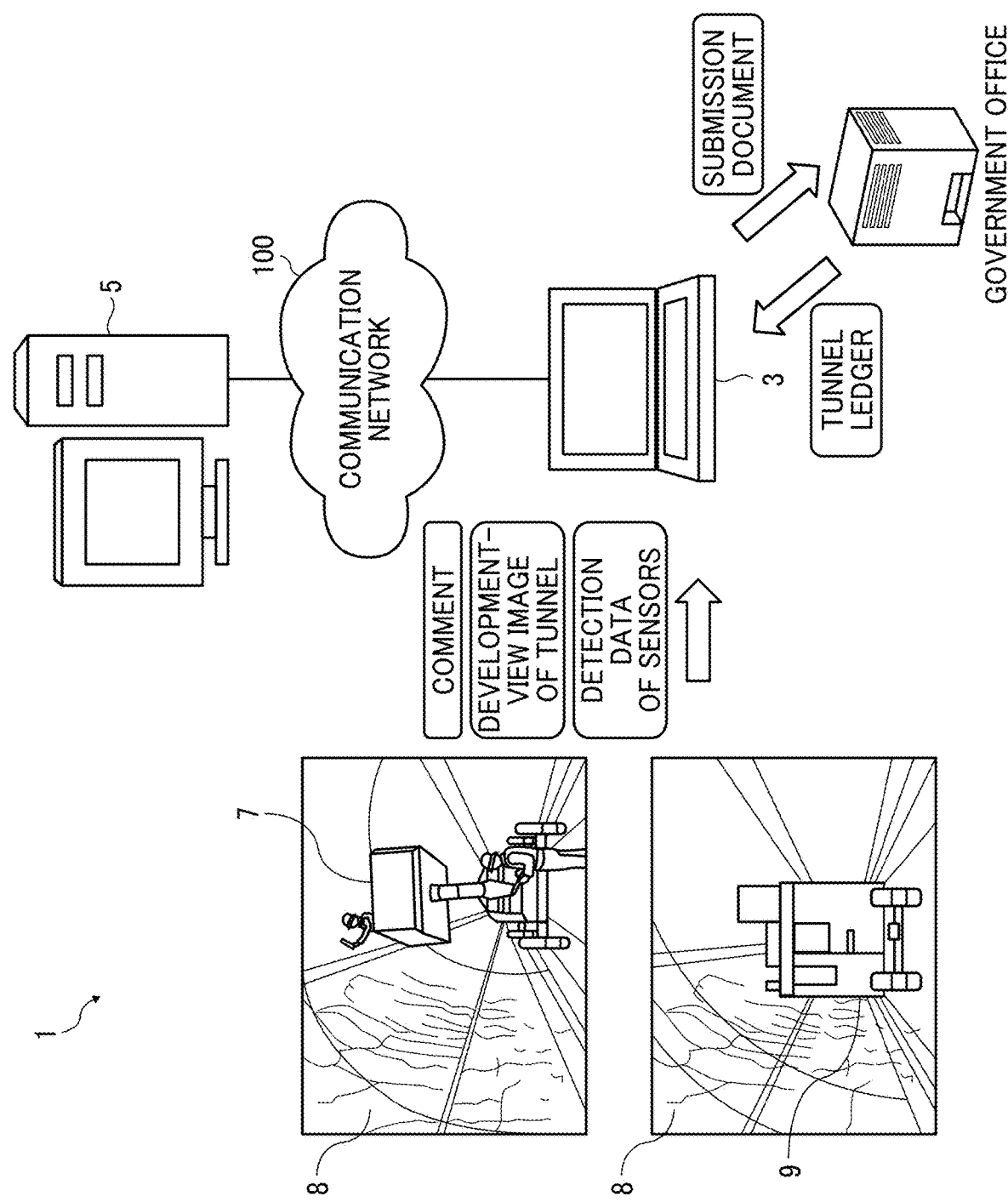
FIG. 1 is a schematic configuration of a diagnosis system according to an embodiment.

System Configuration:

Hereinafter, a description is given of an example of a system configuration of the diagnosis system 1 with reference to FIG. 1. FIG. 1 is a schematic diagram of the diagnosis system 1 of the embodiment. In this description, the diagnosis includes any act or process of identifying the cause or nature of a condition, situation, or potential problem (such as abnormality) of an object such as structural object (e.g., tunnel). The examples of act or process of diagnosis include investigation, analysis, assessment (evaluation), etc. For example, assessment is any act or process of determining the condition, situation, or problem of the object, which is a target for diagnosis. In this description, the diagnosis system 1 can be also referred to as the assessment system. Further, in this description, for the simplicity of expression, the terms of "diagnosis" and "assessment" are interchangeably used.

As illustrated in FIG. 1, the diagnosis system 1 includes, for example, an apparatus 3, and a diagnosis management server 5 connected with each other via a communication network 100 wirelessly and/or by wire. In this description, the apparatus 3 and the diagnosis management server 5 are examples of information processing apparatuses or terminals used for processing data and information related to the structural object (e.g., tunnel). In this description, the apparatus 3 can be used to draw or render images, and thereby the apparatus 3 can be referred to as a drawing apparatus, rendering apparatus, drawing assistance apparatus, or rendering assistance apparatus. Hereinafter, the apparatus 3 may be referred to as the drawing apparatus 3.

The drawing apparatus 3 and the diagnosis management server 5 included in the diagnosis system 1 can communicate with each other via the communication network 100. The communication network 100 can be configured using a network, such as the Internet, a mobile communication network, a local area network (LAN), or the like. The communication network 100 can employ not only a wired communication network but also a wireless communication network, such as 3rd generation (3G), worldwide interoperability for microwave access (WiMAX: registered trademark), and long term evolution (LTE), or the like. Further, the drawing apparatus 3 can be configured to communicate information using short-range communication technology, such as near field communication (NFC: registered trademark).

The drawing apparatus 3 can be used as a computer for receiving an input of various data, such as diagnosis target image, diagnosis region, and diagnosis information, to be described later. The drawing apparatus 3 may be installed with one or more application programs dedicated to image drawing or rendering. A user (e.g., operator) uses the drawing apparatus 3 to input various data related to the structural object (e.g., tunnel), such as a development-view image, generated by capturing the images of tunnel 8 from an entrance to an exit of the tunnel 8 and processing the captured images, and the detail information of the inspection findings (comment) recorded on the field inspection book by the inspector or assistant for the tunnel 8, and the detection data obtained by each sensor for the tunnel 8. In this description, the tunnel 8 is described as an example of the structural object, but the structural object is not limited thereto. In another example configuration, the data related to the structural object can be transmitted or input to another apparatus or device, such as the diagnosis management server 5, and then transferred from another apparatus or device to the drawing apparatus 3.

As illustrated in FIG. 1, the inspector riding on the inspection vehicle 7 inspects the tunnel 8 by marking inspection findings (e.g., cracks) with a special chalk on a surface of the tunnel 8, and records a width of each crack in a field inspection book. While inspecting the tunnel 8, the inspector records detail information of the inspection findings indicating the status or condition of the inspection findings and evaluation results of the inspection findings (comment) in the field inspection book. Further, an assistant standing near the inspection vehicle 7 can write the detail information of the inspection findings (comment) spoken by the inspector in the field inspection book, and take pictures of the tunnel 8 in some cases. The inspection findings means any kind of findings observed on the tunnel surface, such as potential or imminent abnormalities (e.g., initial defects, aging defects, damages, deformations) that may cause problems, and non-abnormalities portions (e.g., stains) that may not cause problems.

Then, an image capture vehicle 9 equipped with a camera unit (image capture device) travels from the entrance to the exit of the tunnel 8 while capturing images of the inner surface of the tunnel 8 from the entrance to the exit of the tunnel 8 to acquire images of the inner surface of the tunnel 8, which is to be described later with reference to FIG. 12. Hereinafter, images of the captured inner surface of the tunnel 8 are collectively referred to as a development-view image 201 of the tunnel (see FIG. 12), which corresponds to a panoramic image combining a plurality of images of a plurality of spans (formworks) of the tunnel 8. The development-view image 201 is generated by performing image processing on the plurality of mages of the inner surface of the tunnel 8 captured by the camera unit. Since the development-view image 201 includes portions marked with the special chalk by the inspector, the user of the drawing apparatus 3 can easily confirm positions and shapes of the inspection findings by checking the development-view image 201 after the inspection at the field. The development-view image 201 can be also be referred to as the image data of structural object (e.g., tunnel), which is an example of image data of the structural object generated using given image processing.

Hardware Configuration of Diagnosis System:

Hereinafter, a description is given of a hardware configuration of the drawing apparatus 3 and the diagnosis management server 5 configuring the diagnosis system 1 with reference to FIG. 2.

Figure 2:
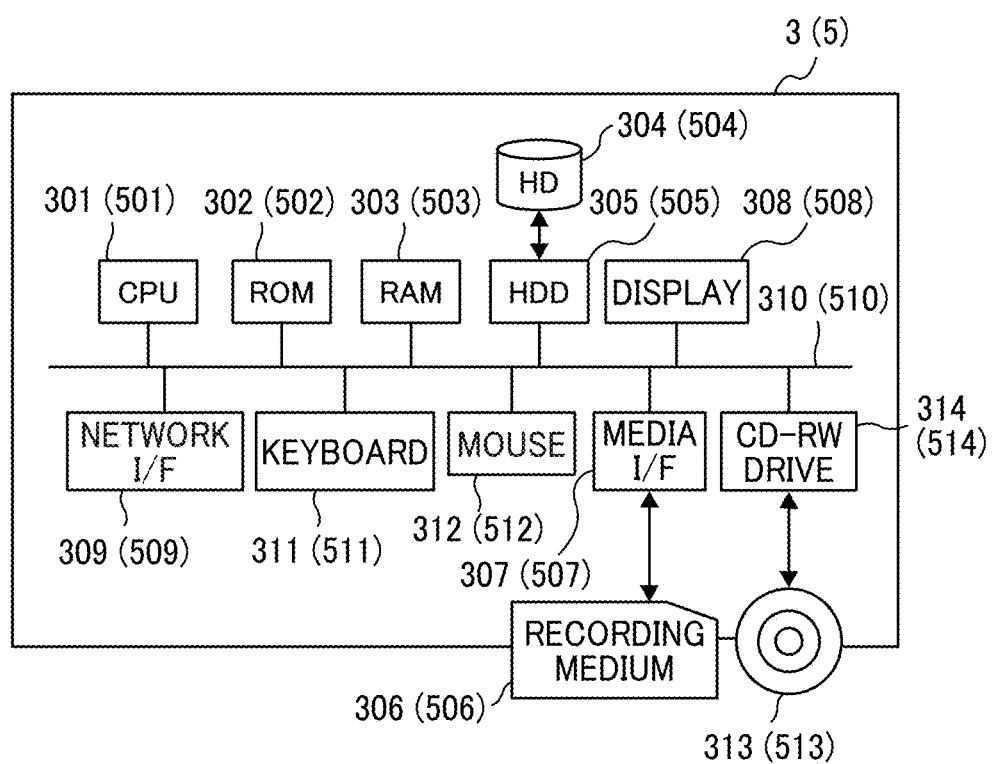
FIG. 2 is a hardware block diagram of an apparatus for drawing image and a diagnosis management server.

Hardware Configuration of Drawing Apparatus:

FIG. 2 is an example of a hardware block diagram of the drawing apparatus 3 and also an example of a hardware block diagram of the diagnosis management server 5 indicated by reference symbols in parentheses. The symbols in parentheses indicate the configuration of the diagnosis management server 5.

As illustrated in FIG. 2, the drawing apparatus 3 includes, for example, a central processing unit (CPU) 301, a read only memory (ROM) 302, a random access memory (RAM) 303, a hard disk (HD) 304, a hard disk drive (HDD) 305, a media interface (I/F) 307, a display 308, a network I/F 309, a keyboard 311, a mouse 312, a compact disc-rewritable (CD-RW) drive 314, and a bus line 310.

The CPU 301 controls the operation of the drawing apparatus 3 entirely. The ROM 302 stores programs to be executed by the CPU 301. The RAM 303 is used as a working memory of the CPU 301. The HD 304 stores various data such as programs. The HDD 305 controls reading and writing of various data to the HD 304 under the control of the CPU 301. The media I/F 307 controls reading and writing (storing) of data from and to a recording medium 306, such as a flash memory. The display 308 displays various information such as a cursor, menus, windows, text, and/or images. The network I/F 309 is an interface circuit for performing data communication using the communication network 100. The keyboard 311 is an example of an input devices, having a plurality of keys used for inputting characters, numerals, various instructions or the like. The mouse 312 is one type of input devices for selecting and executing various instructions, selecting a process target, moving a cursor, and the like. The CD-RW drive 314 controls reading and writing of various data from and to the CD-RW 313, which is an example of a removable recording medium.

Further, as illustrated in FIG. 2, the diagnosis management server 5 includes, for example, a CPU 501, a ROM 502, a RAM 503, an HD 504, an HDD 505, a media I/F 507, a display 508, a network I/F 509, a keyboard 511, a mouse 512, a CD-RW drive 514, and a bus line 510. The configuration of these components of the diagnosis management server 5 are similar to those of the above described configuration of the CPU 301, the ROM 302, the RAM 303, the HD 304, the HDD 305, the media IN 307, the display 308, the network I/F 309, the keyboard 311, the mouse 312, the CD-RW drive 314, and the bus line 310, and thereby descriptions of these are omitted.

Further, a CD-recordable (CD-R) drive can be used instead of the CD-RW drive 314 (514). As to the embodiment, the drawing apparatus 3 and the diagnosis management server 5 can be configured as a single computer or can be configured using a plurality of computers by dividing each part (functional unit or storage unit) into the plurality of computers.

Figure 3:
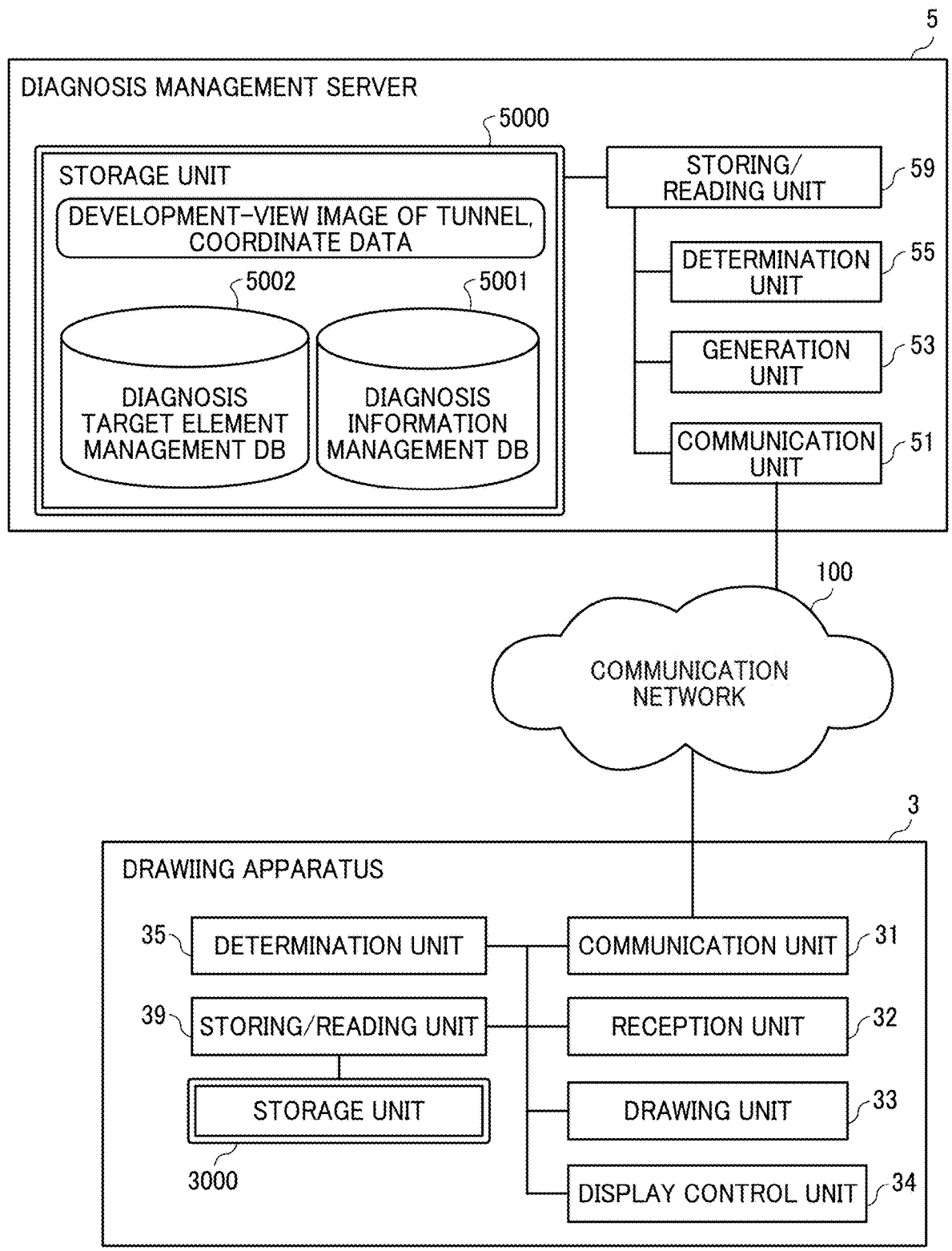
FIG. 3 is a functional block diagram of the diagnosis system of FIG. 1.

Functional Configuration of Diagnosis System:

Hereinafter, a description is given of a functional configuration of the diagnosis system 1 with reference to FIGS. 3 to 5. FIG. 3 is an example of a functional block diagram of the diagnosis system 1.

Functional Configuration of Drawing Apparatus:

As illustrated in FIG. 3, the drawing apparatus 3 includes, for example, a communication unit 31, a reception unit 32, a drawing unit 33, a display control unit 34, a determination unit 35, and a storing/reading unit 39. Each of these units indicates a function or functional unit implemented by operating any of the hardware components illustrated in FIG. 2 under instructions of the CPU 301 executing programs loaded on the RAM 303 from the HD 304. Further, the drawing apparatus 3 includes a storage unit 3000 implemented by the RAM 303 and the HD 304 (FIG. 2).

Functional Configuration of Drawing Apparatus:

Hereinafter, a description is given of each functional unit of the drawing apparatus 3.

The communication unit 31, implemented by the network I/F 309 and an instruction from the CPU 301 (FIG. 2), transmits and receives various data or information to and from other terminal(s), device(s), or system(s) via the communication network 100.

The reception unit 32 is typically implemented by the keyboard 311 and/or the mouse 312 and an instruction from the CPU 301 (FIG. 2). When the reception unit 32 receives signals from the keyboard 311 and/or the mouse 312 operated by a user, the reception unit 32 receives various operations instructed by the user.

The drawing unit 33, implemented by an instruction from the CPU 301 (FIG. 2), draws a pattern, such as line or area (e.g., rectangular shape), on an image being displayed on the display 308.

The display control unit 34, implemented by an instruction from the CPU 301 (FIG. 2), causes the display 308 to display various images and screens.

The determination unit 35, implemented by an instruction from the CPU 301 (FIG. 2), performs various determinations to be described later.

The storing/reading unit 39, implemented by an instruction from the CPU 301 and the HDD 305, the media I/F 307, and the CD-RW drive 314 (FIG. 2), stores various data in the storage unit 3000, the recording medium 306, and/or the CD-RW 313, and reads various data from the storage unit 3000, the recording medium 306, and/or the CD-RW 313.

Functional Configuration of Diagnosis Management Server:

As illustrated in FIG. 3, the diagnosis management server 5 includes, for example, a communication unit 51, a generation unit 53, a determination unit 55, and a storing/reading unit 59. Each of these units indicates a function or functional unit implemented by operating any of the hardware components illustrated in FIG. 2 under an instruction from the CPU 501 executing programs loaded to the RAM 503 from the HD 504. The diagnosis management server 5 further includes a storage unit 5000, implemented by the HD 504 (FIG. 2). The diagnosis management server 5 can be also referred to as the diagnosis control server 5. In this description, the management and the control are interchangeably used.

Diagnosis Information Management Table:

FIG. 4 is an example of a diagnosis information management table 500T. The storage unit 5000 stores a diagnosis information management database (DB) 5001 (FIG. 3) including the diagnosis information management table 500T of FIG. 4. As illustrated in FIG. 4, the diagnosis information management table 500T stores various items, such as diagnosis region number, span number (formwork number), positional coordinates of a diagnosis region within a span, height and width of a diagnosis region, photograph number, type of observed inspection findings and abnormality (potential abnormalities), evaluation result, and detail information of inspection findings (comment), which are associated with each other for each inspection date information. In this description, the diagnosis information may be also referred to as the assessment-related information or assessment information. In this description, the management table may be also referred to as the control table.

As to the information stored in the diagnosis information management table 500T, the inspection date indicated by the inspection date information is a specific day on which the tunnel 8 was inspected using the inspection vehicle 7 and the image capture vehicle 9 as illustrated in FIG. 1. The diagnosis region number is identification information identifying a group including a diagnosis region to be described later.

The span number (formwork number) is a number assigned to each span of the tunnel 8. The span indicates a region, segmented into a 10-m segment from the tunnel inlet, and FIG. 12 is an example of the development-view image 201 consisted with images of a plurality of spans. The span number is specified in the tunnel ledger managed by the government office or agency.

The positional coordinates of the diagnosis region within the specific span indicate specific positional coordinates (e.g., start point) of the diagnosis region within the specific span when a given position within the specific span is set as the origin point.

The height and width of the diagnosis region indicate the height and the width of a specific diagnosis region with respect to the origin point of the specific span related to the specific diagnosis region, in which the height and width of the diagnosis region indicate values identifying the entire specific diagnosis region.

The photograph number is identification information identifying a photograph attached to the photograph ledger.

The type of observed inspection findings and abnormality indicate a type of inspection findings and abnormality at the diagnosis target, such as inspection target object (or portion), inspected by the inspector.

The evaluation result indicates an evaluation of the diagnosis target inspected by the inspector. Typically, the conditions of the diagnosis target are ranked using the evaluation levels of "S, A, B, and C," in which "S" is the worst condition, and the condition becomes less severe in the order of "S, A, B, and C," and the evaluation result may be also referred to as the assessment result in this description.

The detail information of inspection findings (comment) is contents of information of inspection findings recorded by the inspector and/or the assistant (FIG. 1).

The positional coordinates of the diagnosis region and the height and width of the diagnosis region within the span are an example of third position information XY3 (see FIG. 4) in this description.

Diagnosis Target Element Management Table:

FIG. 5 illustrates an example of a diagnosis target element management table 600T. The storage unit 5000 stores a diagnosis target element management database (DB) 5002 (FIG. 3) including the diagnosis target element management table 600T of FIG. 5. As illustrated in FIG. 5, the diagnosis target element management table 600T stores various items, such as diagnosis region number, span number (formwork number), element number, positional coordinates of a start point of a diagnosis target element image, positional coordinates of an end point of a diagnosis target element image, and width of a diagnosis target element image (millimeter: mm) in association with each other for each inspection date information.

As to the information stored in the diagnosis target element management table 600T, the inspection date indicated by the inspection date information is the same date indicated as the inspection date in FIG. 4. The diagnosis region number and the span number (formwork number) in the diagnosis target element management table 600T are the same as those in the diagnosis information management table 500T (FIG. 4). The diagnosis information management table 500T (FIG. 4) and the diagnosis target element management table 600T (FIG. 5) are associated with each other using the diagnosis region number and the span number (formwork number).

The element number is identification information identifying a diagnosis target element image, which is an element consisting the diagnosis target image. In this description, the diagnosis target element image corresponds to the diagnosis target element and the diagnosis target image corresponds to the diagnosis target.

The positional coordinates of the start point of the diagnosis target element image indicate the coordinates of the start point when the diagnosis target element image is drawn in a specific span in the development-view image 201. For example, in an example case of FIG. 23, coordinates of a start point "p21" indicate the start point of a first diagnosis target element image "e21."

The positional coordinates of the end point of the diagnosis target element image indicate the coordinates of the end point when the diagnosis target element image is drawn in the specific span in the development-view image 201. For example, in an example case of FIG. 23, coordinates of an end point "p22" indicate the end point of the first diagnosis target element image "e21."

The width of the diagnosis target element (mm) indicates a width of a portion, such as cracks when the diagnosis target element is cracks. For example, in an example case of FIG. 23, a value is input to a width input field "ws1" by a user. If the user inputs a numerical value in the width input field "ws1," the reception unit 32 receives the input numerical value, and then the display control unit 34 displays the input numerical value (e.g., 0.5) as illustrated in FIG. 24.

The start position coordinates of the diagnosis target element image and the end position coordinates of the diagnosis target element image specified for the element numbers "1" and "2" included in the diagnosis region number "1" are an example of first position information XY1 (FIG. 5) in this description.

Functional Configuration of Diagnosis Management Server:

Hereinafter, a description is given of a functional configuration of the diagnosis management server 5 with reference to FIG. 3.

In the following description, each functional unit of the diagnosis management server 5 is described in relation with any of the components illustrated in FIG. 2 used for implementing each functional unit of the diagnosis management server 5.

The communication unit 51 of the diagnosis management server 5 (FIG. 3), implemented by an instruction of the CPU 501 (FIG. 2) and the network I/F 509 (FIG. 2), transmits and receives various data or information to and from other device or terminal, such as the drawing apparatus 3, via the communication network 100.

The generation unit 53, implemented by an instruction from the CPU 501 (FIG. 2), generates data of submission document (e.g., observed inspection findings chart, photograph ledger, tunnel inspection result summary table) to be submitted to the government office based on various data stored in the diagnosis information management DB 5001 and the diagnosis target element management DB 5002.

The determination unit 55, implemented by an instruction from the CPU 501 (FIG. 2), performs a determination process when the generation unit 53 is to generate data of the submission document.

The storing/reading unit 59, implemented by an instruction from the CPU 501 and the HDD 505 (FIG. 2), stores various data in the storage unit 5000, and reads out various data stored in the storage unit 5000.

Figure 6:
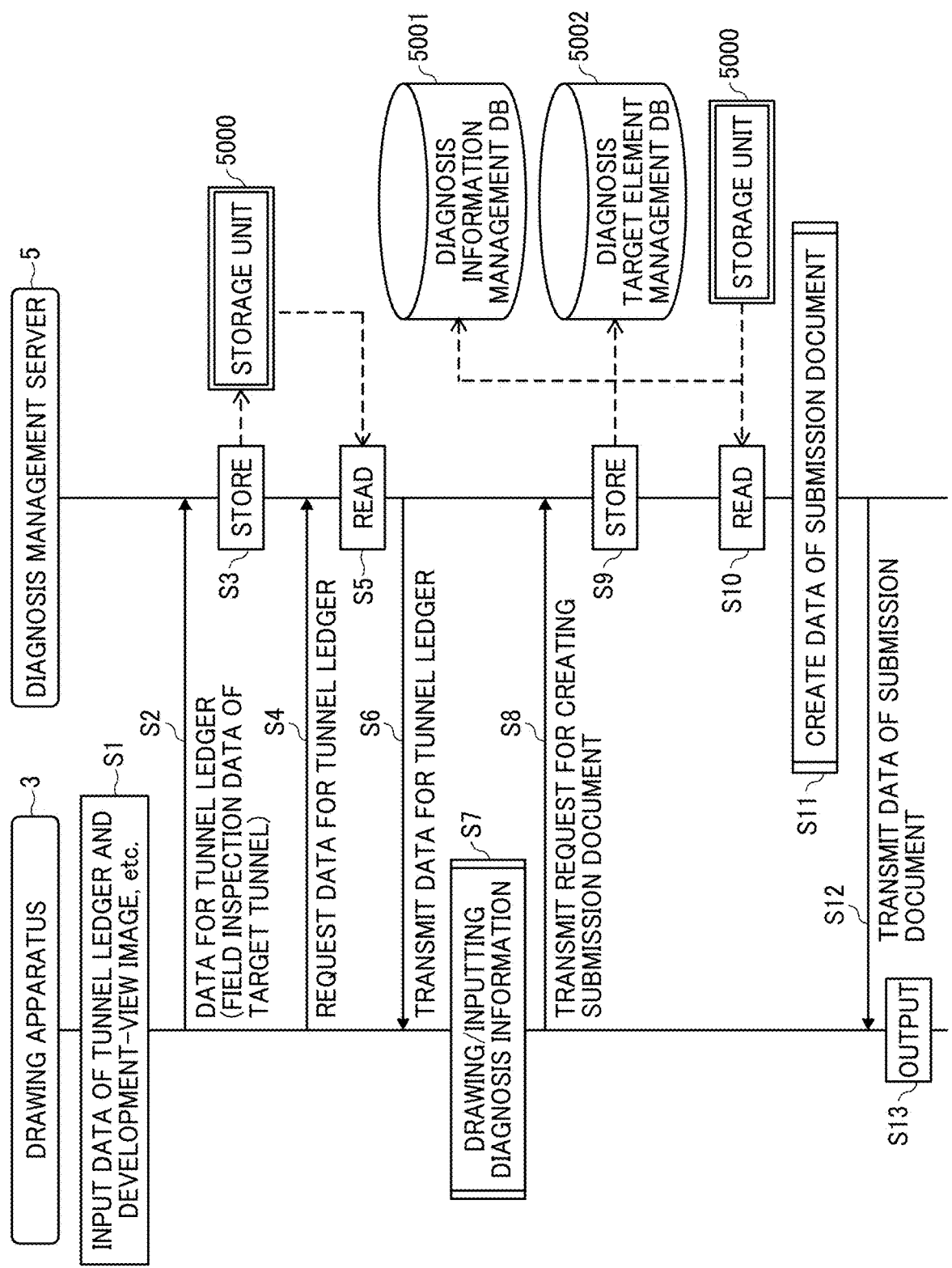
FIG. 6 is a sequence diagram illustrating a process of creating submission document data.

Processing and Operation:

Hereinafter, a description is given of the processing or operation according to the embodiment with reference to FIGS. 6 to 33. FIG. 6 is an example of a sequence diagram illustrating a process of generating data of submission document. FIGS. 7A, 7B, 7C, and 7D (FIG. 7) illustrate a scheme of creating the submission document according to the embodiment.

At first, as illustrated in FIGS. 6 and 7, the drawing apparatus 3 is input with data of the tunnel ledger acquired from the government office, the development-view image, and the comment (hereinafter, referred to as the "data for the tunnel ledger") in accordance with a user operation (step S1). Hereinafter, the data input by the user using the drawing apparatus 3 may be referred to as "field inspection data of the target tunnel."

Then, the communication unit 31 of the drawing apparatus 3 uploads the data for the tunnel ledger (field inspection data of the target tunnel), input in step S1, to the diagnosis management server 5 (step S2). Then, the communication unit 51 of the diagnosis management server 5 receives the data for the tunnel ledger.

In the diagnosis management server 5, the storing/reading unit 59 stores the data for the tunnel ledger, received in step S2, in the storage unit 5000 (step S3).

Then, if the user inputs the diagnosis target image, the communication unit 31 of the drawing apparatus 3 requests the diagnosis management server 5 to transmit the data for the tunnel ledger in accordance with a user operation (step 4). Then, the communication unit 51 of the diagnosis management server 5 receives the request for the data for the tunnel ledger.

Then, in the diagnosis management server 5, the storage/reading unit 59 reads out the data for the tunnel ledger, stored in the storage unit 5000 in step S3 (step S5).

Then, the communication unit 51 transmits the data for the tunnel ledger, read out in step S5, to the drawing apparatus 3 (step S6). Then, the communication unit 31 of the drawing apparatus 3 downloads the data for the tunnel ledger.

Then, as illustrated in FIG. 6, in accordance with the user operation, the drawing apparatus 3 performs a process of drawing a diagnosis target image on a part of the development-view image 201 (hereinafter, partial development-view image 202) and a process of inputting diagnosis information (step S7). The processing in step S7 will be described later in detail.

Then, the communication unit 31 transmits a request for creating or generating a submission document to be submitted to the government office or the like to the diagnosis management server 5, together with the data of the drawn diagnosis target element image, and the data of the input diagnosis information (step S8). Then, the communication unit 51 of the diagnosis management server 5 receives the request for creating the submission document with the data of the diagnosis target element image and the data of the diagnosis information.

Then, in the diagnosis management server 5, the storing/reading unit 59 stores the data of the diagnosis information and the data of the diagnosis target element image, respectively, in the diagnosis information management DB 5001 and the diagnosis target element management DB 5002 (step S9).

Further, in order to create the submission document, the storing/reading unit 59 reads out the data of diagnosis information and the data of the diagnosis target element image, respectively from the diagnosis information management DB 5001 and the diagnosis target element management DB 5002, and also reads out the data for the tunnel ledger or the like from the storage unit 5000 (step S10).

Figure 7A:
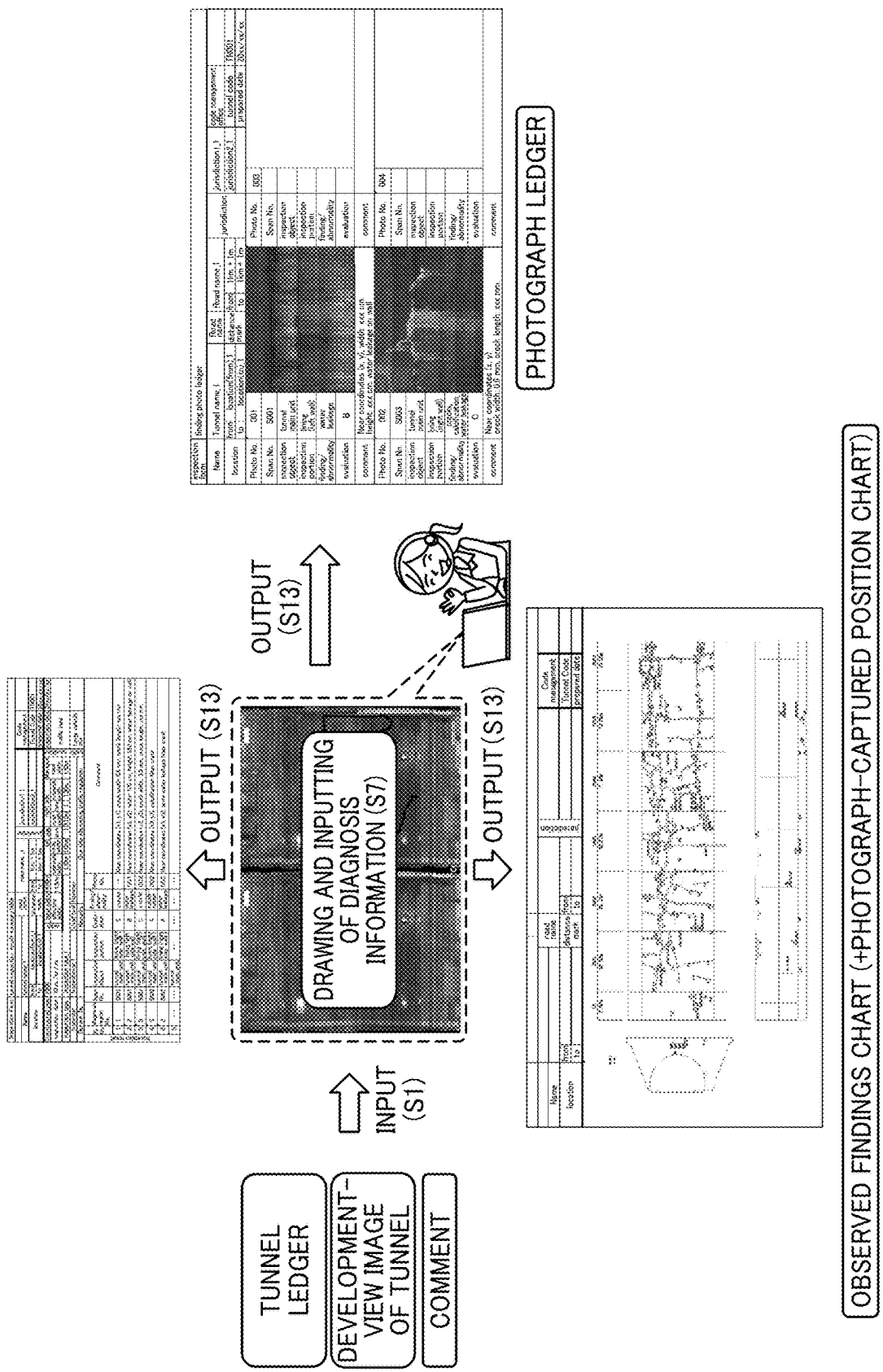

Then, the generation unit 53 of the diagnosis management server 5 creates or generates data of the submission document (e.g., observed inspection findings chart, photograph ledger, tunnel inspection result summary table), illustrated in FIG. 7A, using the data of diagnosis information, the data of the diagnosis target element image, and the data for the tunnel ledger, or the like (step S11).

Then, the communication unit 51 transmits the data of the submission document to the drawing apparatus 3 (step S12). Then, the communication unit 31 of the drawing apparatus 3 receives the data of the submission document.

Figure 7C:
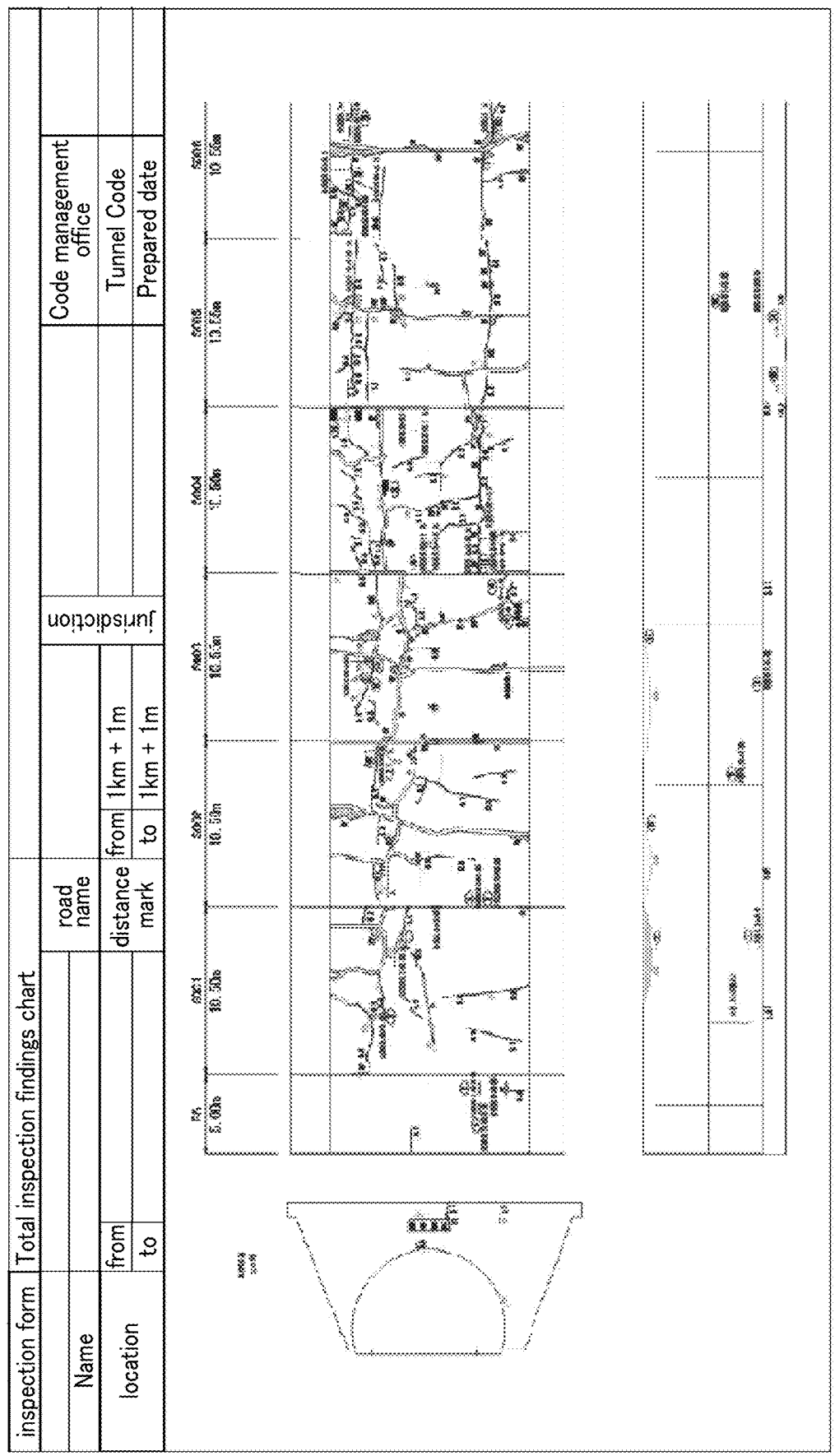

Then, as illustrated in FIG. 7A, the drawing apparatus 3 prints out the data of the submission document to be submitted to the government office or the like (step S13). As illustrated in FIGS. 7B, 7C, and 7D, the submission document includes, for example, the tunnel inspection result summary table (FIG. 7B), the observed inspection findings chart (FIG. 7C), and the photograph ledger (FIG. 7D). By performing the above described processing, the inspection contractor can submit the data of the submission document to the government office using printed sheets. Alternatively, if the government regulation, such as the national government regulation, allows the submission of the data of the submission document to the government office using electronic data alone, the inspection contractor can submit the electronic data of the submission document to the government office without printing the data of the submission document.

Figure 8:
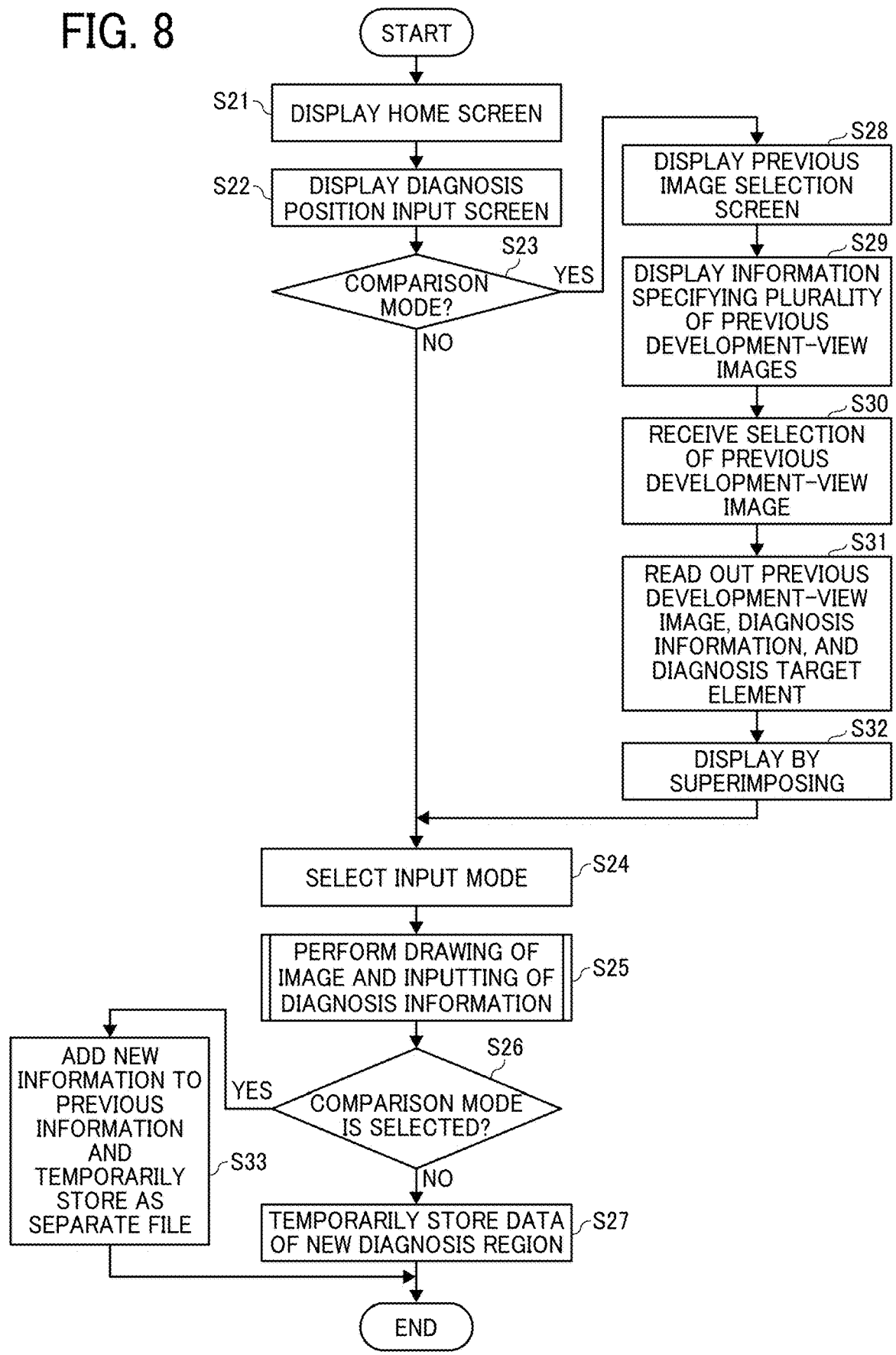
FIG. 8 is an example of a flowchart illustrating the steps of drawing an image and inputting diagnosis information.

Drawing and Inputting of Diagnosis Information:

Hereinafter, a description is given of the detail of step S7 with reference to FIGS. 8, 12 and 13. FIG. 8 is an example of a flowchart illustrating the steps of drawing an image and inputting diagnosis information. FIG. 12 is an example of a home screen SC1. FIG. 13 is an example of a diagnosis position input screen SC2 when a first input mode of a diagnosis target image (i.e., drawing of area) is selected.

As indicated in FIG. 8, at first, in response to a user operation to the drawing apparatus 3, the display control unit 34 displays the home screen SC1 (FIG. 12) on the display 308 (step S21).

Figure 12:
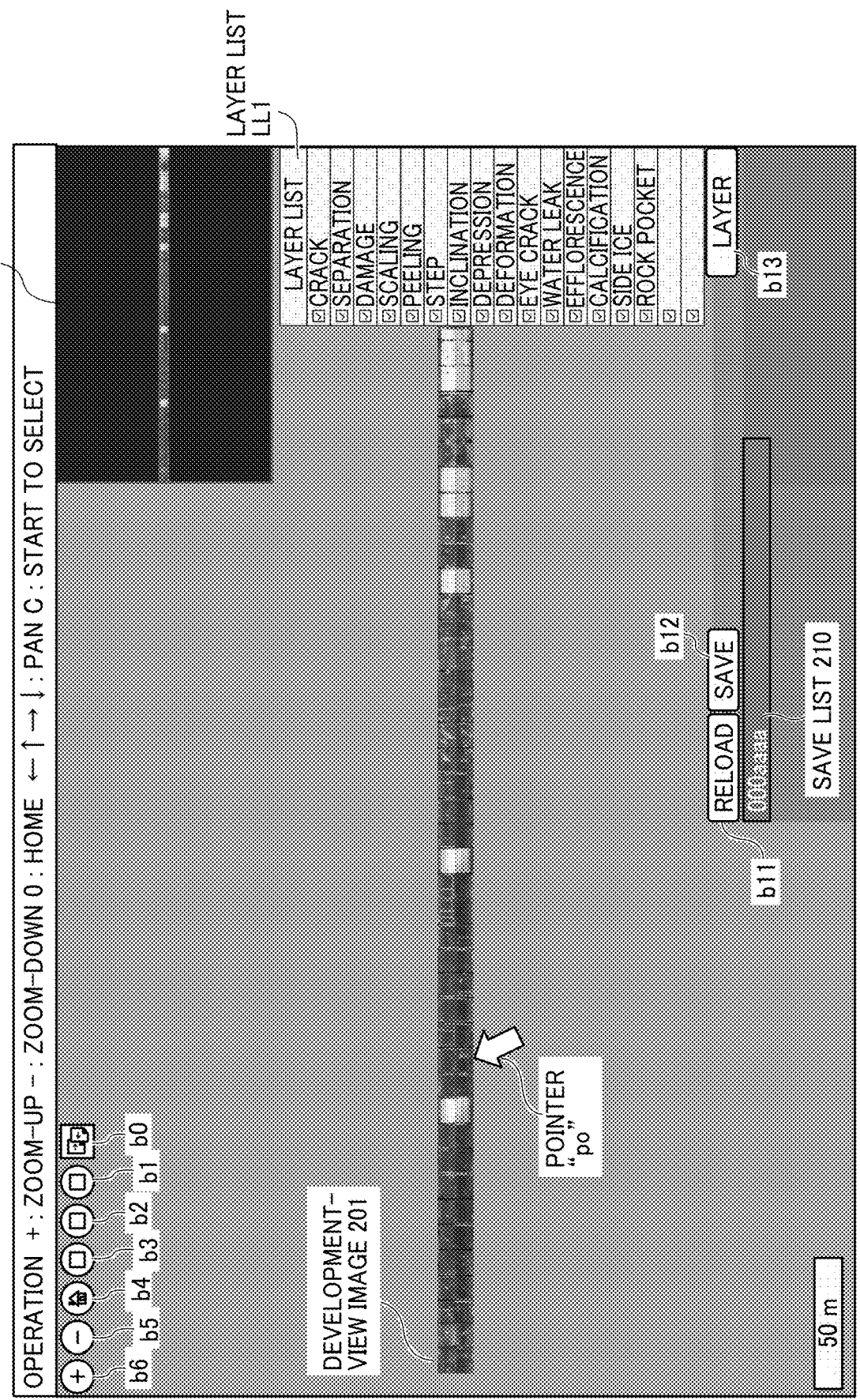
FIG. 12 is an example of a home screen.
Figure 13:
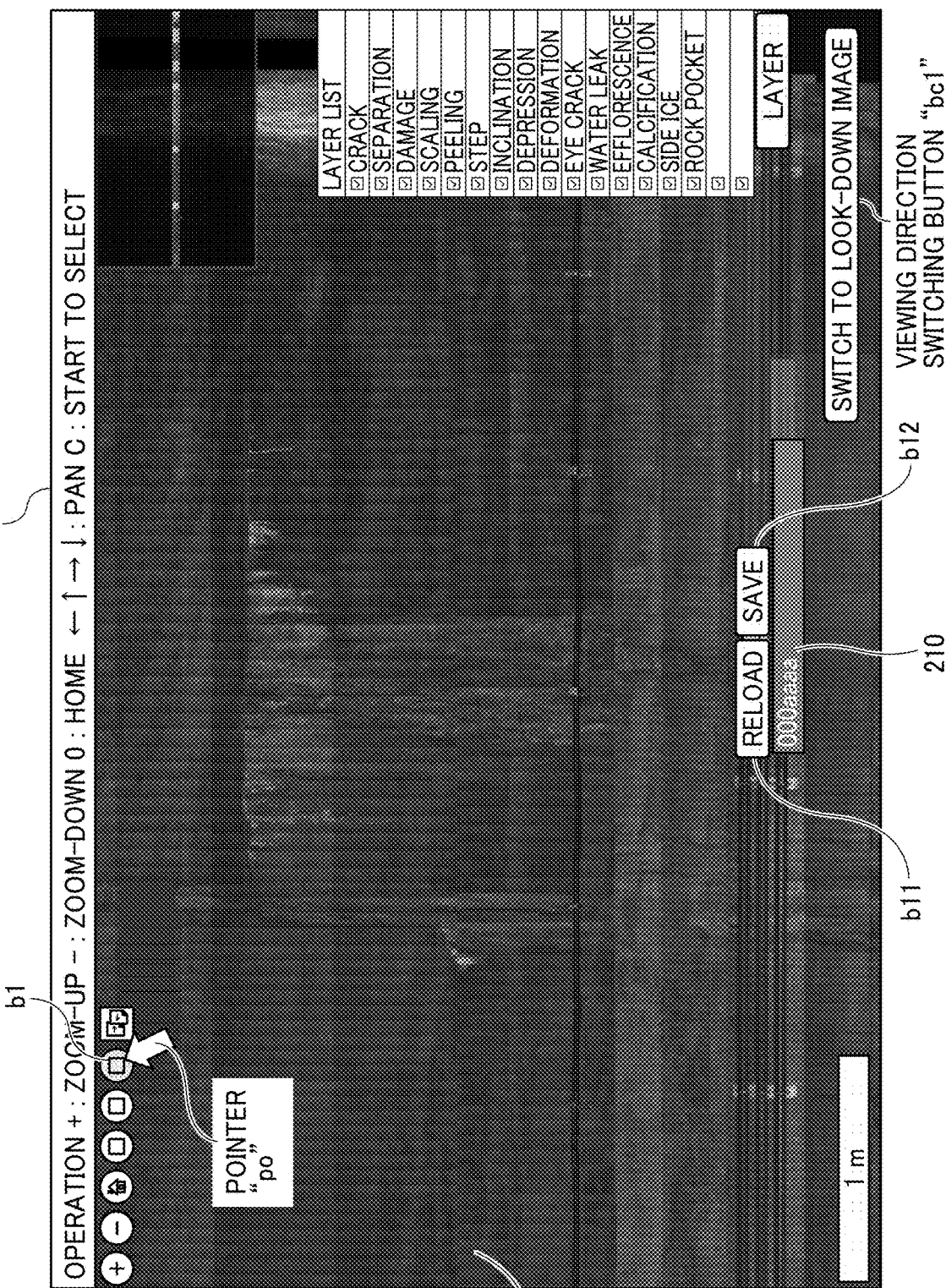
FIG. 13 is an example of a diagnosis position input screen when a first input mode of a diagnosis target image (e.g., drawing of an area) is selected.

As illustrated in FIG. 12, the home screen SC1 displays the development-view image 201 on the center of the home screen SC1. Further, as illustrated in FIG. 12, the home screen SC1 displays a total image screen SC10 showing an entire image of the development-view image 201 on the right upper corner of the home screen SC1.

Further, as illustrated in FIG. 12, a plurality of selection buttons "b0" to "b6" is displayed on the upper left corner of the home screen SC1. The mode switching button "b0" is used for switching a "single mode (first mode)" and a "comparison mode (second mode)," which will be described later in detail. The selection button "b1" is used for selecting a first input mode for inputting an area for the diagnosis target image (i.e., drawing of area). The selection button "b2" is used for selecting a second input mode for inputting a line for the diagnosis target image (i.e., drawing of line pattern). The selection button "b3" is used for selecting a third input mode for inputting a diagnosis region. The home button "b4" is used for returning to the home screen SC1. The reduction button "b5" is used for reducing a display size of the development-view image 201. The enlargement button "b6" is used for enlarging a display size of the development-view image 201.

Further, as illustrated in FIG. 12, "RELOAD" button "b11" is displayed at the lower center portion of the home screen SC1. The "RELOAD" button b11 is used for displaying a pull-down menu that lists data of the diagnosis region already uploaded to the diagnosis management server 5.

Similarly, as illustrated in FIG. 12, "SAVE" button "b12" is displayed at the lower center portion of the home screen SC1. The "SAVE" button "b12" is used for collectively transmitting data of the diagnosis information, generated and temporarily stored in the drawing apparatus 3, to the diagnosis management server 5 to save the data of diagnosis region in the diagnosis management server 5.

Further, a save list 210 is also displayed at the lower center portion of the home screen SC1. The save list 210 is used for displaying names of data of diagnosis regions downloaded from the diagnosis management server 5, and names of data of diagnosis regions temporarily stored in the drawing apparatus 3. When the user selects the save list 210 using the pointer "po," the display control unit 34 displays a diagnosis position input screen SC2 (FIG. 13) showing the corresponding diagnosis region.

Further, as illustrated in FIG. 12, a layer list LL1 is displayed on the right side of the home screen SC1. The layer list LL1 displays a list of types of inspection findings, such as defects. For example, the layer list LL1 displays the types of defects, such as crack, water leakage, and calcification. When a check box of the layer list LL1 is checked, a layer of the checked inspection findings (e.g., crack) is displayed over the development-view image 201. Further, as illustrated in FIG. 12, "LAYER" button "b13" is displayed at the right lower side of the home screen SC1, and the "LAYER" button "b13" is used for displaying the layer list LL1 using a pull-up display.

When the user operates the mouse 312 to select a specific span, to be input with image drawing and diagnosis information, using the pointer "po" on the home screen SC1, the display control unit 34 displays the diagnosis position input screen SC2 on the display 308 as illustrated in FIG. 13 (step S22). The diagnosis position input screen SC2 (FIG. 13) displays the partial development-view image 202 corresponding to the selected span of the development-view image 201. Further, as illustrated in FIG. 13, a viewing direction switching button "bc1" is displayed on the lower right corner of the diagnosis position input screen SC2, and the viewing direction switching button "bc1" is used for switching the viewing direction of the development-view image 201. The switching of the viewing direction will be described later with reference to FIGS. 32 and 33.

Then, if the user does not press the mode switching button "b0" (step S23: NO) but selects any one of the selection buttons "b1, b2, and b3" using the pointer "po," the reception unit 32 receives a selection of the input mode (step S24). Therefore, if the user does not press the mode switching button "b0," the drawing apparatus 3 enters the input mode using the single mode (first mode).

Then, if the user performs drawing of image and inputting of diagnosis information in accordance with the selected input mode, the drawing apparatus 3 performs the drawing of image and the inputting of diagnosis information (step S25). The detail of step S25 will be described later for each input mode.

Then, if the user does not press the mode switching button "b0" in step S23 (not selecting the comparison mode (second mode)), that is, if the single mode (first mode) is set (step S26: NO), and the reception unit 32 receives an operation of the mouse 312 or the like performed by the user, the storing/reading unit 39 temporarily stores, in the storage unit 3000, data of the new diagnosis region generated by performing the drawing of image and the inputting of diagnosis information (step S27), and then the drawn image data of the new diagnosis information is transmitted to the diagnosis management server 5 from the drawing apparatus 3 in step S8 described in FIG. 6.

Input Mode of Diagnosis Target Image (Drawing of Area):

Hereinafter, a description is given of the details of step S24 (FIG. 8) when the first input mode for inputting an area of the diagnosis target image (i.e., drawing of an area) is selected with reference to FIGS. 9, and 13 to 20. The first input mode for inputting an area of the diagnosis target image (i.e., drawing of an area) can be referred to as the first input mode of the diagnosis target image in this description. The first input mode of the diagnosis target image (i.e., drawing of an area) is used when the diagnosis target corresponds to inspection findings that can be identified as a certain area, such as calcification and water leakage.

Figure 9:
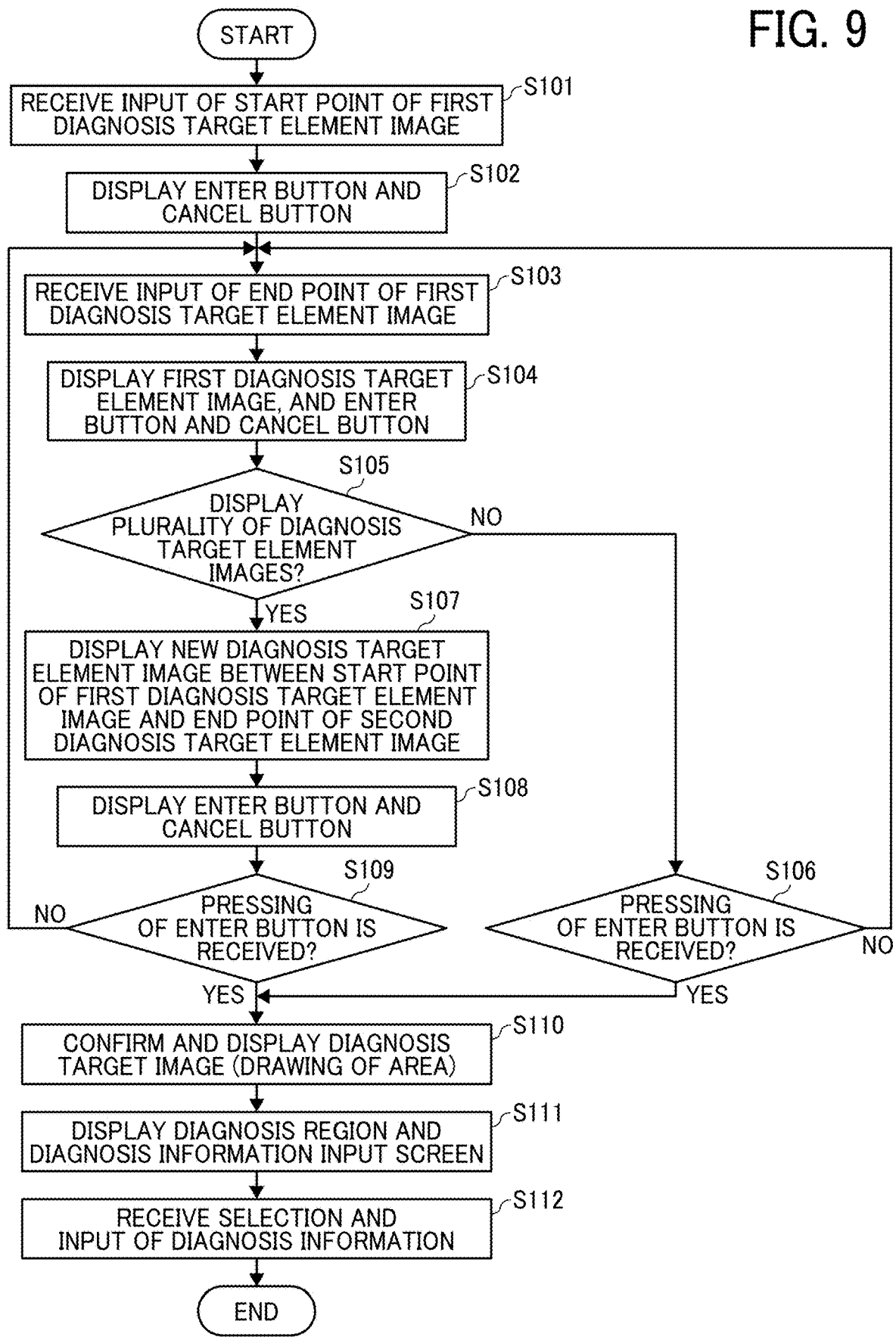
FIG. 9 is an example of a flowchart illustrating processing of a first input mode of a diagnosis target image (e.g., drawing of an area)

FIG. 9 is an example of a flowchart illustrating processing of the first input mode of the diagnosis target image (i.e., drawing of an area). FIG. 13 is an example of the diagnosis position input screen SC2 when the first input mode of the diagnosis target image (i.e., drawing of an area) is selected. FIGS. 14 to 19 are examples of screens when inputting the diagnosis target image (i.e., drawing of an area) on the diagnosis position input screen SC2. FIG. 20 is another example of a diagnosis information input screen, which is referred to as the diagnosis information input screen SC4.

At first, when a user selects the selection button "b1" in step S23 (FIG. 8) using the pointer "po," the display control unit 34 sets the first input mode of the diagnosis target image (i.e., drawing of an area) as illustrated in FIG. 13.

Figure 14:
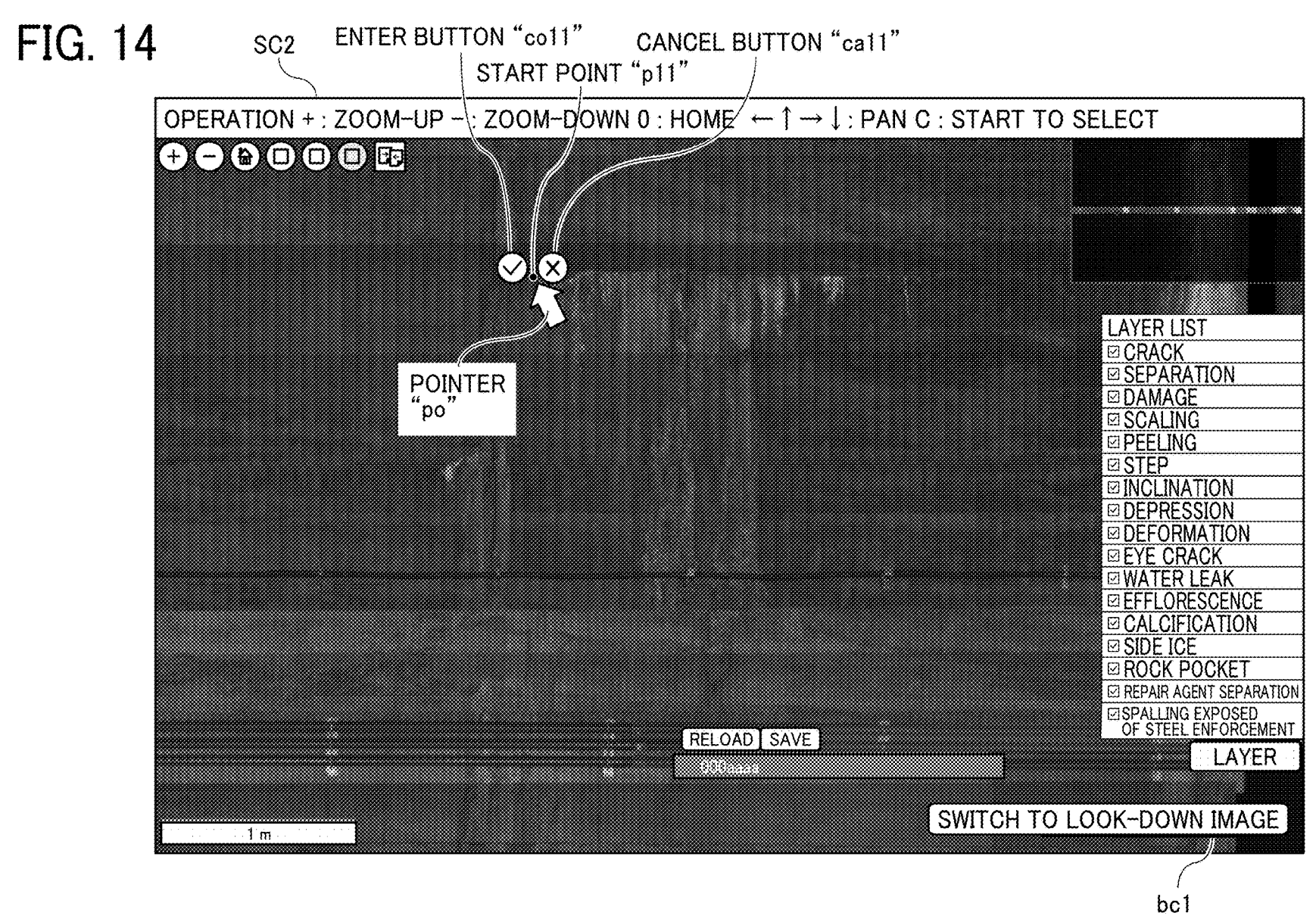

In this case, as illustrated in FIG. 14, when the user identifies a start point "p11" of a first diagnosis target element image "e11" using the pointer "po," the reception unit 32 receives the input of the start point "p11" of the first diagnosis target element image "e11" (step S101).

Then, the display control unit 34 displays an enter button "co11" and a cancel button "ca11" near the start point "p11" (step S102). The enter button "co11" is used for entering the input of the diagnosis target element image to confirm the input of the diagnosis target image. The cancel button "ca11" is used for cancelling the input of the identified start point "p11." Further, other enter buttons and other cancel buttons can be respectively used in the same way as the enter button "co11" and the cancel button "ca11" in this description.

Figure 15:
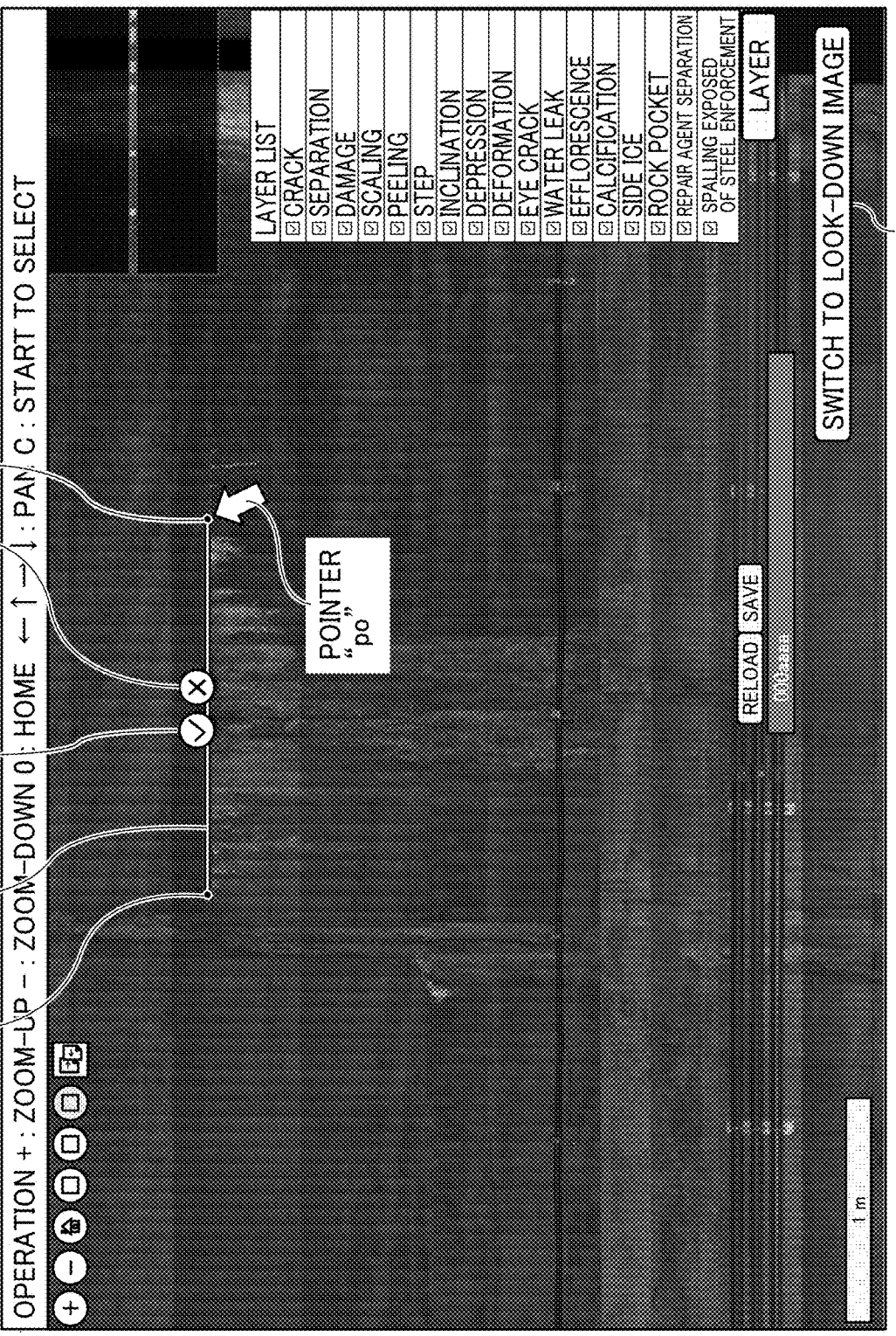
FIG. 15 is an example of a screen when inputting a diagnosis target image (e.g., drawing of an area) on a diagnosis position input screen.

Then, as illustrated in FIG. 15, if the user identifies an end point "p12" of the first diagnosis target element Image "e11" using the pointer "po," the reception unit 32 receives the input of the end point "p12" of the first diagnosis target element image "e11" (step S103).

Then, the display control unit 34 displays the first diagnosis target element image "e11" between the start point "p11" and the end point "p12" and also displays an enter button "co12" and a cancel button "ca12" near the center of the first diagnosis target element image "e11" (step S104) as illustrated in FIG. 15. With this configuration, the user can draw the diagnosis target element image by identifying the start point and the end point of the diagnosis target element image.

Then, the determination unit 35 determines whether the diagnosis target element image, displayed in step S104, includes a plurality of diagnosis target element images (step S105). At this time, since only one diagnosis target element image is displayed as illustrated in FIG. 15, the determination unit 35 determines that the diagnosis target element image does not include the plurality of diagnosis target element images (step S105: NO), and then the sequence proceeds to step S106.

If the determination in step S105 is "NO," the determination unit 35 determines whether pressing of the enter button is received by the reception unit 32 (step S106). If the determination unit 35 determines that the pressing of the enter button is received by the reception unit 32 (step S106: YES), the sequence proceeds to step S110, to be described later. On the other hand, if the determination unit 35 determines that the pressing of the enter button is not received by the reception unit 32 (step S106: NO), the sequence returns to step S103.

Figure 16:
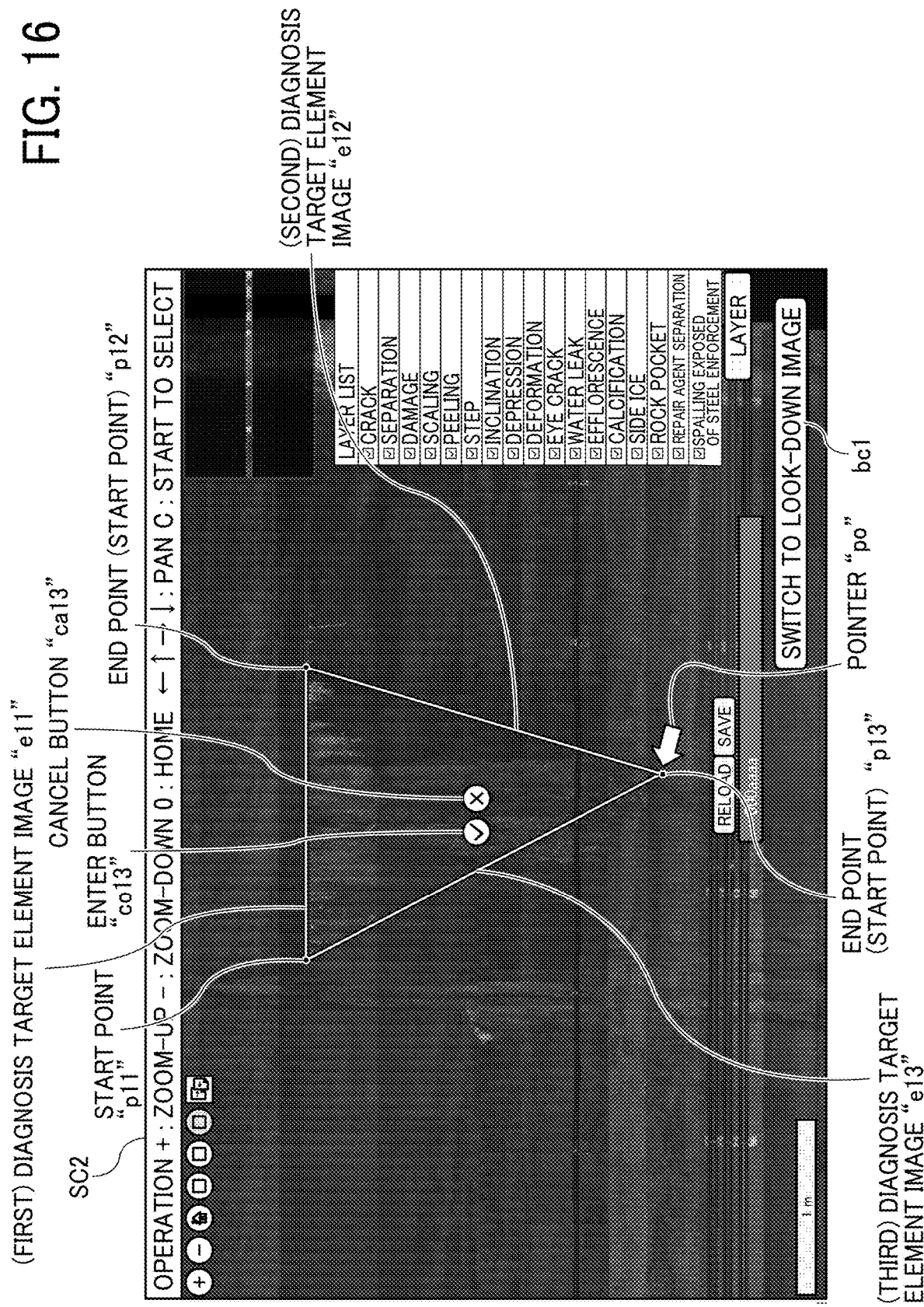
FIG. 16 is an example of a screen when inputting a diagnosis target image (e.g., drawing of an area) on a diagnosis position input screen.

As illustrated in FIG. 16, if the user identifies an end point "p13" of a second diagnosis target element image "e12" using the pointer "po," the reception unit 32 receives the input of the end point "p13" of the second diagnosis target element image "e12." Since the start point of the second diagnosis target element image 12 matches the end point "p12" of the first diagnosis target element image "e11," the user can omit the identification of the start point of the second diagnosis target element image "e12."

Then, in step S104, the display control unit 34 displays the second diagnosis target element image "e12" between the start point (i.e., end point "p12") and the end point "p13" and also displays an enter button "co13" and a cancel button "ca13" between the first diagnosis target element image "e11" and the second diagnosis target element image "e12" as illustrated in FIG. 16.

Then, in step S105, the determination unit 35 determines whether the diagnosis target element image, displayed in step S104, includes a plurality of diagnosis target element images. At this time, since two diagnosis target element images (i.e., first diagnosis target element image "e11" and second diagnosis target element image "e12") are displayed as illustrated in FIG. 16, the determination unit 35 determines that plurality of the diagnosis target element images is displayed (step S105: YES).

Then, the display control unit 34 automatically displays a third diagnosis target element image "e13" (i.e., new diagnosis target element image) between the start point "p11" of the first diagnosis target element image "e11" and the end point "p13" of the second diagnosis target element image "e12" as illustrated in FIG. 16 (step S107), in which the third diagnosis target element image "e13" is the latest diagnosis target element image.

Further, the display control unit 34 changes the display positions of the enter button and the cancel button (step S108). Specifically, the display control unit 34 changes the enter button "co12" and the cancel button "ca12" illustrated in FIG. 15 to the enter button "co13" and the cancel button "ca13" illustrated in FIG. 16.

Then, the determination unit 35 determines whether the pressing of the enter button is received by the reception unit 32 (step S109). If the determination unit 35 determines that the pressing of the enter button is not received by the reception unit 32 (step S109: NO), the sequence returns to step S103.

Figure 17:
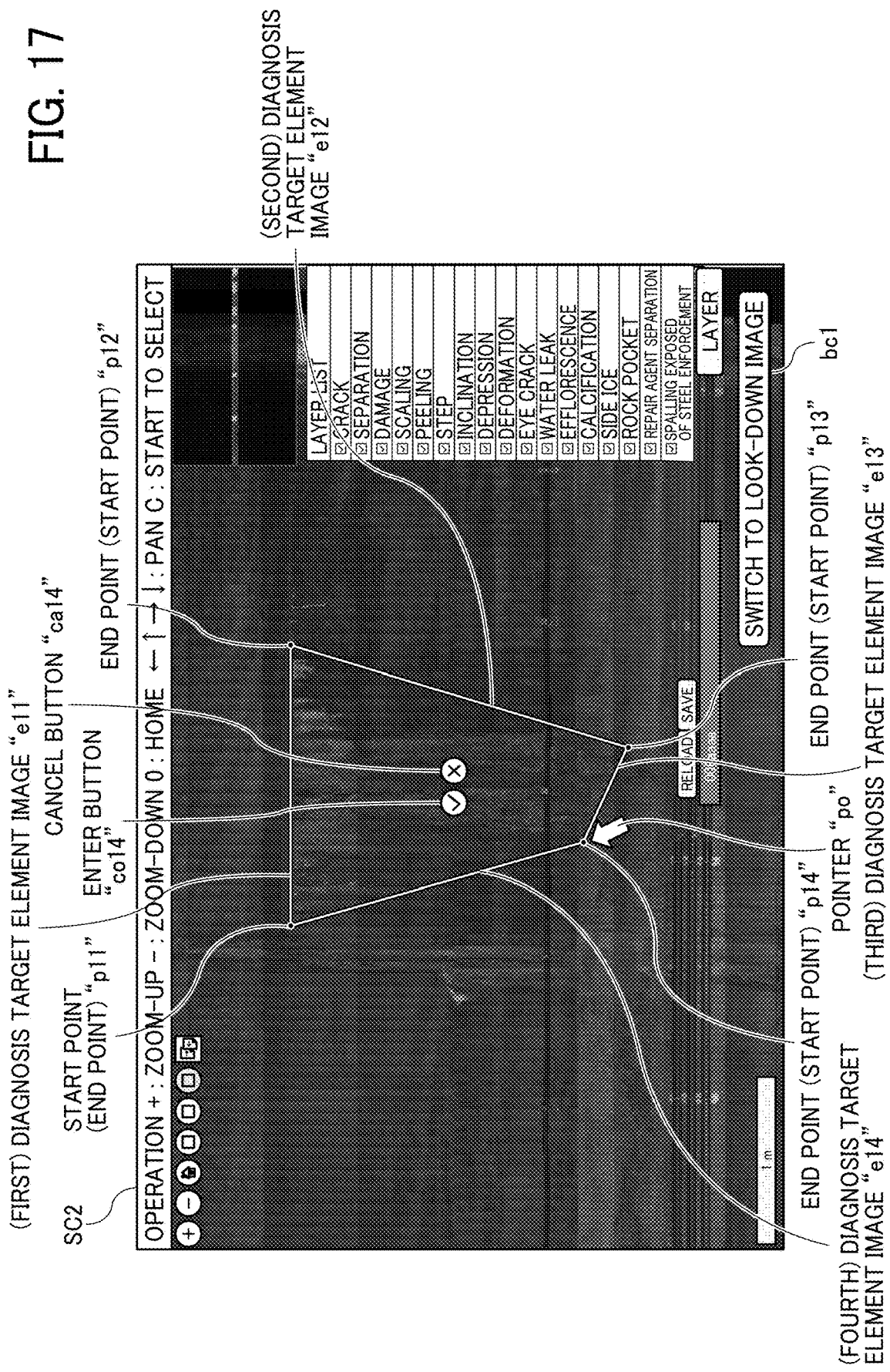
FIG. 17 is an example of a screen when inputting a diagnosis target image (e.g., drawing of an area) on a diagnosis position input screen.

As illustrated in FIG. 17, if the user identifies an end point "p14" of the third diagnosis target element image "e13" using the pointer "po," the reception unit 32 receives the input of the end point "p14" of the third diagnosis target element image "e13." Since the start point of the third diagnosis target element image "e13" matches the end point "p13" of the second diagnosis target element image "e12," the user can omit the identification of the start point of the third diagnosis target element image "e13".

Then, in step S104, the display control unit 34 displays the third diagnosis target element image "e13" between the start point (i.e., end point "p13") and the end point "p14" and also displays an enter button "co14" and a cancel button "ca14" between the first diagnosis target element image "e11, the second diagnosis target element image "e12," and the third diagnosis target element image "e13" as illustrated in FIG. 17.

Then, in step S105, the determination unit 35 determines whether the diagnosis target element image, displayed in step S104, includes the plurality of the diagnosis target element images. At this time, since three diagnosis target element images (i.e., first diagnosis target element image "e11," second diagnosis target element image "e12," and third diagnosis target element image "e13") are displayed, the determination unit 35 determines that the diagnosis target element image, displayed in step S104, includes the plurality of the diagnosis target element images (step S105: YES).

Then, in step S107, the display control unit 34 automatically displays a fourth diagnosis target element image "e14" (i.e., new diagnosis target element image) between the start point "p11" of the first diagnosis target element image "e11" and the end point "p14" of the third diagnosis target element image "e13" as illustrated in FIG. 17, in which the fourth diagnosis target element image "e14" is the latest diagnosis target element image.

Further, in step S108, the display control unit 34 changes the display positions of the enter button and the cancel button. Specifically, the display control unit 34 changes the enter button "co13" and the cancel button "ca13" illustrated in FIG. 16 to the enter button "co14" and the cancel button "ca14" illustrated in FIG. 17.

Figure 18:
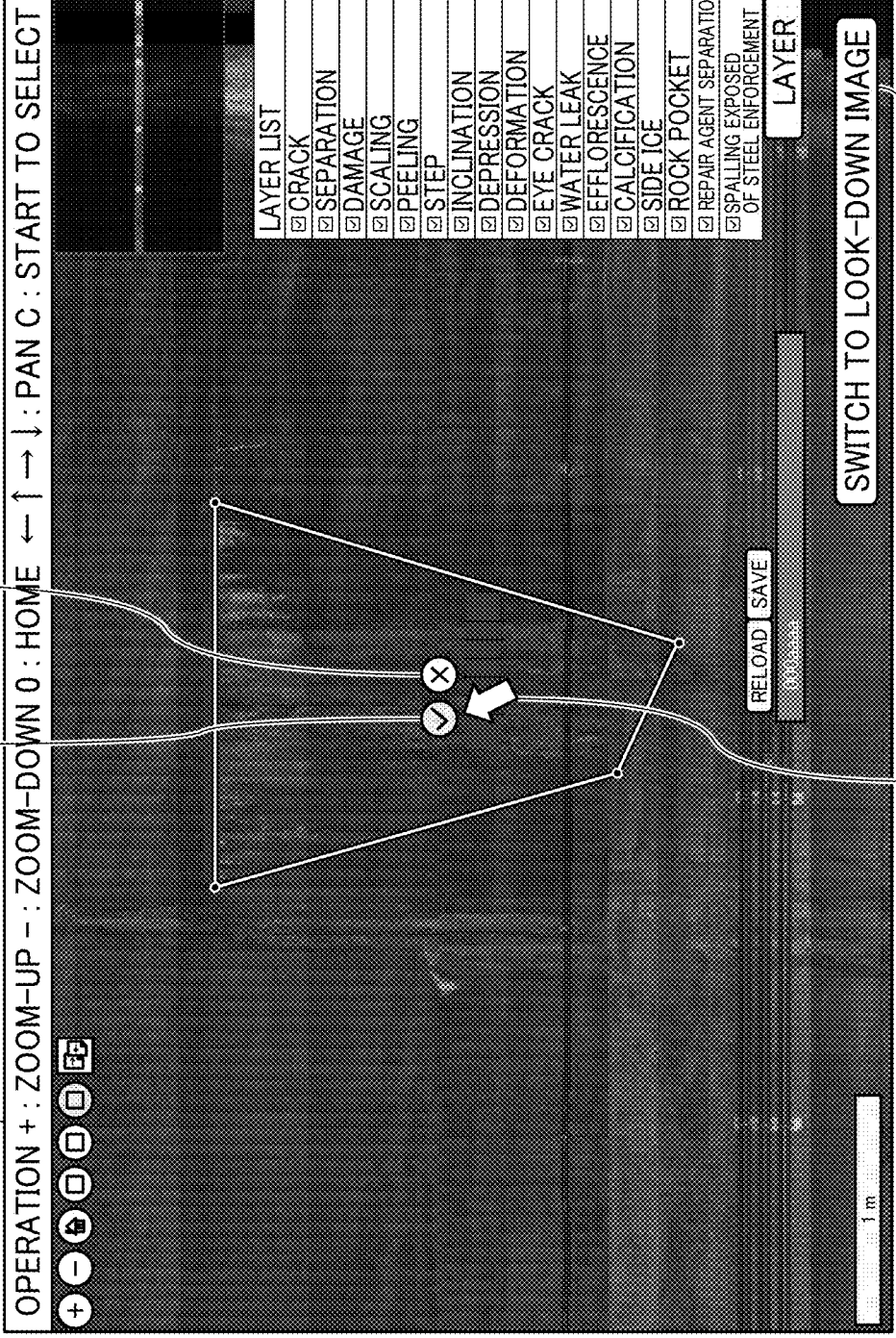
FIG. 18 is an example of a screen when inputting a diagnosis target image (e.g., drawing of an area) on a diagnosis position input screen.

Then, as illustrated in FIG. 18, if the user presses the enter button "co14" using the pointer "po," the reception unit 32 receives the pressing of the enter button "co14," and then the determination unit 35 determines that the pressing of the enter button "co14" is received by the reception unit 32 (step S109: YES).

Figure 19:
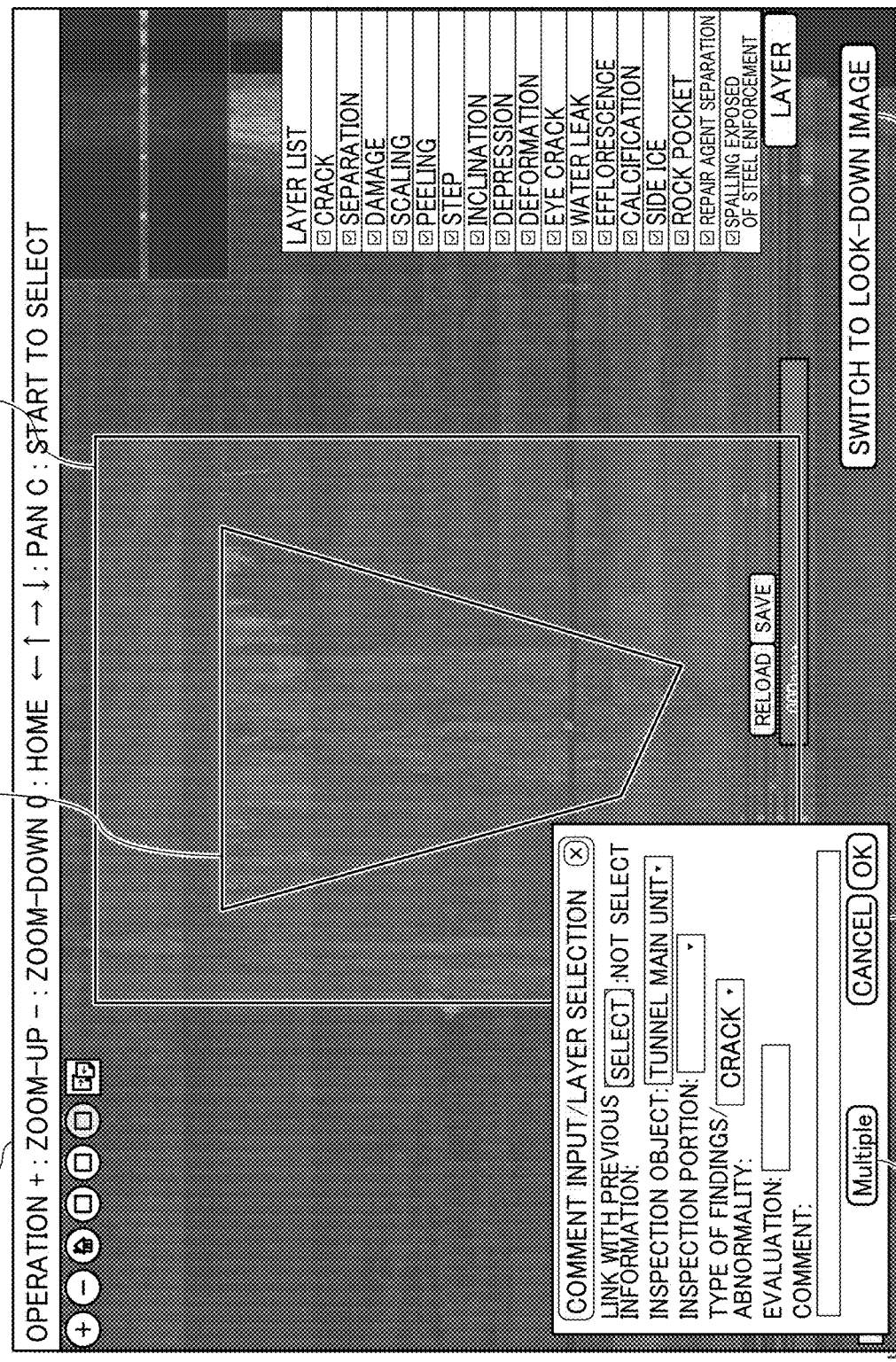
FIG. 19 is an example of a screen when inputting a diagnosis target image (e.g., drawing of an area) on a diagnosis position input screen, displaying an example of diagnosis information input screen.

Then, as illustrated in FIG. 19, the determination unit 35 confirms or identifies a diagnosis target image (i.e., drawing of area), and the display control unit 34 displays the confirmed diagnosis target image "dt11" (step S110).

Then, as illustrated in FIG. 19, the display control unit 34 displays a rectangular-shaped diagnosis region "da11" including the diagnosis target image "dt11," and a diagnosis information input screen SC3 (step S111). In this case, in order to make the diagnosis information input screen SC3 conspicuous, the display control unit 34 can apply a masking on a portion other than the diagnosis information input screen SC3. In this description, the diagnosis information input screen SC3 may be referred to as a first input screen, and the diagnosis information input screen SC3 and other similar screens can be also referred to as the input screen, the input section, or the input box depending on purposes of the screens, in which the size of screen may be set smaller than a size of the display 308.

The user, such as the operator, uses the diagnosis information input screen SC3 to input the diagnosis information by referring to the detail information of inspection findings (e.g., comment) recorded by the inspector or the assistant. As illustrated in FIG. 19, the diagnosis information input screen SC3 displays, for example, a selection button to link with the previous or past diagnosis information, a first pull-down menu for selecting an inspection (diagnosis) object, a second pull-down menu for selecting an inspection (diagnosis) portion, a third pull-down menu for selecting a type of observed-inspection findings and abnormality, a first input field for inputting an evaluation result, and a second input field for inputting the detail information of inspection findings (e g, comment). The link with the previous or past diagnosis information is used when adding a new diagnosis target image into the already confirmed diagnosis region. For example, the link with the previous or past diagnosis information can be used when water leakage is already confirmed as one diagnosis target image in one diagnosis region, and then crack is added as a new diagnosis image in the same one diagnosis region including the water leakage.

Further, as illustrated in FIG. 19, the diagnosis information input screen SC3 displays "OK" button for confirming the input diagnosis information, and "CANCEL" button for canceling the input diagnosis information. The diagnosis information can be also referred to as the assessment information. In this case, if the user selects and inputs the diagnosis information in the diagnosis information input screen SC3 and presses the "OK" button, the reception unit 32 receives the selection and input of the diagnosis information (step S112).

Further, as illustrated in FIG. 19, the diagnosis information input screen SC3 displays an input switching button "bm" for switching from the diagnosis information input screen SC3 to a diagnosis information input screen SC4 illustrated in FIG. 20. If the input switching button "bm" (FIG. 19) is pressed, the display control unit 34 switches the diagnosis information input screen SC3 to the diagnosis information input screen SC4 (FIG. 20).

The diagnosis information input screen SC4 is used when one diagnosis region includes a plurality of diagnosis target images, and the diagnosis information is input for each one of the diagnosis target images. For example, when one diagnosis region includes three diagnosis target images (e.g. cracks, calcifications, water leaks), the diagnosis information input screen SC4 is used to collectively control or manage the one diagnosis region including the three diagnosis target images. In this case, when data of the diagnosis information is uploaded from the drawing apparatus 3 to the diagnosis management server 5 at a later time, the diagnosis management server 5 controls or manages the three diagnosis target images (e.g., cracks, calcifications, water leaks) included in the same diagnosis region having the diagnosis region number of "3" as illustrated in FIG. 4.

Similar to the diagnosis information input screen SC3, the diagnosis information input screen SC4 displays "OK" button for confirming the input diagnosis information, and "CANCEL" button for canceling the input diagnosis information as illustrated in FIG. 20. Further, as illustrated in FIG. 20, the diagnosis information input screen SC4 displays an input switching button "bs" for switching from the diagnosis information input screen SC4 to the diagnosis information input screen SC3 (FIG. 19). If the input switching button "bs" (FIG. 20) is pressed, the display control unit 34 switches the diagnosis information input screen SC4 (FIG. 20) to the diagnosis information input screen SC3 (FIG. 19).

By performing the above described processing, the drawing of the diagnosis target image "dt11" and the diagnosis region "da11" and the selection and input of the diagnosis information are completed for the first input mode of the diagnosis target image (i.e., drawing of an area).

Input Mode of Diagnosis Target Image (Drawing of Line Pattern):

Hereinafter, a description is given of the detail of step S24 (FIG. 8) when the second input mode for inputting a line pattern of the diagnosis target image (i.e., drawing of a line pattern) is selected with reference to FIGS. 10, and 21 to 26. The second input mode for inputting the line pattern of the diagnosis target image (i.e., drawing of a line pattern) can be referred to as the second input mode of the diagnosis target image in this description. The second input mode of the diagnosis target image (i.e., drawing of a line pattern) is typically used when the diagnosis target is crack, but not limited thereto.

Figure 10:
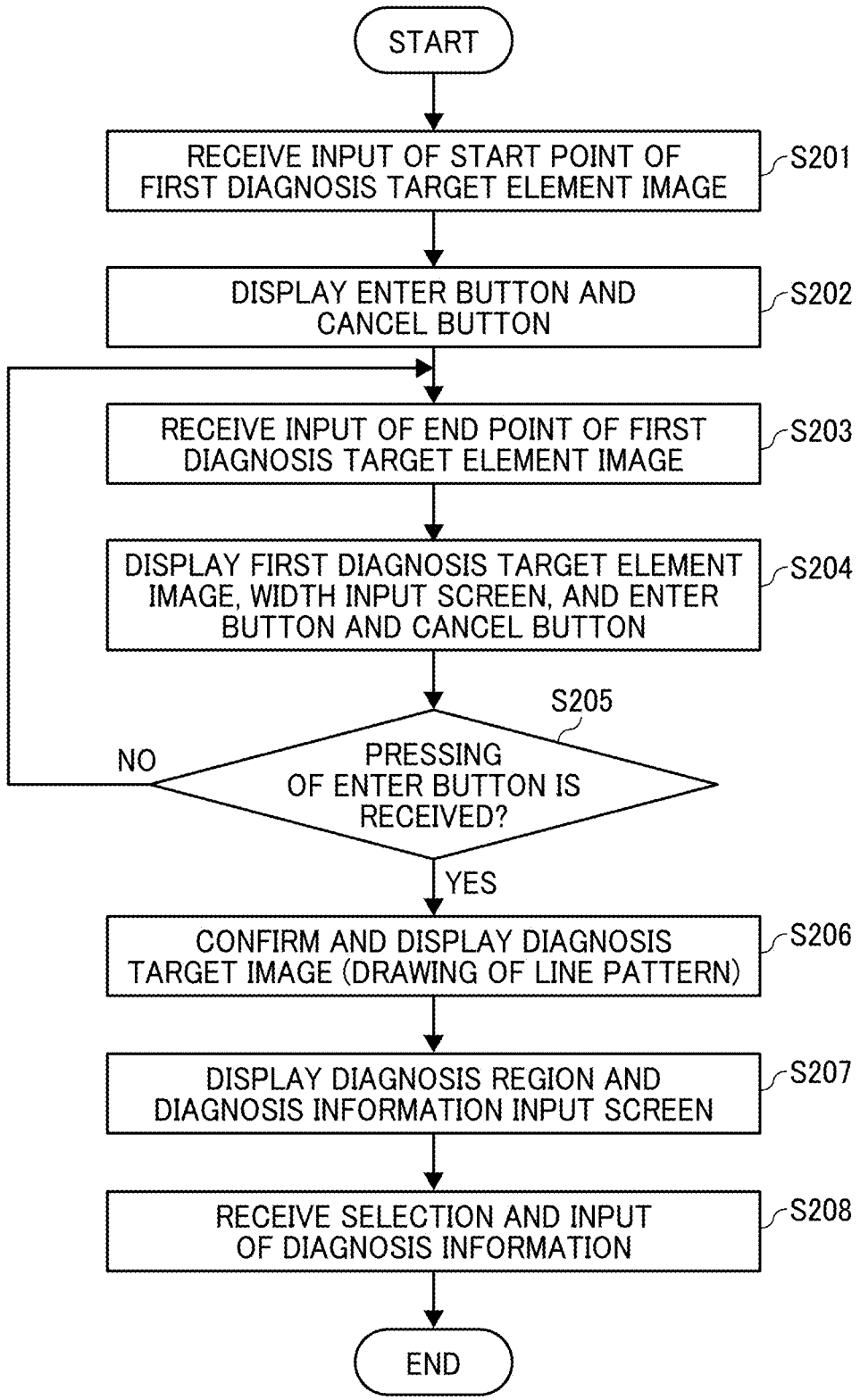
FIG. 10 is an example of a flowchart illustrating processing of a second input mode of a diagnosis target image (e.g., drawing of a line pattern)
Figure 21:
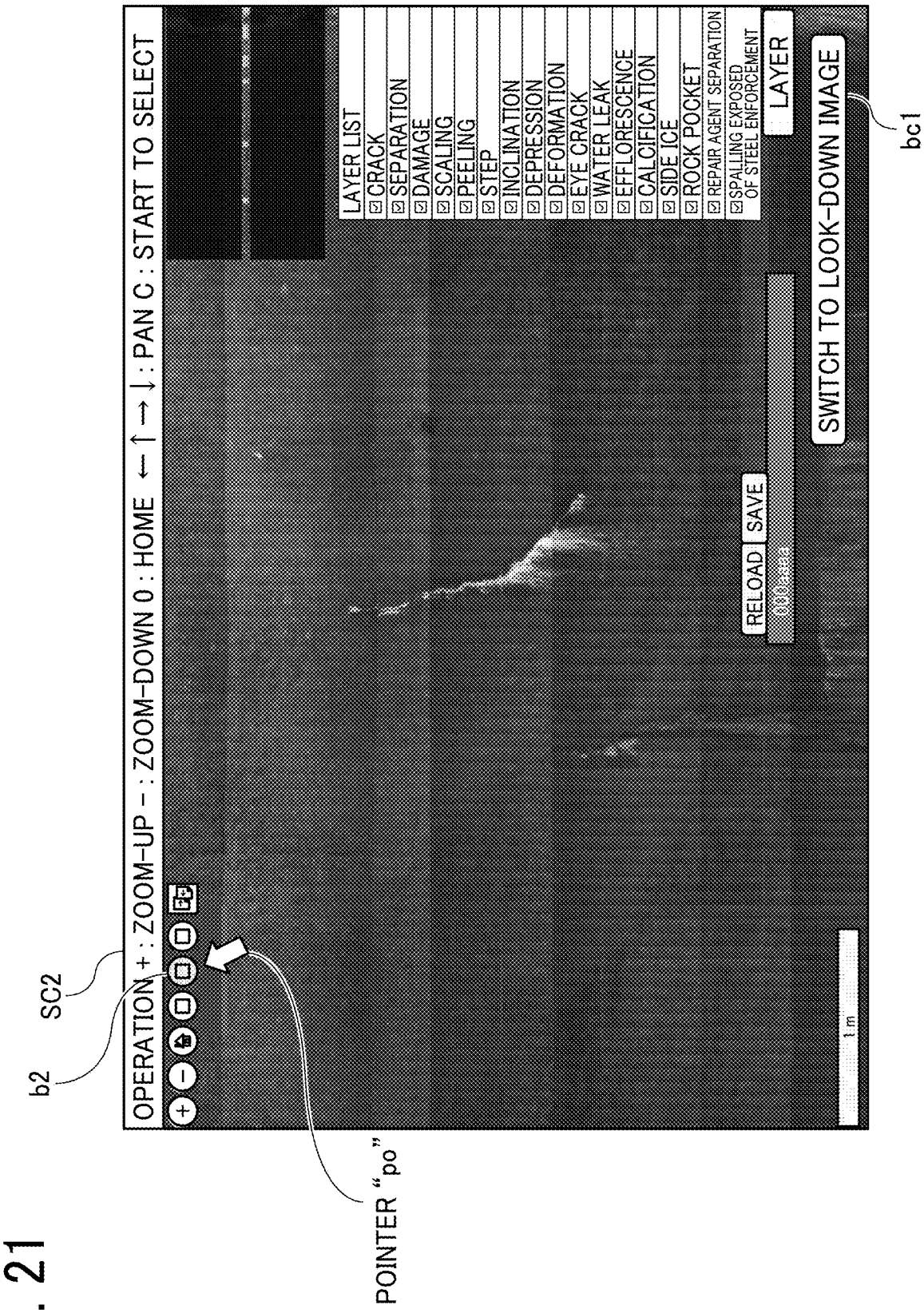
FIG. 21 is an example of a diagnosis position input screen when a second input mode of a diagnosis target image (e.g., drawing of line pattern) is selected.

FIG. 10 is an example of a flowchart illustrating processing of the second input mode of the diagnosis target image (i.e., drawing of a line pattern). FIG. 21 is an example of the diagnosis position input screen SC2 when the second input mode of the diagnosis target image (i.e., drawing of a line pattern) is selected. FIGS. 22 to 26 are examples of screens when inputting the diagnosis target image (i.e., drawing of a line pattern) on the diagnosis position input screen SC2.

At first, in step S23 (FIG. 8), if the user selects the selection button "b2" using the pointer "po," the display control unit 34 sets the second input mode of the diagnosis target image (i.e., drawing of a line pattern) as illustrated in FIG. 21.

Figure 22:
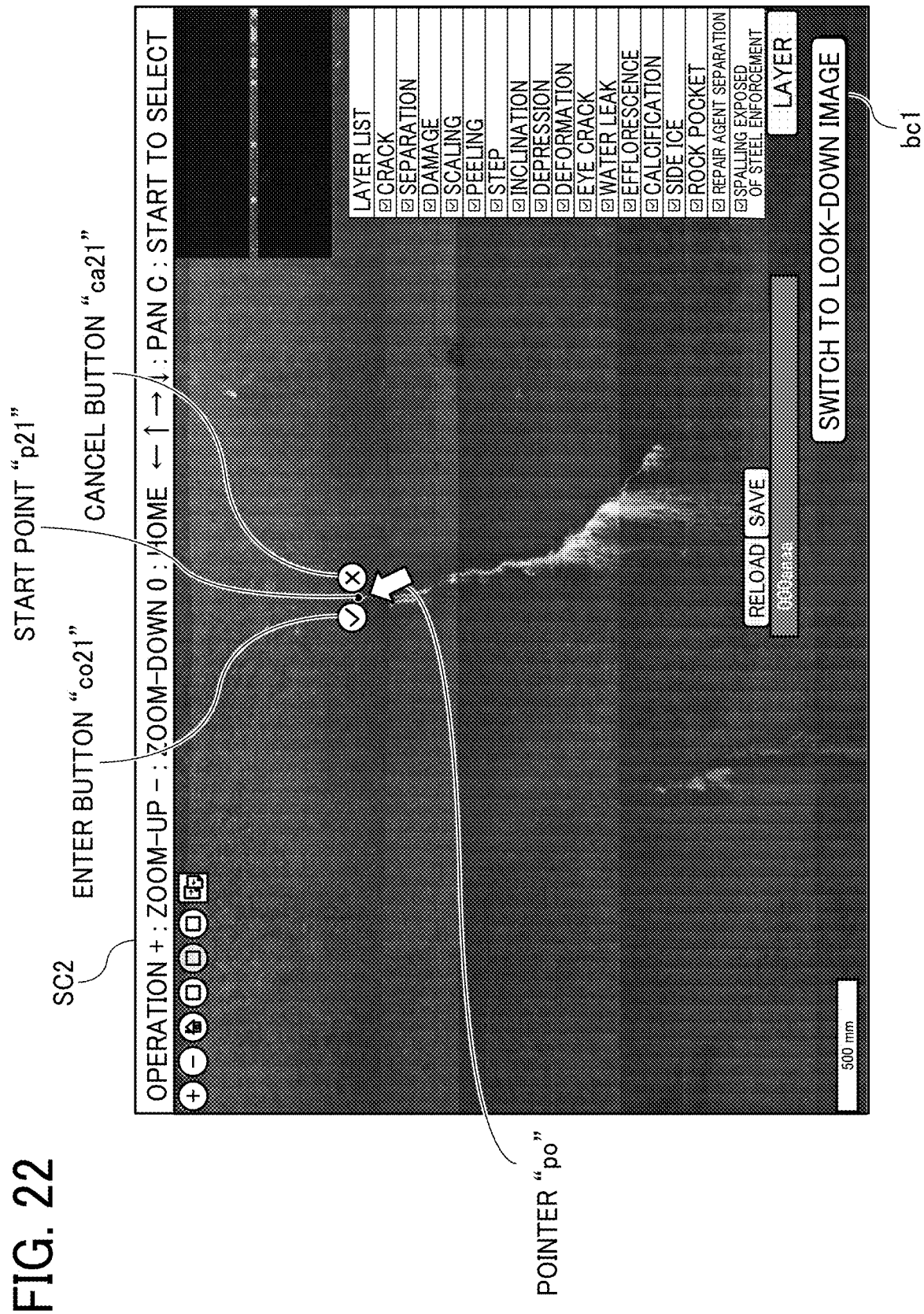
FIG. 22 is an example of another screen when inputting a diagnosis target image (e.g., drawing of a line pattern) on a diagnosis position input screen.

Then, as illustrated in FIG. 22, if the user identifies a start point "p21" of a first diagnosis target element image "e21" using the pointer "po," the reception unit 32 receives the input of the start point "p21" of the first diagnosis target element image "e21" (step S201).

Then, the display control unit 34 displays an enter button "co21" and a cancel button "ca21" near the start point "p21" (step S202).

Figure 23:
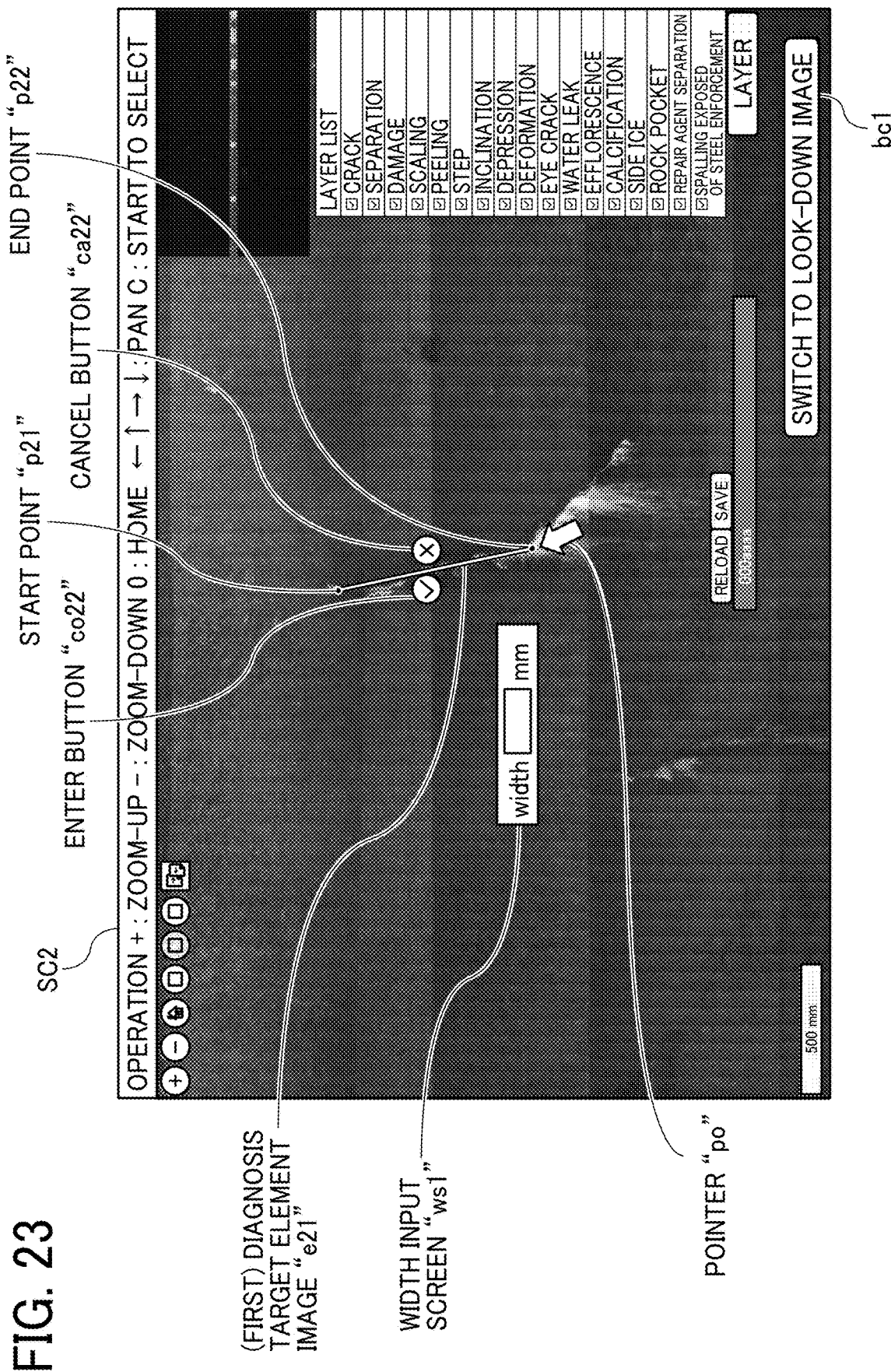
FIG. 23 is an example of another screen when inputting a diagnosis target image (e.g., drawing of a line pattern) on a diagnosis position input screen.
Figure 24:
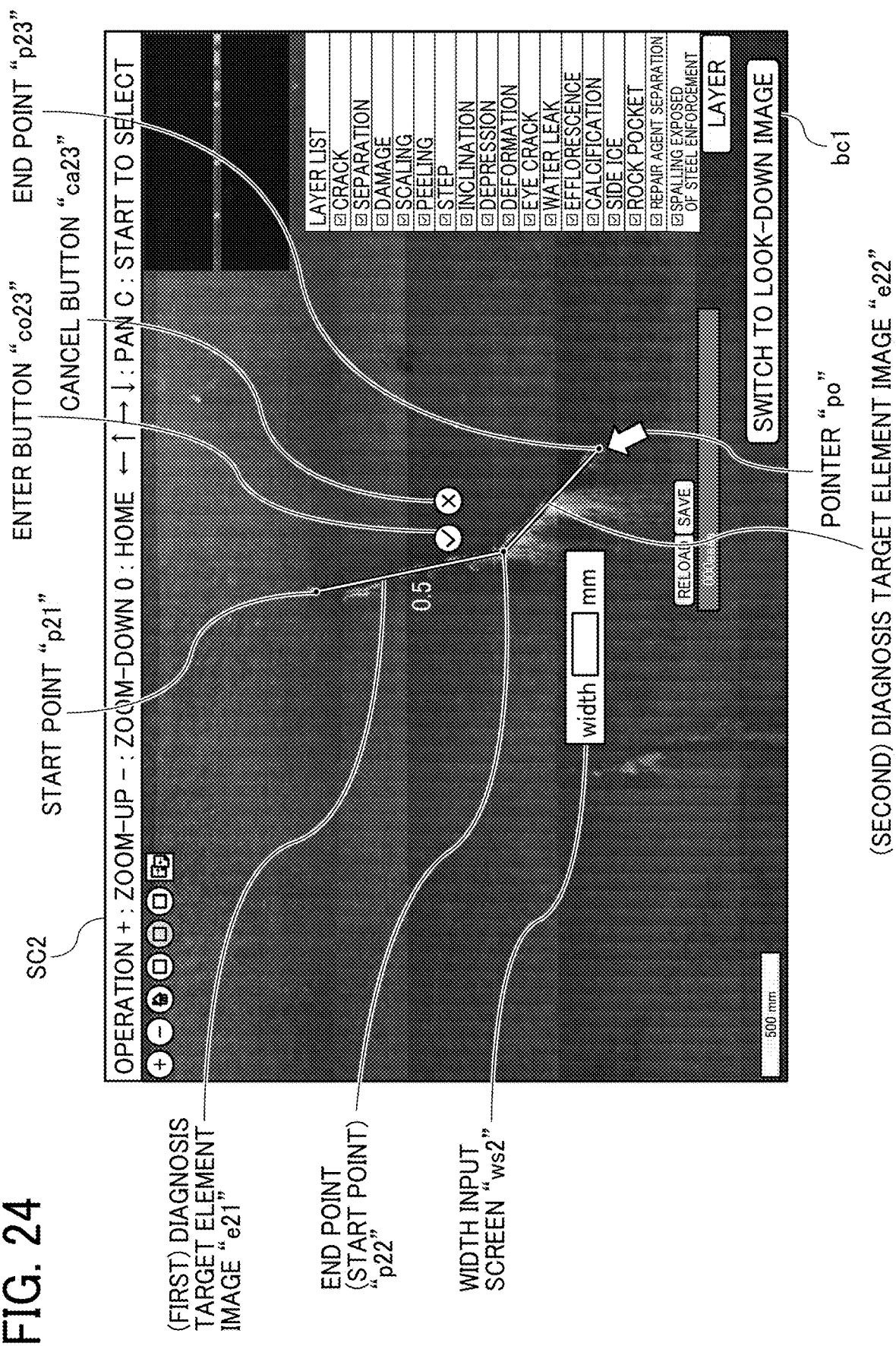
FIG. 24 is an example of another screen when inputting a diagnosis target image (e.g., drawing of a line pattern) on a diagnosis position input screen.

Then, as illustrated in FIG. 23, if the user identifies an end point "p22" of the first diagnosis target element image "e21" using the pointer "po," the reception unit 32 receives the input of the end point "p22" of the first diagnosis target element image "e21" (step S203).

Then, as illustrated in FIG. 23, the display control unit 34 displays the first diagnosis target element image "e21" and a width input field "ws1" between the start point "p21" and the end point "p22" and also displays an enter button "co22" and a cancel button "ca22" near the center of the first diagnosis target element image "e21" (step S204). With this configuration, the user can draw the diagnosis target element image by identifying the start point and the end point.

The width input field "ws1" is used for inputting a width of the line pattern when the diagnosis target element is, for example, crack. For example, the width input field "ws1" is displayed near the first diagnosis target element image "e21" and between the start point "p21" and the end point "p22." The user can input a value of width in the width input field "ws1" by referring to the numerical value shown in the development-view image 201 (e.g., numeral value written by a special chalk) and the detail information of inspection findings (e.g., comment). When the user inputs the numerical value in the width input field "ws1," the reception unit 32 receives the input numerical value, and the display control unit 34 displays the input numerical value (e.g., 0.5) as illustrated in FIG. 24.

Then, the determination unit 35 determines whether the pressing of the enter button is received by the reception unit 32 (step S205). If the determination unit 35 determines that the pressing of the enter button is not received by the reception unit 32 (step S205: NO), the sequence returns to step S203.

In an example case of FIG. 24, if the user identifies an end point "p23" of a second diagnosis target element image "e22" using the pointer "po," the reception unit 32 receives the input of the end point "p23" of the second diagnosis target element image "e22." Since the start point of the second diagnosis target element image "e22" matches the end point "p22" of the first diagnosis target element image "e21," the user can omit the identification of the start point of the second diagnosis target element image "e22."

Figure 25:
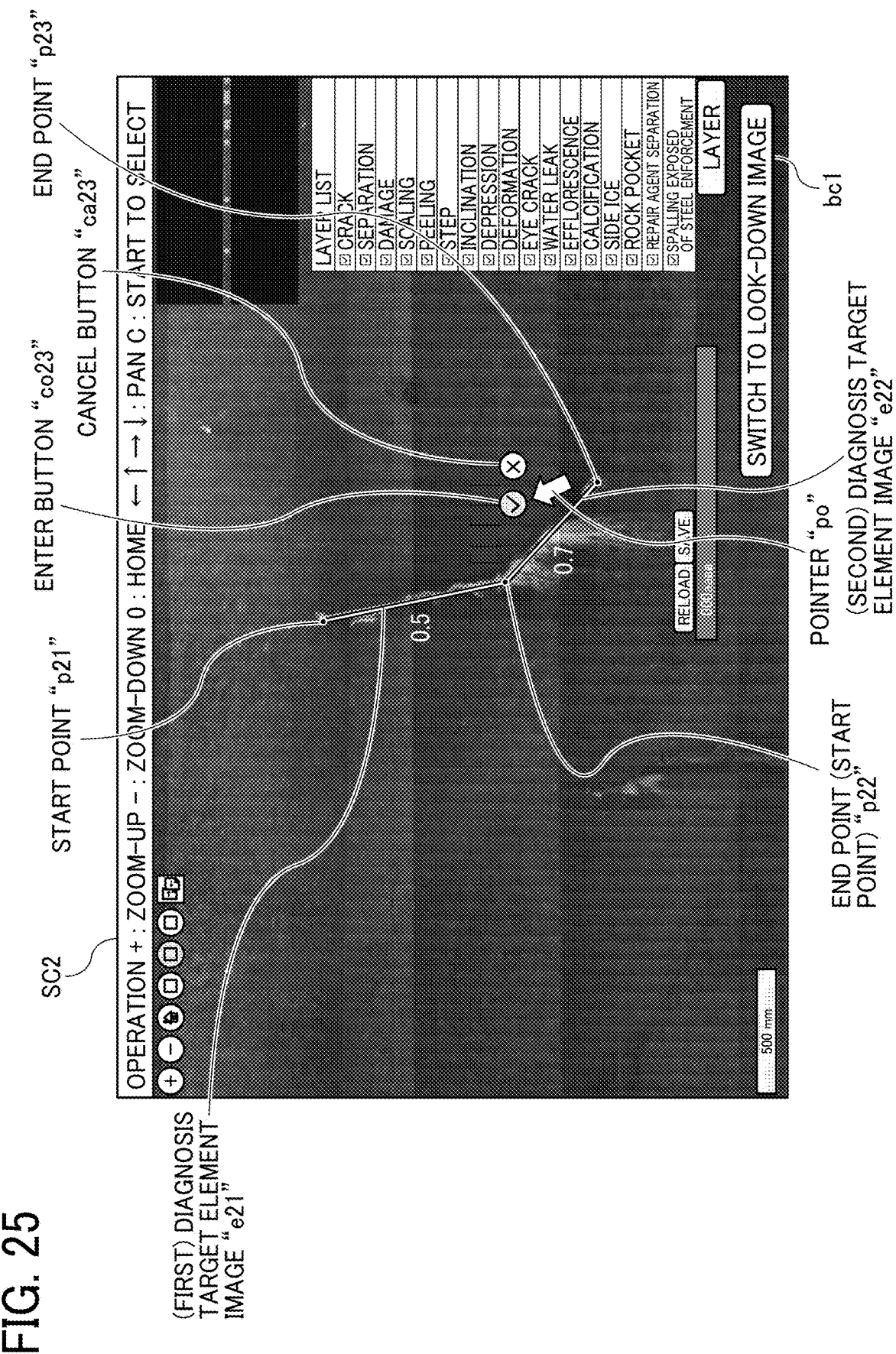
FIG. 25 is an example of another screen when inputting a diagnosis target image (e.g., drawing of a line pattern) on a diagnosis position input screen.

Then, in step S204, the display control unit 34 displays the second diagnosis target element image "e22" and a width input field "ws2" between the start point "p22" (i.e., end point "p22") and the end point "p23" and also displays an enter button "co23" and a cancel button "ca23" between the first diagnosis target element image "e21" and the second diagnosis target element image "e22" as illustrated in FIG. 24. If the user inputs a numerical value into the width input field "ws2," the reception unit 32 receives the input numerical value, and the display control unit 34 displays the input numerical value (e.g., 0.7) as illustrated in FIG. 25. Further, if the diagnosis target element image is an image having a given area size, an area-value input field can be set and displayed as needed. Further, if the diagnosis target element image is an image having a given length, a length-value input field can be set and displayed as needed.

As illustrated in FIG. 25, if the user presses the enter button "co23" using the pointer "po," the reception unit 32 receives the pressing of the enter button "co23," and then the determination unit 35 determines that the pressing of the enter button "co23" is received by the reception unit 32 (step S205: YES).

Figure 26:
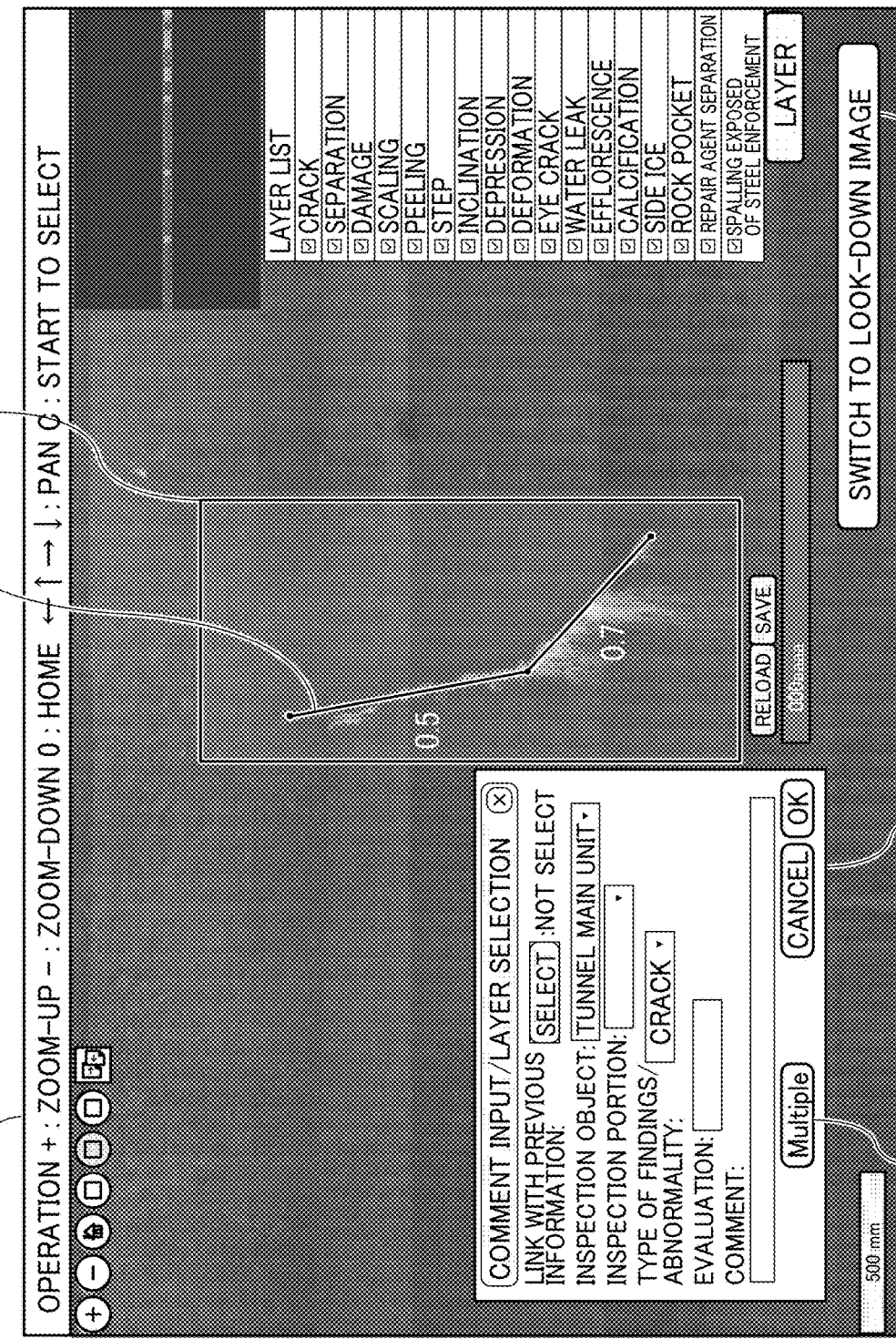
FIG. 26 is an example of another screen when inputting a diagnosis target image (e.g., drawing of a line pattern) on a diagnosis position input screen.

Then, the determination unit 35 confirms or identifies the diagnosis target image (i.e., drawing of a line pattern), and the display control unit 34 displays the confirmed diagnosis target image "dt21" (step S206) as illustrated in FIG. 26.

Further, the display control unit 34 displays a rectangular-shaped diagnosis region "da21" including the diagnosis target image "dt21" and the diagnosis information input screen SC3 (step S207). In this case, in order to make the diagnosis information input screen SC3 conspicuous, the display control unit 34 can apply a masking on a portion other than the diagnosis information input screen SC3.

In this case, if the user selects and inputs the diagnosis information on the diagnosis information input screen SC3 and presses the "OK" button, the reception unit 32 receives the selection and input of the diagnosis information (step S208).

By performing the above described processing, the drawing of the diagnosis target image "dt21" and the diagnosis region "da21" and the selection and input of the diagnosis information are completed for the second input mode of the diagnosis target image (i.e., drawing of line pattern).

Input Mode of Diagnosis Region:

Hereinafter, a description is given of the detail of step S24 (FIG. 8) when the third input mode of the diagnosis region is selected with reference to FIGS. 11, and 27 to 31. The third input mode of the diagnosis region is used when the diagnosis target image is identified after identifying the diagnosis region in this description.

Figure 11:
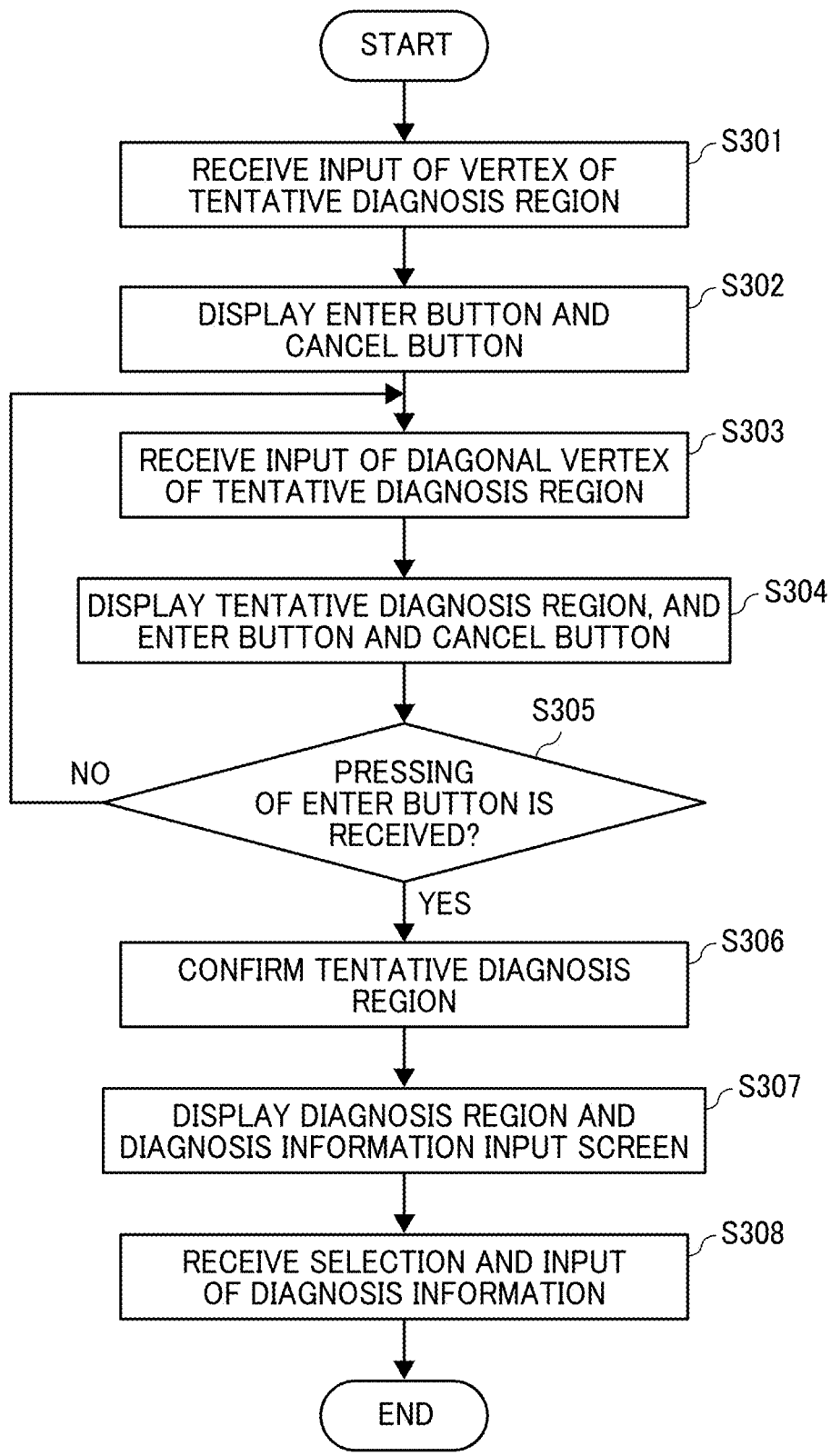
FIG. 11 is an example of a flowchart illustrating processing of a third input mode of a diagnosis region.
Figure 27:
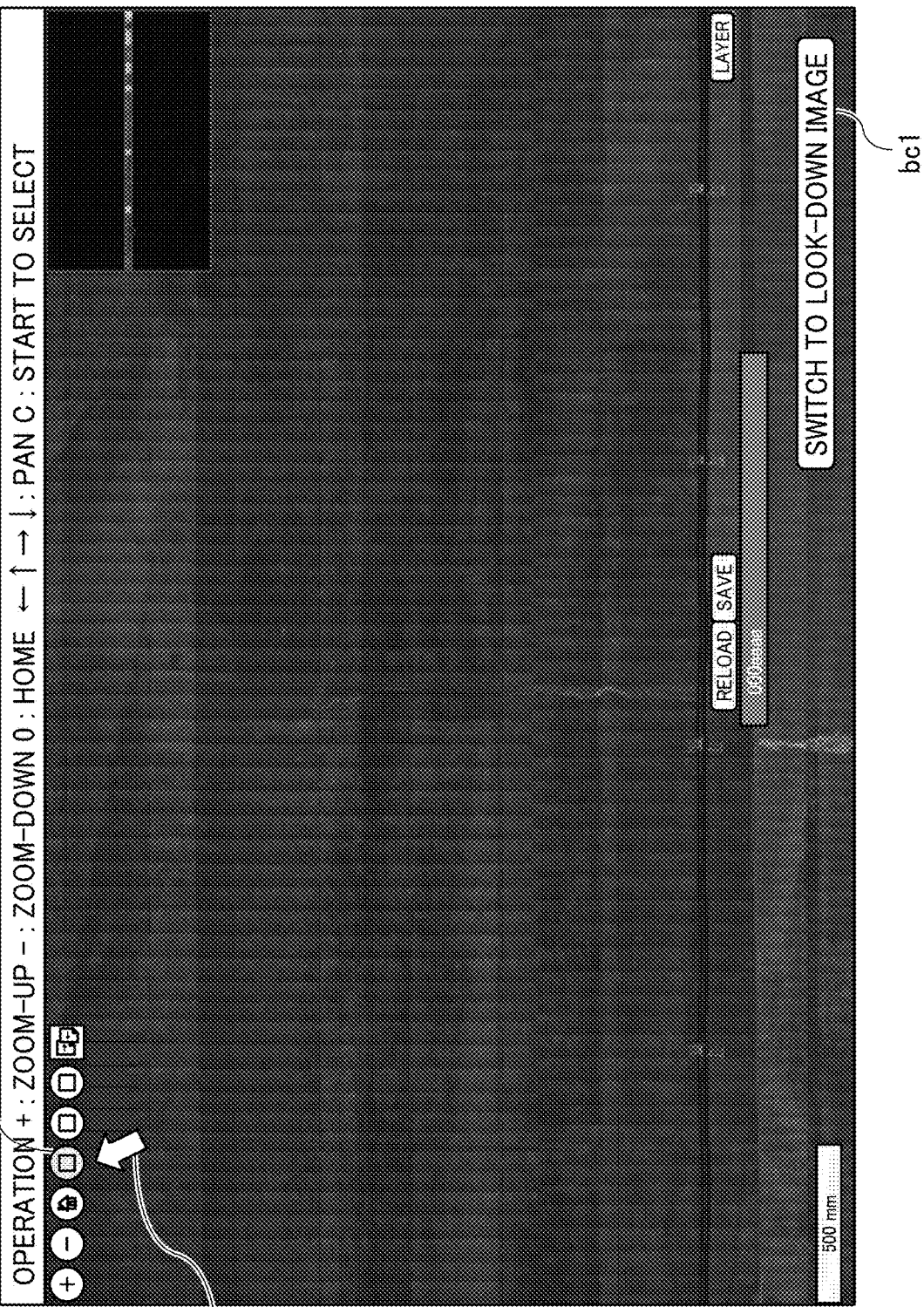
FIG. 27 is an example of a diagnosis position input screen when a third input mode of a diagnosis target image (e.g., drawing of diagnosis region) is selected.

FIG. 11 is an example of a flowchart illustrating the steps of processing of the third input mode of the diagnosis region. FIG. 27 is an example of the diagnosis position input screen SC2 when the third input mode of the diagnosis region is selected.

FIGS. 28 to 31 are examples of screens when inputting the diagnosis region on the diagnosis position input screen SC2.

At first, in step S23 (FIG. 8), if the user selects the selection button "b3" using the pointer "po," the display control unit 34 sets the third input mode of the diagnosis region as illustrated in FIG. 27.

Figure 28:
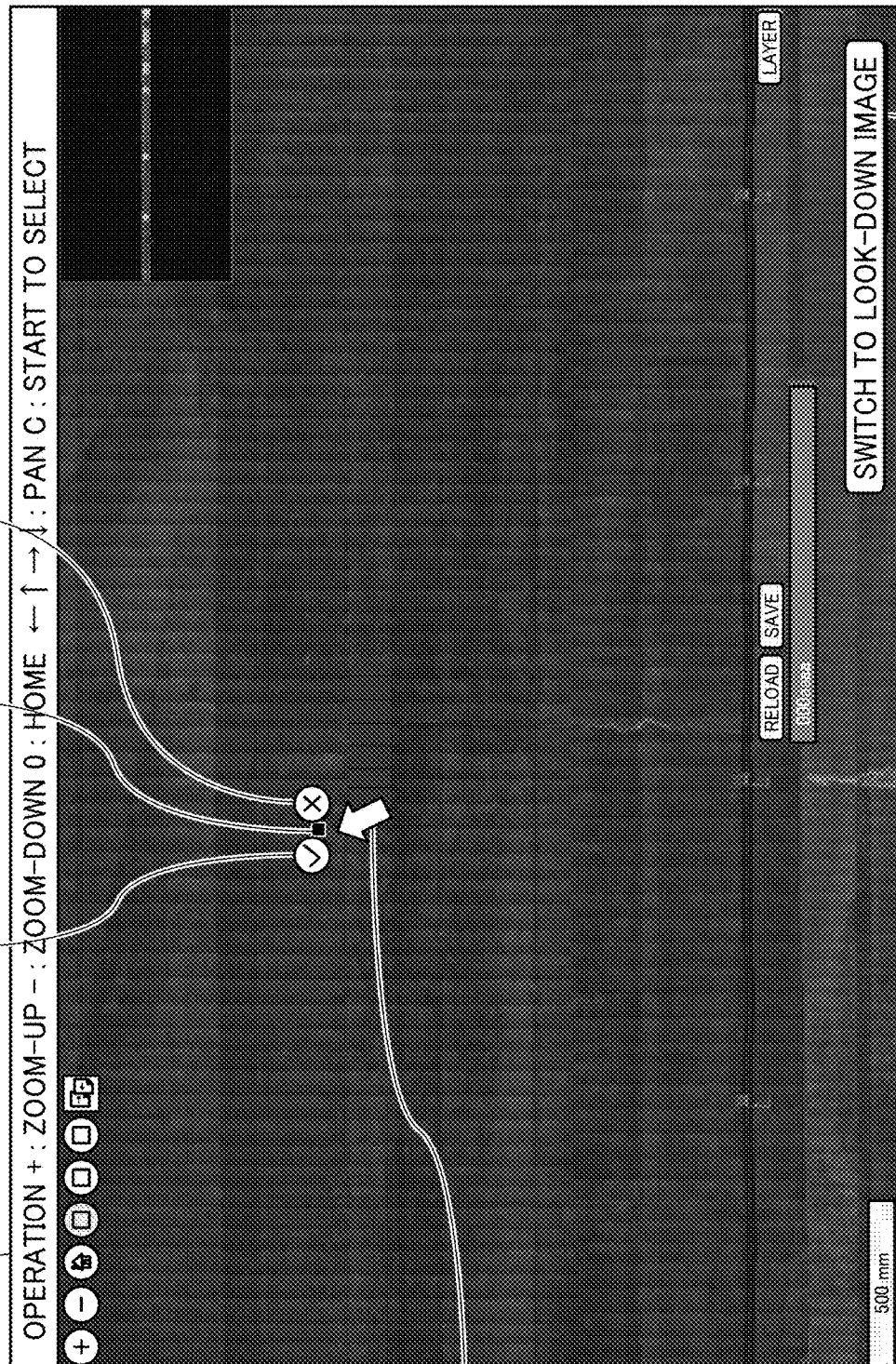
FIG. 28 is an example of another screen when inputting a diagnosis region on a diagnosis position input screen.

Then, as illustrated in FIG. 28, if the user identifies a first vertex "p31" of a tentative (or provisional) diagnosis region "da03" (see FIG. 29) using the pointer "po," the reception unit 32 receives the input of the first vertex "p31" of the tentative diagnosis region "da03" (step S301).

Then, the display control unit 34 displays an enter button "co31" and a cancel button "ca31" near the first vertex "p31" (step S302) as illustrated in FIG. 28.

Figure 29:
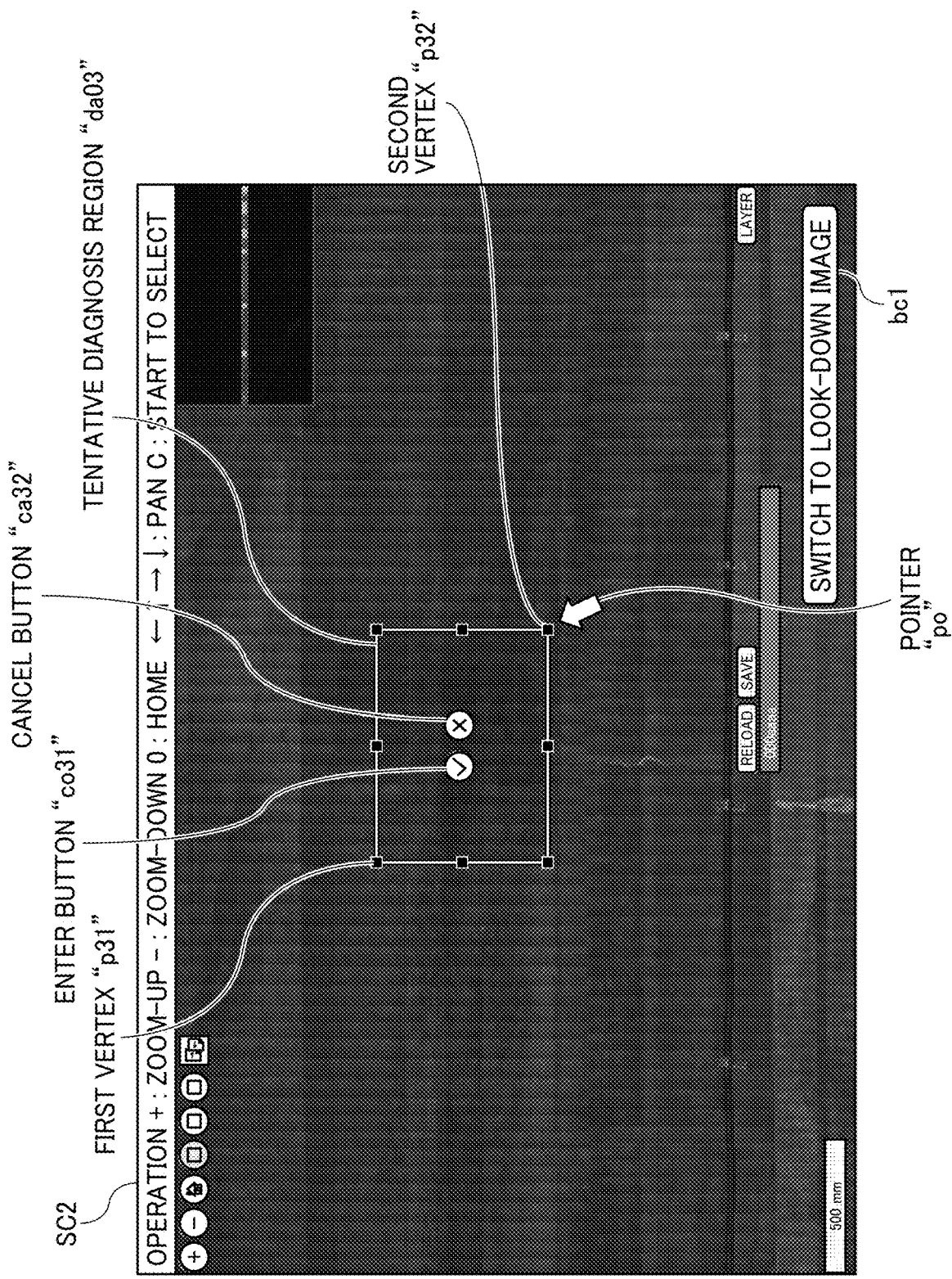
FIG. 29 is an example of another screen when inputting a diagnosis region on a diagnosis position input screen.

Then, as illustrated in FIG. 29, if the user identifies a second vertex "p32," which is a diagonal vertex relative to the first vertex "p31" of the tentative diagnosis region "da03," using the pointer "po," the reception unit 32 receives the input of the second vertex "p32" as the diagonal vertex of the first vertex "p31" of the tentative diagnosis region "da03" (step S303).

Then, as illustrated in FIG. 29, the display control unit 34 displays the tentative diagnosis region "da03" as a rectangular shaped region having the first vertex "p31" and the second vertex "p32" as the diagonal vertexes, and also displays an enter button "co32" and a cancel button "ca32" near the center of the tentative diagnosis region "da03" (step S304). With this configuration, the user can draw the diagnosis region by identifying the two vertexes, each being the diagonal angles.

Then, the determination unit 35 determines whether the pressing of the enter button is received by the reception unit 32 (step S305). If the determination unit 35 determines that the pressing of the enter button is not received by the reception unit 32 (step S305: NO), the sequence returns to step S303. In this case, after the user has identified the second vertex "p32," the first vertex "p31" or the second vertex "p32" is changed to enlarge or reduce an area of the tentative diagnosis region "da03."

Figure 30:
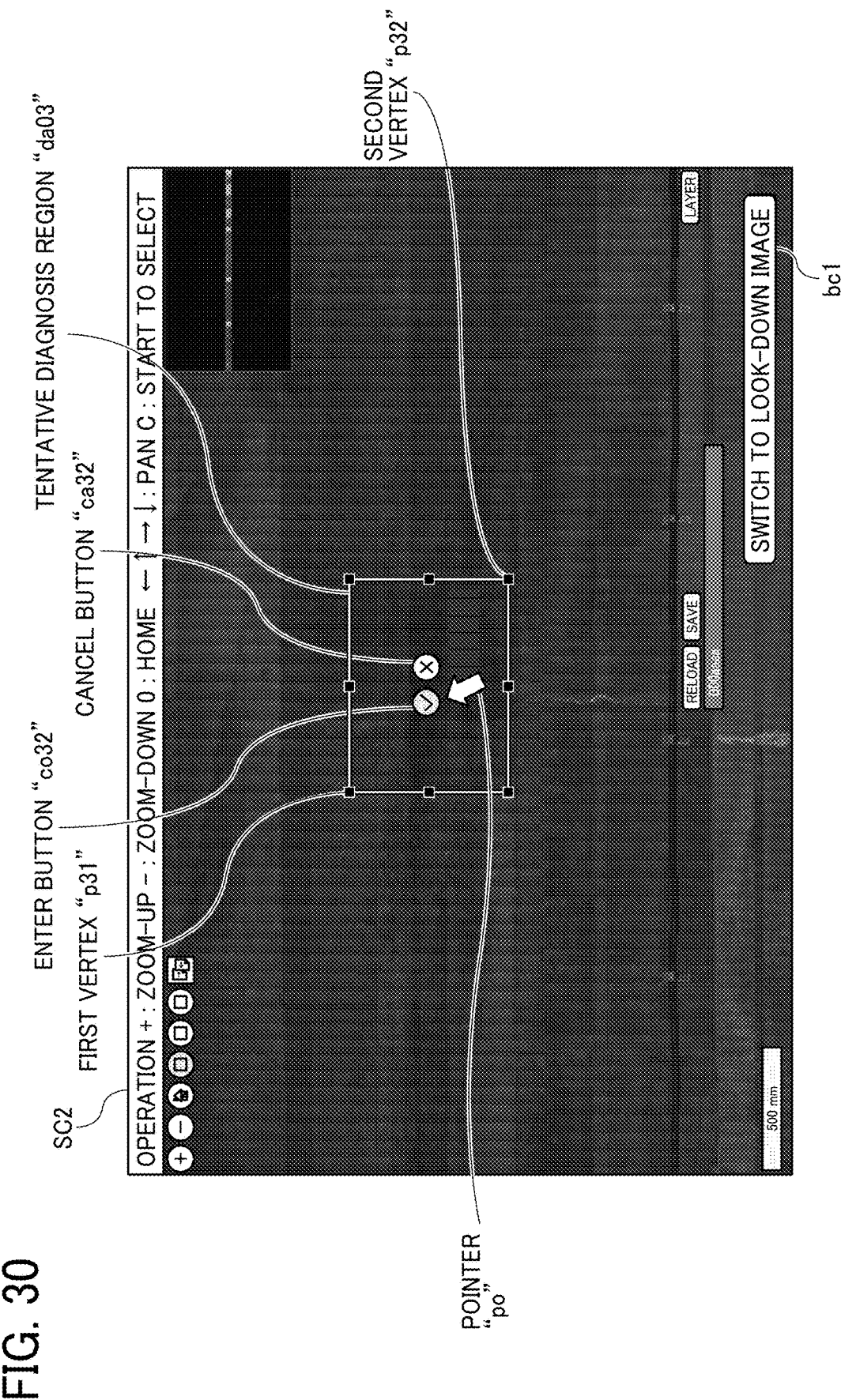
FIG. 30 is an example of another screen when inputting a diagnosis region on a diagnosis position input screen.

On the other hand, as illustrated in FIG. 30, if the user presses the enter button "co32" using the pointer "po," the reception unit 32 receives the pressing of the enter button "co32," and then the determination unit 35 determines that the pressing of the enter button "co32" is received by the reception unit 32 (step S305: YES).

Then, the determination unit 35 confirms or identifies the tentative diagnosis region "da03" (step S306).

Figure 31:
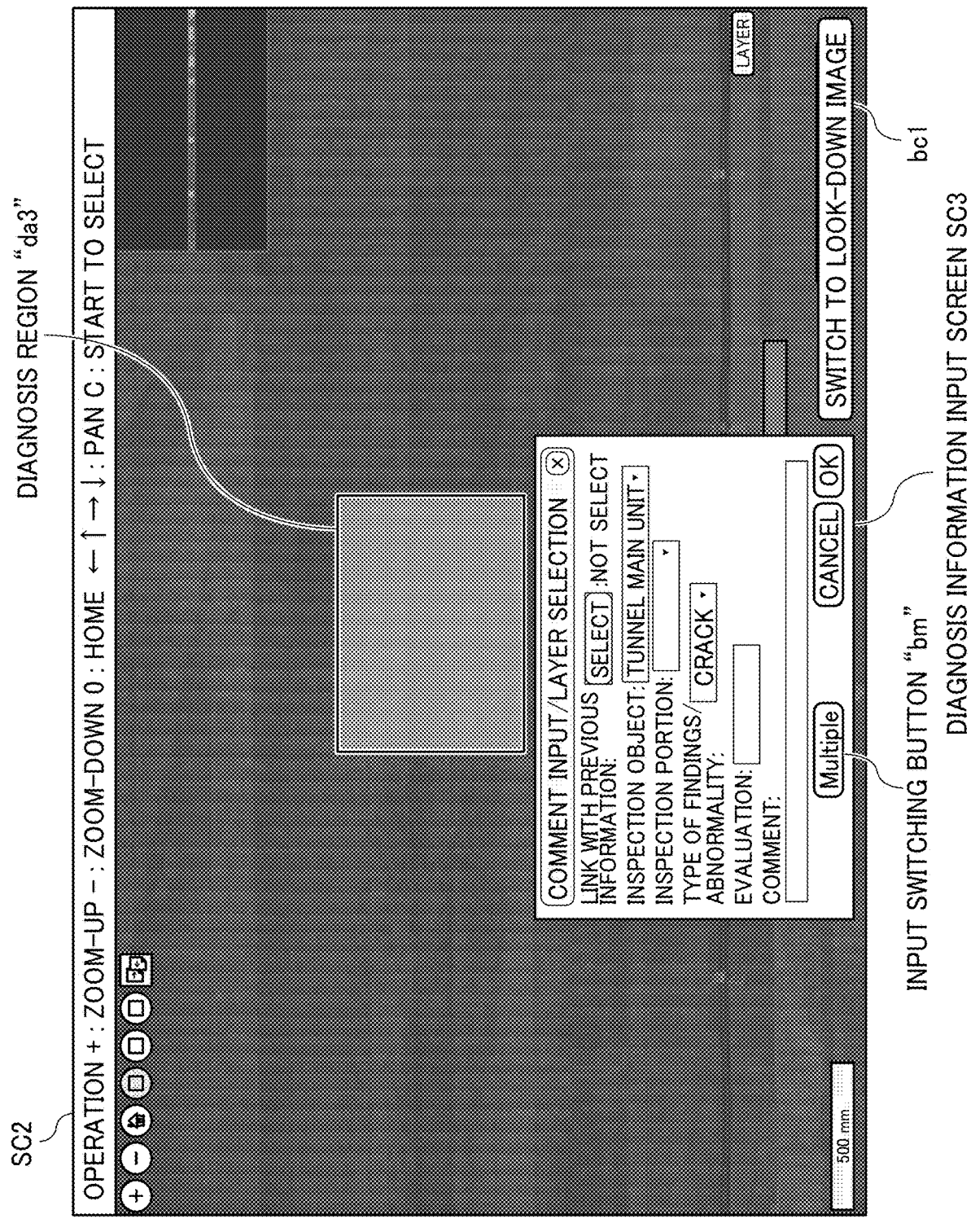
FIG. 31 is an example of another screen when inputting a diagnosis region on a diagnosis position input screen, displaying a diagnosis information input screen.

Further, as illustrated in FIG. 31, the display control unit 34 displays a diagnosis region "da3" having a rectangular shape, which is the same as the confirmed tentative diagnosis region "da03," and the diagnosis information input screen SC3 (step S307). In this case, in order to make the diagnosis information input screen SC3 conspicuous, the display control unit 34 can apply a masking on a portion other than the diagnosis information input screen SC3.

In this case, if the user selects and inputs the diagnosis information on the diagnosis information input screen SC3 and presses the "OK" button, the reception unit 32 receives the selection and input of the diagnosis information (step S308).

By performing the above described processing, the drawing of the diagnosis region "da3" and the selection and input of the diagnosis information are completed for the third input mode of the diagnosis region. Thereafter, as similar to the first input mode of the diagnosis target image (i.e., drawing of an area) and the second input node of the diagnosis target image (i.e., drawing of a line pattern), the user can draw the diagnosis target image in the diagnosis region "da3."

Figure 32A:
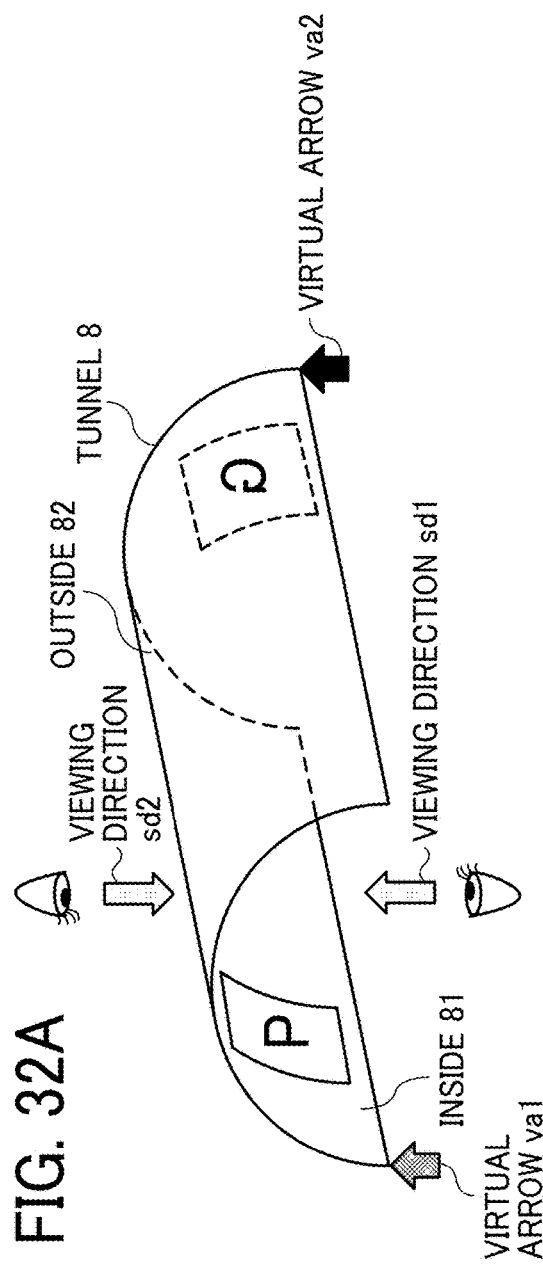
FIG. 32A illustrates a relationship between a tunnel and viewing directions.
Figure 32C:
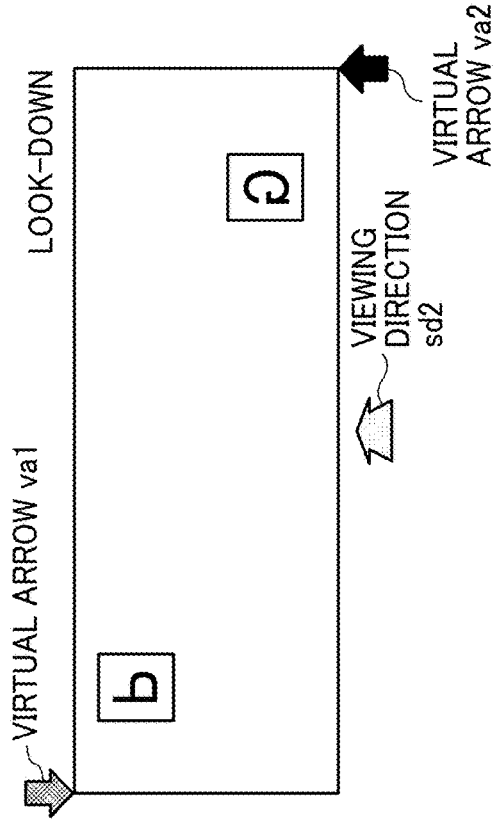
FIG. 32C illustrates a schematic diagram of a tunnel viewed from an upper direction of the tunnel.
Figure 32B:
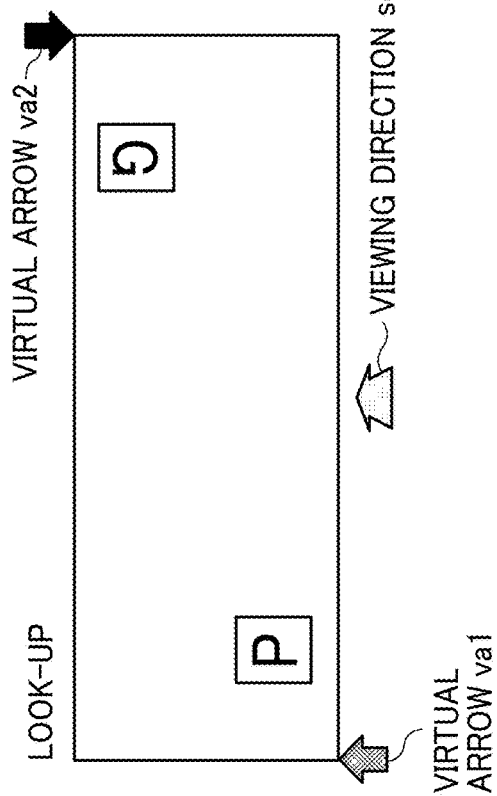
FIG. 32B illustrates a schematic diagram of a tunnel viewed from a lower direction of the tunnel.
Figure 33A:
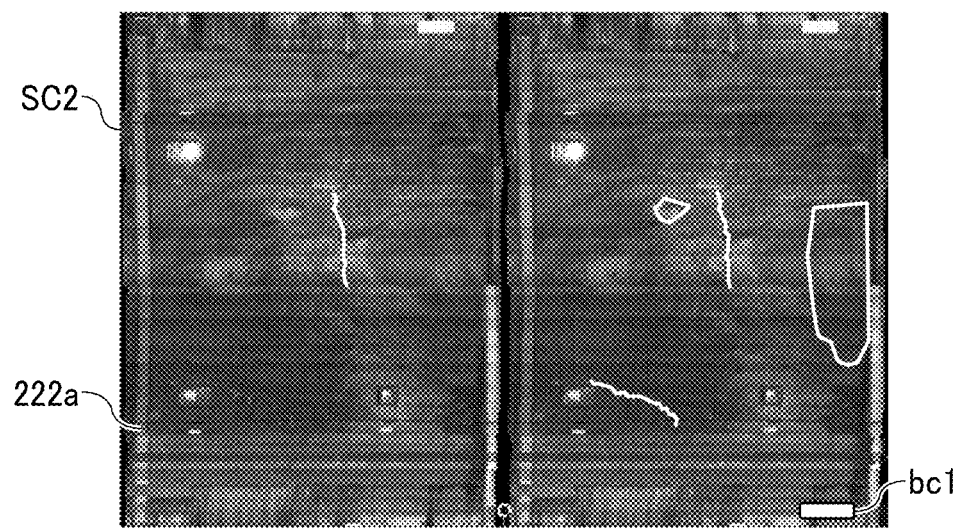
FIG. 33A illustrates an example of a diagnosis target image viewed from a lower direction of a tunnel.
Figure 33B:
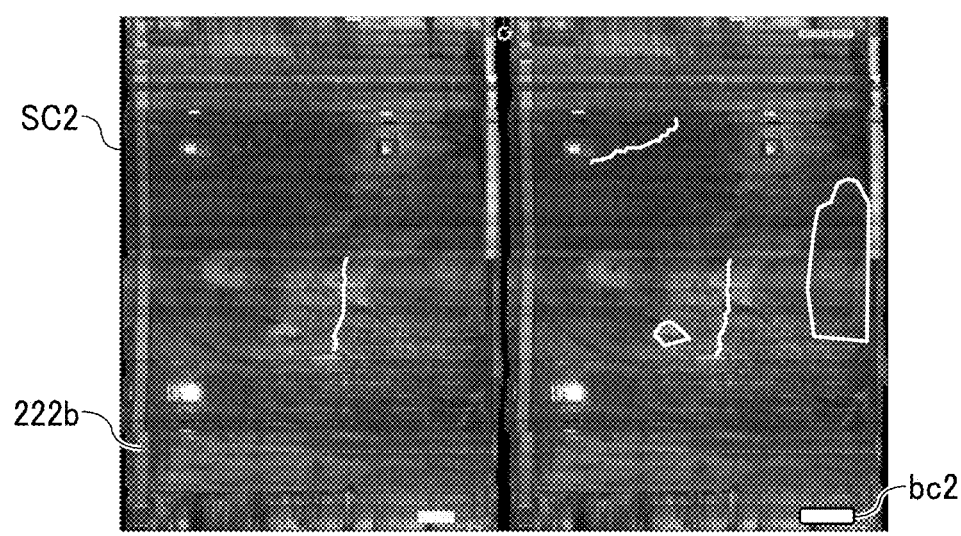
FIG. 33B illustrates an example of a diagnosis target image viewed from an upper direction of a tunnel.

Change of Viewing Direction:

Hereinafter, a description is given of process of shifting or changing of viewing directions of the development-view image 201 with reference to FIG. 32 (32A to 32C) and FIG. 33 (33A to 33B). FIG. 32A illustrates a relationship between the tunnel 8 and the viewing directions, FIG. 32B illustrates a schematic diagram of the tunnel 8 viewed from the lower direction of the tunnel 8, and FIG. 32C illustrates a schematic diagram of the tunnel 8 viewed from the upper direction of the tunnel 8. FIGS. 33A and 33B (FIG. 33) are examples of diagnosis target images obtained by switching the viewing directions, in which FIG. 33A is an example of the diagnosis target image viewed from the lower direction of the tunnel 8, and FIG. 33B is an example of the same diagnosis target image viewed from the upper direction of the tunnel 8.

As illustrated in FIG. 32, the development-view image 201 is an image that is acquired by looking up the wall and ceiling of the tunnel 8 from the inside of the tunnel 8. This image is referred to as a "look-up image." However, the observed inspection findings chart to be submitted to the government office might be required to be an image viewed from the outside of the tunnel 8 (i.e., above the tunnel 8) as illustrated in FIG. 7. This image is referred to as a "look-down image."

As illustrated in FIG. 32A, the tunnel 8 can be viewed from a look-up position of the tunnel 8 such as from an inside 81 of the tunnel 8, and from a look-down position of the tunnel 8 such as from an outside 82 of the tunnel 8, in which the look-up position views the tunnel 8 into a upward direction from the inside 81 of the tunnel 8 and the look-down position views the tunnel 8 into a downward direction from the outside 82 of the tunnel 8. Since the tunnel 8 is typically built in undergrounds, such as hills and mountains, the look-down position may be a virtual position in some cases.

As illustrated in FIG. 32A, when the inside 81 of the tunnel 8 is viewed along the viewing direction "sd1," the development-view image 201 becomes the "look-up image" as illustrated in FIG. 32B. In this case, the directions of virtual arrows "va1" and "va2" in FIG. 32A, respectively, become the upward direction at the bottom left, and the downward direction at the upper right in FIG. 32B.

Further, when the same portion is viewed from the outside 82 of the tunnel 8 along the viewing direction "sd2," the development-view image 201 becomes the "look-down image" as illustrated in FIG. 32C. In this case, the directions of virtual arrows "va1" and "va2" in FIG. 32A, respectively, become the downward direction at the upper left, and the upward direction at the bottom right in FIG. 32C. That is, the look-up image and the look-down image are the inverted images.

When the display control unit 34 switches or inverts the top and bottom of the development-view image 201 while displaying the development-view image 201 on the display 308, the display control unit 34 displays the diagnosis target element image by changing the y-coordinate of the development-view image 201 from "Y" to "−Y" for the two-dimensional coordinates (X, Y) of the diagnosis target element image stored in the storage unit 3000.

If the user presses a viewing direction switching button (switch to look-down button) "bc1" on the diagnosis position input screen SC2 indicated in FIG. 33A, the reception unit 32 receives the pressing of the viewing direction switching button "bc1," and then the display control unit 34 switches or converts the image view from a look-up image 222*a* (FIG. 33A) to a look-down image 222*b* (FIG. 33B). Further, when the user presses a viewing direction switching button (switch to look-up button) "bc2" on the diagnosis position input screen SC2 indicated in FIG. 33B, the reception unit 32 receives the pressing of the viewing direction switching button "bc2," and then the display control unit 34 switches or converts the image view from the look-down image 222*b* (FIG. 33B) to the look-up image 222*a* (FIG. 33A). With this configuration, the user can draw the diagnosis target element image and the diagnosis region using any one of the look-up image and the look-down image. In this case, the coordinates of positions of the diagnosis target element image and diagnosis region stored in the storage unit 3000 are not changed, but the display control unit 34 changes the display style alone.

Figure 35:
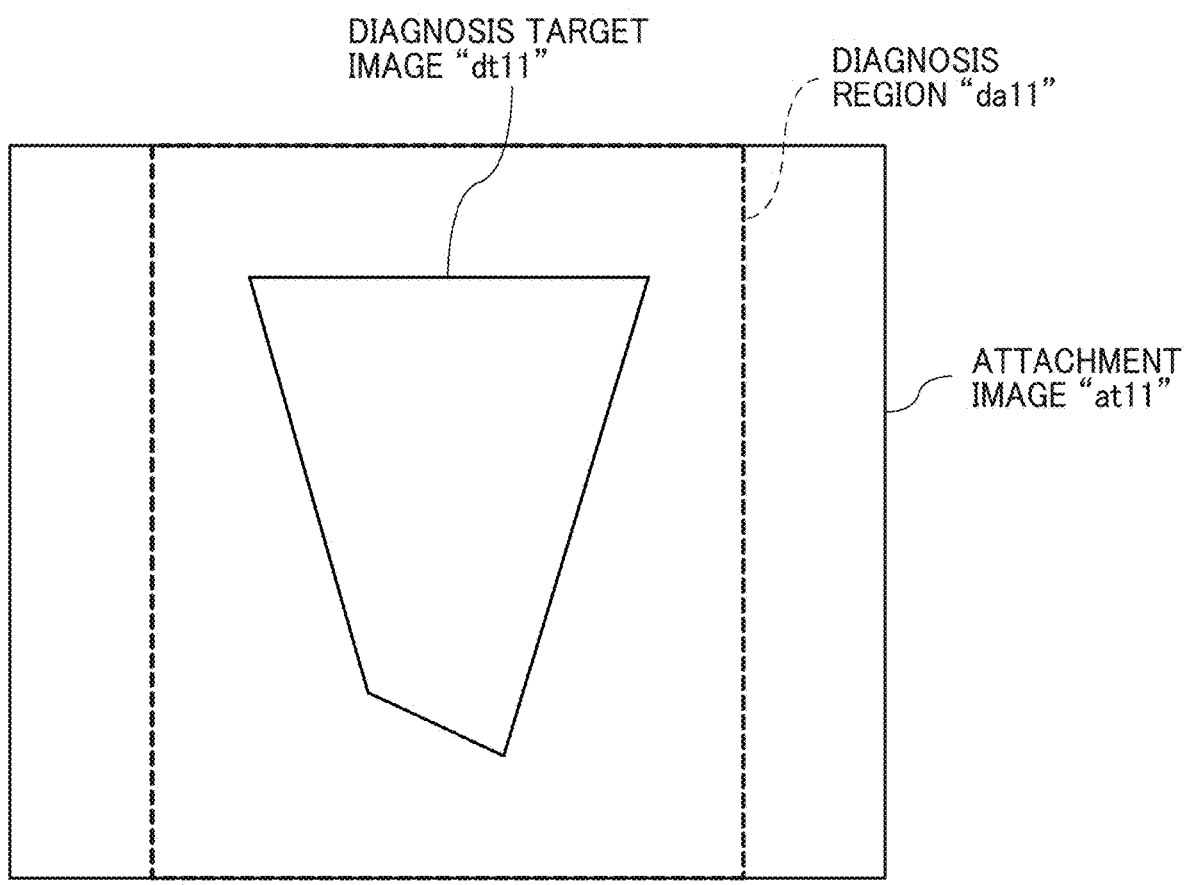
FIG. 35 is an example of a diagram illustrating a relationship between a diagnosis target image, a diagnosis region, and an attachment image.

Attaching Attachment Image to Photograph Ledger:

Hereinafter, a description is given of a process of attaching an attachment image to the photograph ledger, which is a part of the processing of data of the final inspection report illustrated in step S11 of FIG. 6, with reference to FIGS. 34 and 35. FIG. 34 is an example of a flowchart illustrating the steps of attaching an attachment image to the photograph ledger. FIG. 35 is an example of a diagram illustrating a relationship between the diagnosis target image, the diagnosis region, and the attachment image.

As illustrated in FIG. 34, the generation unit 53 identifies a specific diagnosis region in the development-view image 201 (i.e. captured tunnel surface image) based on data of positional coordinates of the specific diagnosis region and data of height and width of the specific diagnosis region read from the diagnosis information management DB 5001 (step S401).

Then, in accordance with an aspect ratio of the attachment image, the generation unit 53 creates an attachment image with a given size, defined by the aspect ratio of the attachment image, which can enclose the specific diagnosis region within the attachment image (step 402). For example, in a case of the diagnosis region "da11" including the diagnosis target image "dt11" illustrated in FIG. 19, the generation unit 53 generates or creates an attachment image "at1" so that two opposite sides of the diagnosis region "da11" corresponds to two opposite sides of the attachment image "at11" having a rectangular shape as illustrated in FIG. 35.

Then, the determination unit 55 determines whether the diagnosis region is located at a position in the upper half of the development-view image 201 (step S403).

If the determination unit 55 determines that the diagnosis region is located at the position of the upper half of the development-view image 201 (step S403: YES), the generation unit 53 inverts the top and bottom of the attachment image generated in step S402 (step S404). That is, the generation unit 53 converts the attachment image so that the top and bottom of the attachment image becomes the same as the top and bottom of the structural object that is viewed from a viewing direction of a person who views the structural object from the bottom of the structural object.

For example, as illustrated in FIG. 32, if an attachment image "P" is located at a position in the lower half of the development-view image 201, the attachment image "P" is attached to the photograph ledger without inverting the top and bottom of the attachment image "P." By contrast, if an attachment image "G" is located at a position in the upper half of the development-view image 201, the top and bottom of the attachment image "G" is required to be inverted because the diagnosis region is displayed in the development-view image 201 by inverting the top and bottom of the diagnosis region.

Then, the generation unit 53 attaches the attachment image at a given position in the development-view image 201 (step S405).

On the other hand, if the determination unit 55 determines in step S403 that the diagnosis region is not located at the position in the upper half of the development-view image 201 (step S403: NO) (i.e., the diagnosis region is located at the position in the lower half of the development-view image 201), the generation unit 53 performs the processing in step S405.

Then, the attachment of the attachment image to the photograph ledger is completed. With this configuration, an error that might occur when creating the photograph ledger including the diagnosis information of the structural object can be reduced compared to conventional method.

Processing in Comparison Mode:

Hereinafter, a description is given of the processing of the input mode when the comparison mode (second mode) is selected with reference to FIGS. 8, 36 to 45. Hereinafter, among the first input mode of the diagnosis target image (area) (FIG. 9), the second input mode of the diagnosis target image (line pattern) (FIG. 10) and the third input mode of the diagnosis region (FIG. 11), the comparison mode (second mode) is performed for the second input mode of the diagnosis target image (line pattern), but the comparison mode (second mode) can be also performed for the first input mode of the diagnosis target image (area) and the third input mode of the diagnosis region.

Figure 36:
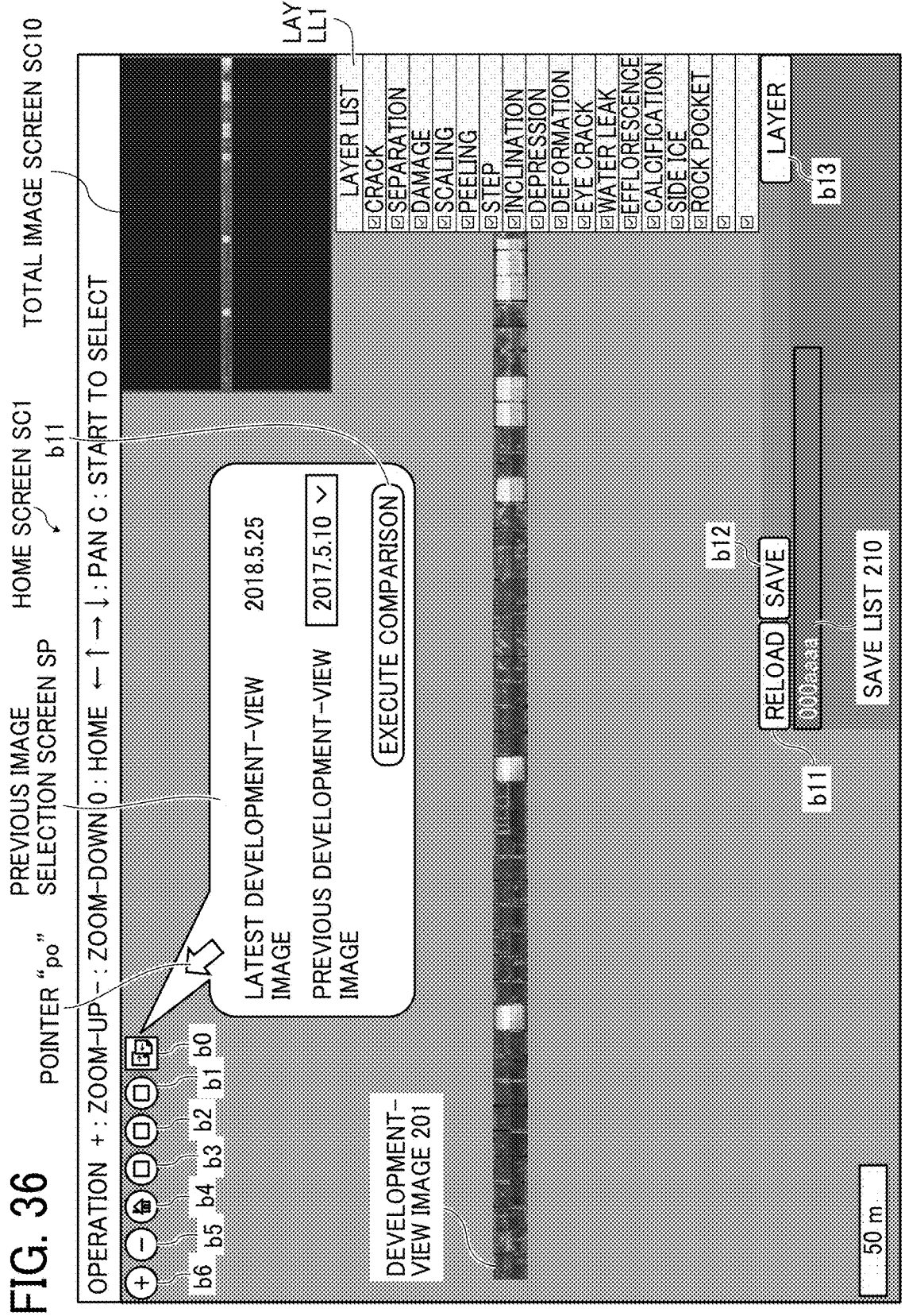
FIG. 36 is an example of a screen in which a previous image selection screen is displayed on a home screen.

In FIG. 8, if the user presses the mode switching button "b0" using the pointer "po" and enters the comparison mode (second mode) (step S23: YES), the display control unit 34 displays a previous image selection screen SP, for example, near the mode switching button "b0" as illustrated in FIG. 36 (step S28). The previous image selection screen SP displays information (e.g., inspection date) identifying the latest development-view image, information (e.g., inspection date) identifying the previous development-view image, and a comparison execution button "b11" indicated as "execute comparison" in FIG. 36. The latest development-view image is an image to which a diagnosis target image is to be input as the latest diagnosis target image. The previous development-view image is an image in which the diagnosis target image was input in previously or the past, and the previous development-view image stored previously or in the past can be selected from a pull-down menu. The comparison execution button "b11" is a button which is pressed by a user when comparing the latest development-view image and the selected previous development-view image.

Figure 37:
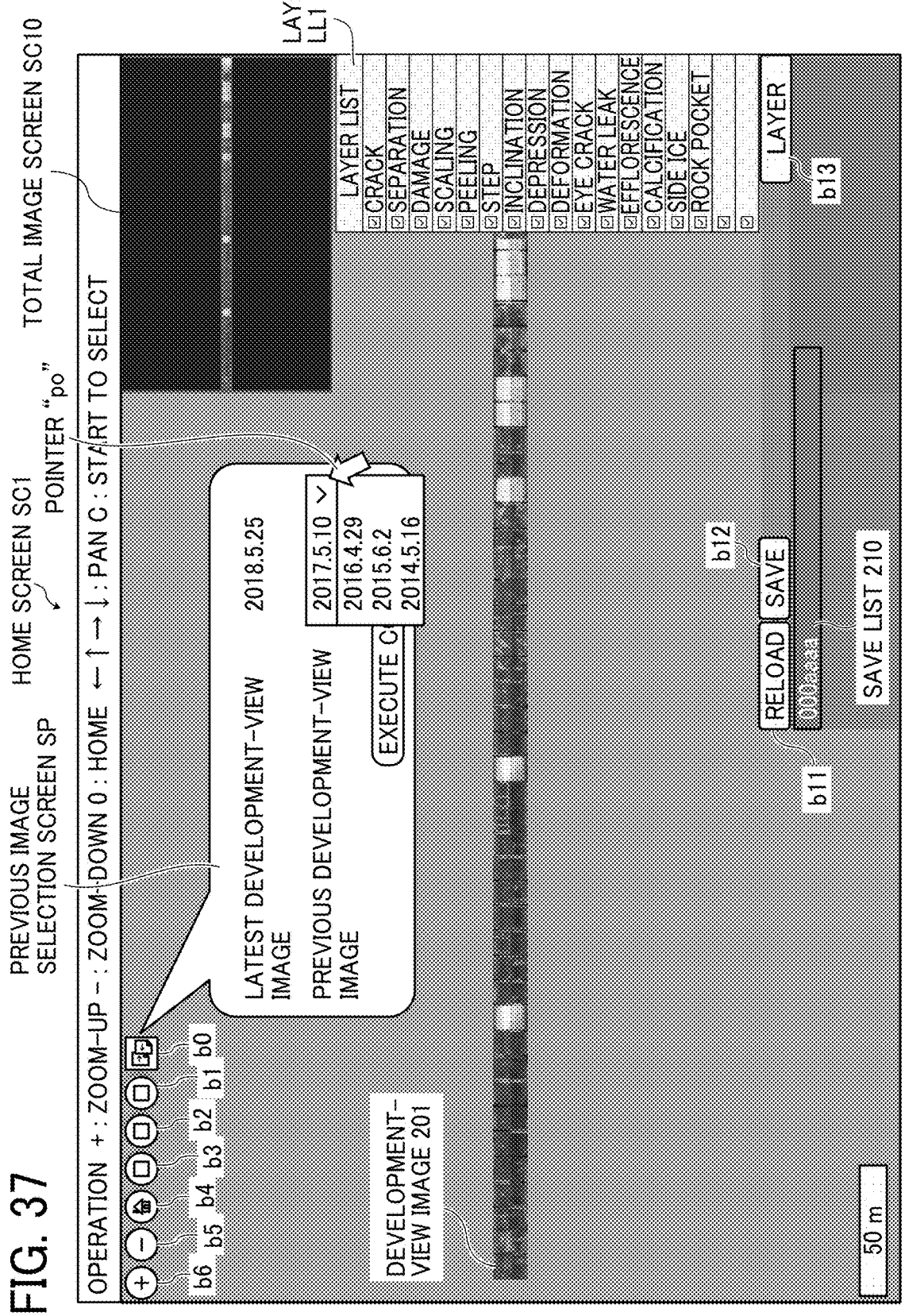
FIG. 37 is an example of a screen in which a pull-down menu for selecting a previous image is displayed on a home screen.

If the user opens the pull-down menu of the previous development-view image using the pointer "po," the display control unit 34 displays information (e.g., inspection date) specifying a plurality of previous images captured previously or in the past as shown in FIG. 37 (step S29).

Then, if the user selects the desired inspection date using the pointer "po," the reception unit 32 receives the selection of the previous development-view image to be compared with the latest development-view image (step S30).

Then, if the user presses the comparison execution button "b11" using the pointer "po," the storing/reading unit 39 reads out the previous development-view image selected in step S30, together with the diagnosis information (see FIG. 4) and the diagnosis target element (see FIG. 5) of the selected previous development-view image from the storage unit 3000 (step S31).

Figure 38:
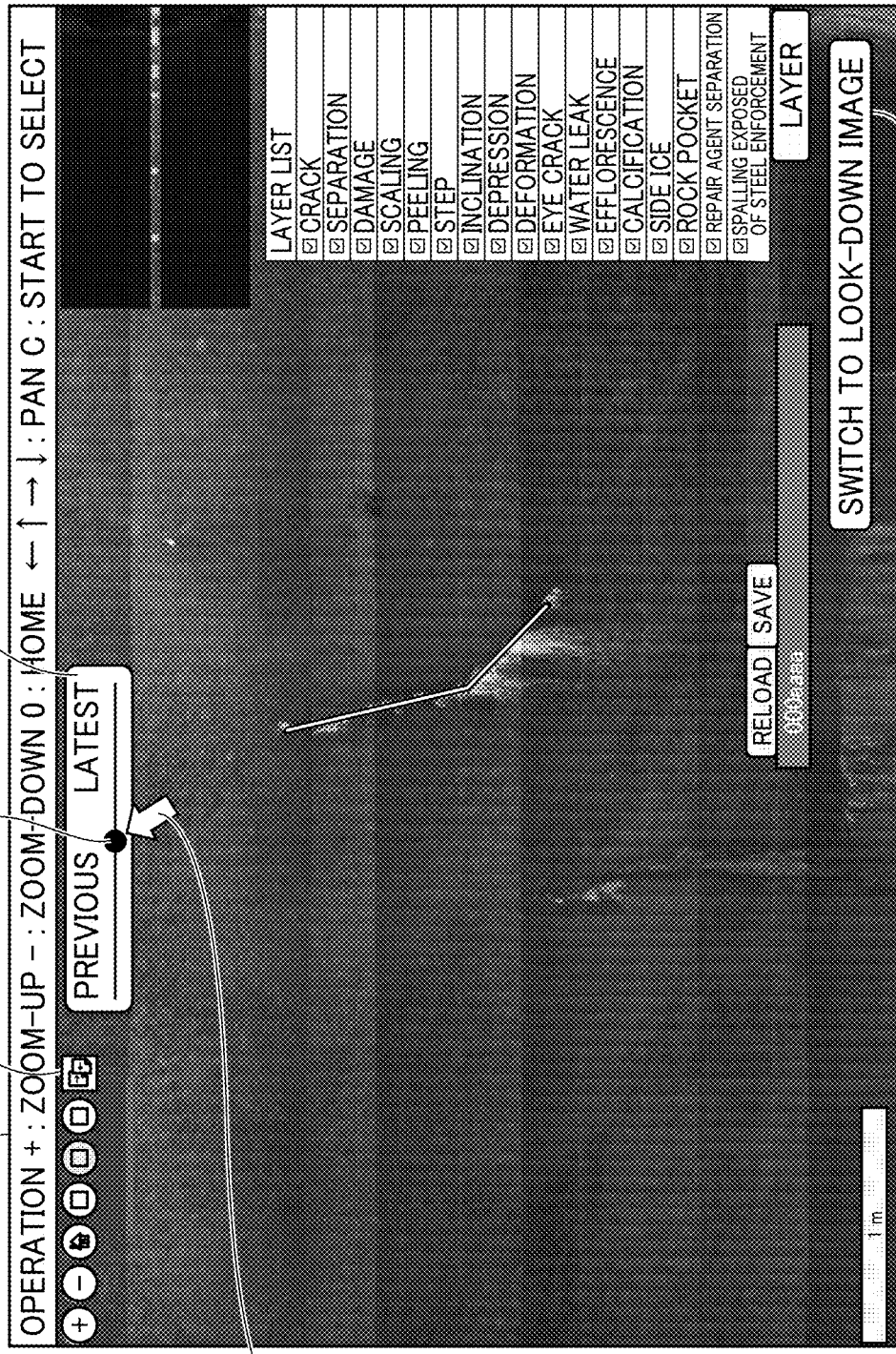
FIG. 38 is an example of a screen in which a transmittance rate setting region is displayed on a diagnosis position input screen when a comparison mode is selected.

Then, as indicated in FIG. 38 and FIG. 39, the display control unit 34 displays, on the diagnosis position input screen SC5, a diagnosis target image (diagnosis target) in the previous development-view image (first development-view image) and a diagnosis target image (diagnosis target) in the latest development-view image (second development-view image), by superimposing the diagnosis target image in the previous development-view image and the diagnosis target image in the latest development-view image, which are corresponded with each other (step S32).

Figures 39A, 39B, 39C, 39D:
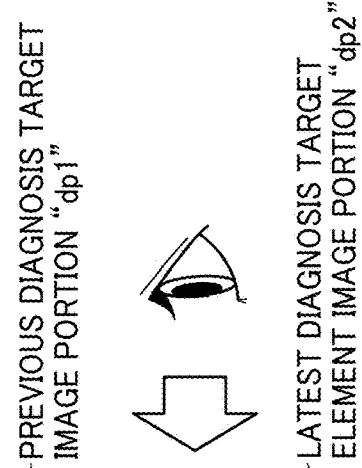
FIG. 39A is an example of a diagnosis target image in a previous development-view image.
FIG. 39B is an example of a schematic diagram of a diagnosis target image in a previous development-view image corresponding to FIG. 39A.
FIG. 39C is an example of a diagnosis target image in the latest development-view image.
FIG. 39D is an example of a schematic diagram of a diagnosis target image in the latest development-view image corresponding to FIG. 39C.

Hereinafter, a description is given of superimposing and displaying of images with reference to FIG. 39. FIG. 39 shows an example of the previous development-view image and the latest development-view image displayed in a hierarchical manner. FIG. 39A is an example of a diagnosis target image in the previous development-view image, FIG. 39B is an example of a schematic diagram of the diagnosis target image in the previous development-view image corresponding to FIG. 39A, FIG. 39C is an example of a diagnosis target image in the latest development-view image, and FIG. 39D is an example of a schematic diagram of the diagnosis target image in the latest development-view image corresponding to FIG. 39C.

At the time of initial displaying indicated in FIG. 38, as shown in FIG. 39, the lowest display layer is the previous development-view image of FIG. 39A, the middle display layer is the previous diagnosis target image in the same previous image, and the top display layer is the latest development-view image of FIG. 39C. At this time, the latest diagnosis target image of FIG. 39D is not yet drawn. When the latest diagnosis target image of FIG. 39D is drawn, the latest diagnosis target image of FIG. 39D is displayed as an image of the top display layer.

Further, as illustrated in FIG. 38, a transmittance rate setting region TR is displayed at the upper part of the diagnosis position input screen SC5. The transmittance rate setting region TR includes, for example, a transmittance setting pointer "tp" used for inversely changing a display transmittance (first display transmittance) of a set of the previous development-view image and the previous diagnosis target image in the same previous image, and a display transmittance (second display transmittance) of a set of the latest development-view image and the latest diagnosis target image (in case where the latest diagnosis target image is drawn).

Hereinafter, a description is given of the relationships between (1) the position of transmittance setting pointer, (2) the development-view image and diagnosis target image, and (3) the display transmittance with reference to FIG. 40. FIG. 40 indicates the relationships between the position of the transmittance setting pointer "tp," the development-view image and the diagnosis target image, and the display transmittance.

At first, as shown in FIG. 40A, when the transmittance setting pointer "tp" is moved to the most left-side end of a bar, the display transmittance (first display transmittance) of the set of the previous development-view image and the previous diagnosis target image in the same previous image becomes 0%, and the display transmittance (second display transmittance) of the latest development-view image becomes 100%. In this description, when the display transmittance becomes 100%, the display state substantially becomes a state that no image is displayed, which means the image set with the display transmittance of 100% is not displayed.

Then, as shown in FIG. 40B, when the transmittance setting pointer "tp" is moved to the center position between the most left-side end and the very center of the bar, the display transmittance of the set of the previous development-view image and the previous diagnosis target image in the same previous image becomes 25%, and the display transmittance of the latest development-view image becomes 75%. In this case, as shown in FIG. 40B, a crack that has not shown in the previous development-view images in FIG. 40A is displayed with a thin display density in the latest development-view image while the previous diagnosis target image captured previously or in the past is displayed with slightly thinner display density. Since the diagnosis target portion (e.g. crack) of the previous development-view image is displayed both in the previous development-view image and the latest development-view image, the diagnosis target portion (e.g. crack) of the previous development-view image is not displayed with thinner display density even if the display transmittance of the previous development-view image and the display transmittance of the latest development-view image are changed.

Then, as shown in FIG. 40C, when the transmittance setting pointer "tp" is moved to the very center of the bar (the initial display state), the display transmittance (first display transmittance) of the set of the previous development-view image and the previous diagnosis target image in the same previous image becomes 50%, and the display transmittance (second display transmittance) of the latest development-view image becomes 50%. In this case, in the latest development-view image, the diagnosis target portion (e.g. crack) that has not appeared in the previous development-view image in FIGS. 40A and 40B, can be displayed more clearly while the previous diagnosis target image captured previously or in the past is displayed with further thinner display density.

Then, as shown in FIG. 40D, when the transmittance setting pointer "tp" is moved to the center between the very center and the most right-side end of the bar, the display transmittance (first display transmittance) of the set of the previous development-view image and the previous diagnosis target image in the same previous image becomes 75%, and the display transmittance (second display transmittance) of the latest development-view image becomes 25%. In this case, in the latest development-view image, the diagnosis target portion (e.g. crack) that has not appeared in the previous development-view images in FIGS. 40A, 40B and 40C, can be displayed further clearly while the previous diagnosis target image captured previously or in the past is displayed with further thinner display density.

Then, as shown in FIG. 40E, when the transmittance setting pointer "tp" is moved to the most right-side end of the bar, the display transmittance (first display transmittance) of the set of the previous development-view image and the previous diagnosis target image in the same previous image becomes 100%, and the display transmittance (second display transmittance) of the latest development-view image becomes 0%. In an example case of FIG. 40, the display transmittance level is changed in five stages, but the display transmittance level can be changed in two or more stages.

As described above, the further the transmittance setting pointer "tp" is moved closer to the left-side end of the bar, the display transmittance (first display transmittance) of the set of the previous development-view image and the previous diagnosis target image (if drawn) becomes gradually lower, and the display transmittance (first display transmittance) becomes 0% at the most left-side end of the bar. In this case, the display transmittance (second display transmittance) of the set of the latest development-view image and the latest diagnosis image set (if drawn) is inversely and gradually becomes higher, and the display transmittance (second display transmittance) becomes 100% at the most left-side end of the bar.

On the other hand, the further the transmittance setting pointer "tp" is moved closer to the right-side end of the bar, the display transmittance (first display transmittance) of the set of the previous development-view images and the previous diagnosis target image becomes gradually higher, and the display transmittance (first display transmittance) becomes 100% at the most right-side end of the bar. In this case, the display transmittance (second display transmittance) of the set of the latest development-view image and the latest diagnosis image set (if drawn) is inversely and gradually becomes lower, and the display transmittance (second display transmittance) becomes 0% at the most right-side end of the bar. At the time of the initial display, the display transmittance (first display transmittance) of the previous development-view image and the previous diagnosis target image in the same previous image is set to 50%, and the display transmittance (second display transmittance) of the latest development-view image is also set to 50%. As above described, when the first display transmittance changes from 0 to 100%, the second display transmittance changes from 100% to 0%.

Figure 41:
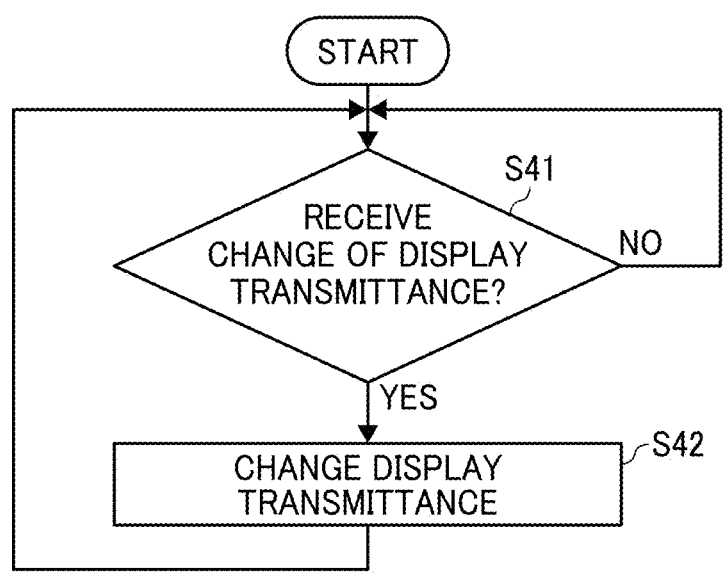
FIG. 41 is an example of a flow chart showing the steps of changing display transmittance of a diagnosis target image on a diagnosis position input screen.

Then, as indicated in FIG. 8, after performing step S32, the sequence proceeds to step S24. Hereinafter, a description is given of a process of changing the display transmittance in step S25 with reference to FIGS. 41 to 44. FIG. 41 is an example of a flowchart illustrating the steps of changing the display transmittance of a diagnosis target image on the diagnosis position input screen SC5.

As illustrated in FIG. 41, the reception unit 32 waits for receiving a change of the position of the transmittance setting pointer "tp" during the processing in step S25 (step S41: NO). If the reception unit 32 receives the change in the display transmittance caused by changing the position of the transmittance setting pointer "tp" (step S41: YES), the display control unit 34 changes the display transmittance as above described with reference to FIG. 40 (step S42). Then, the reception unit 32 waits until the reception unit 32 receives the next time for changing the position of the transmittance setting pointer "tp" (step S41: NO).

Figure 42:
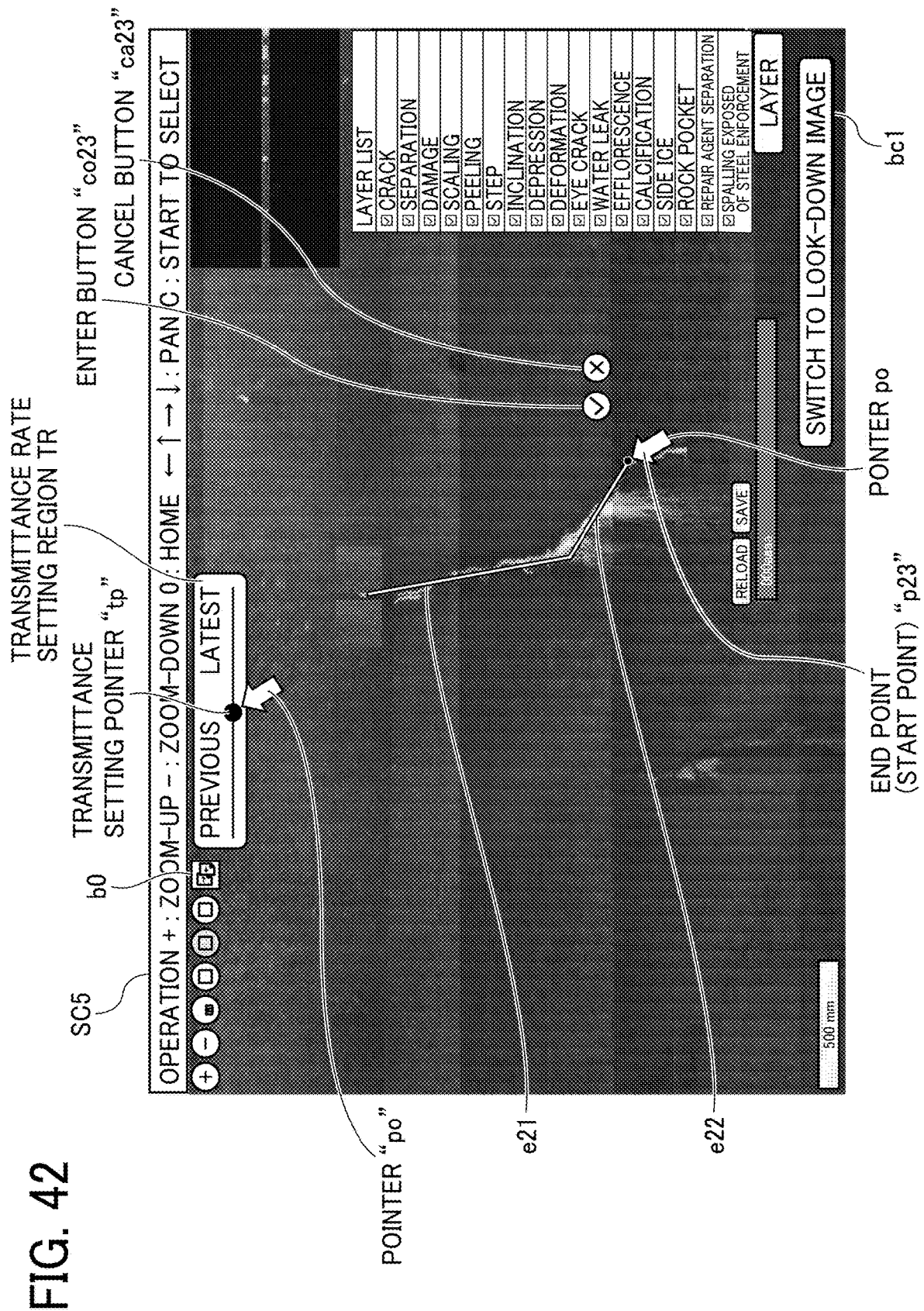
FIG. 42 is an example of a screen in which a diagnosis target image is input on a diagnosis position input screen when a comparison mode is selected.
Figure 43:
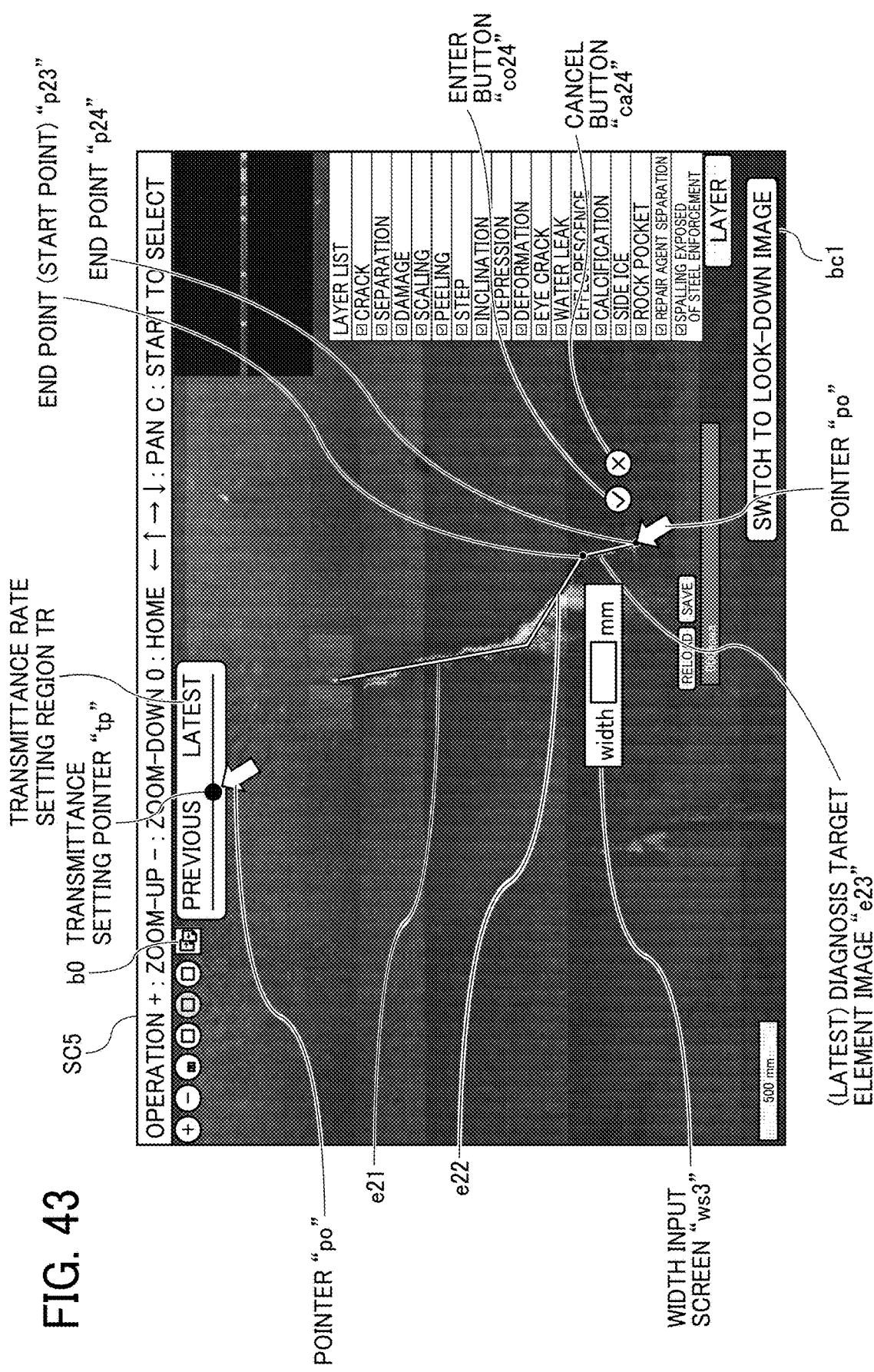
FIG. 43 is another example of a screen in which a diagnosis target image is input on a diagnosis position input screen when a comparison mode is selected.
Figure 44:
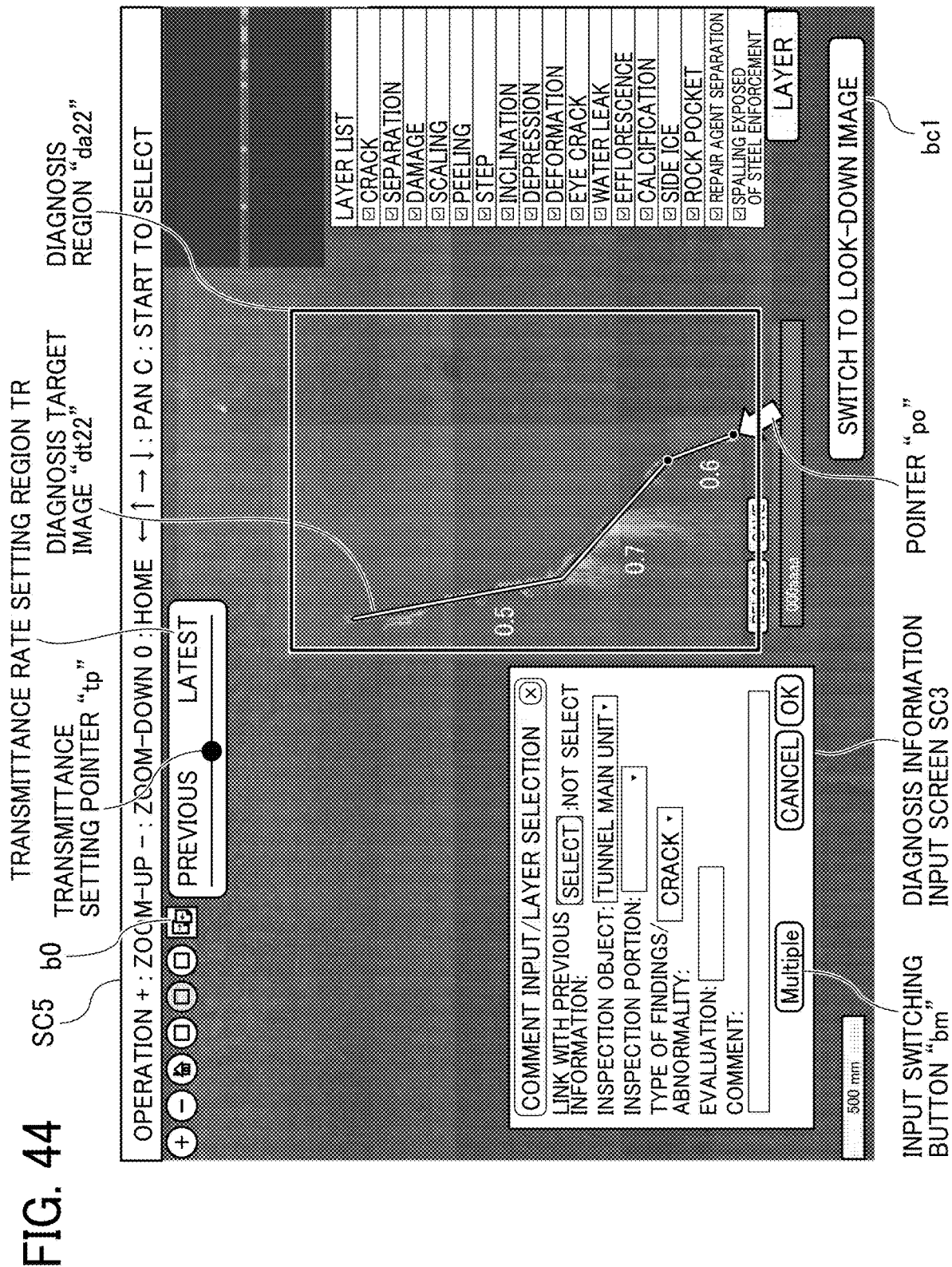
FIG. 44 is another example of a screen in which a diagnosis target image is input on a diagnosis position input screen when a comparison mode is selected.

Hereinafter, a description is given of a drawing process of a specific diagnosis target image with reference to FIGS. 42 to 44. FIGS. 42 to 44 show examples of screens used for inputting a diagnosis target image on the diagnosis position input screen that is set in the comparison mode (second mode). Specifically, FIG. 42 is an example case of the comparison mode with respect to the single mode (first mode) in FIG. 22, FIG. 43 is an example case of the comparison mode with respect to the single mode (first mode) in FIG. 23 or FIG. 24, and FIG. 44 is an example case of the comparison mode with respect to the single mode (first mode) in FIG. 26.

Hereinafter, it is assumed that the display transmittance of the previous development-view image and the display transmittance of the latest development-view image are respectively set to 50%, and if a user designates the end point "p23" of the diagnosis target element image "e22" in the previous development-view image as the new start point "p23" using the pointer "po" as shown in FIG. 42, the reception unit 32 receives an input of the start point "p23" of the latest diagnosis target element image "e23" on the latest development-view image (step S201 in FIG. 10).

Then, the display control unit 34 displays an enter button "co23" and a cancel button "ca23" near the start point "p23" (step S202 in FIG. 10).

Then, as shown in FIG. 43, if the user identifies an end point "p24" of the latest diagnosis target element image "e23" using the pointer "po," the reception unit 32 receives an input of the end point "p24" of the latest diagnosis target element image "e23" (step S203 in FIG. 10).

Then, the display control unit 34 displays the latest diagnosis target element image "e23" and a width input field "ws3" between the start point "p23" and the end point "p24" and displays an enter button "c24" and a cancel button "ca24" near the center of the latest diagnosis target element image "e23" (step S204 in FIG. 10). Then, the user can draw the latest diagnosis target element image "e23" by designating the new start point "p23" and the new end point "p24" based on the previous diagnosis target element images "e21" and "e22." In this case, the user can find new findings, such as crack or the like, in the latest development-view image in comparison with the previous development-view image by moving the transmittance setting pointer "tp" in the transmittance rate setting region TR to the left and right directions.

The width input field "ws3" can be displayed near the latest diagnosis target element image "e23" between the start point "p23" and the end point "p24." If the user enters a numerical value into the width input field "ws3," the reception unit 32 receives an input of the numerical value, and the display control unit 34 displays the input numerical value (e.g., 0.6) as shown in FIG. 44.

Then, the determination unit 35 determines whether the pressing of the enter button is received by the reception unit 32 (step S205 in FIG. 10). If the determination unit 35 determines that the pressing of the enter button is not received by the reception unit 32 (step S205: NO), the sequence returns to step S203.

Then, if the user presses the enter button "co24" using the pointer "po" in FIG. 43, the reception unit 32 receives the pressing of the enter button "co24," and then the determination unit 35 determines that the pressing of the enter button "co24" is received by the reception unit 32 (step S205: YES).

Then, the determination unit 35 confirms or identifies a diagnosis target image (i.e., drawing of a line pattern), and the display control unit 34 displays the confirmed diagnosis target image "dt22" (step S206 in FIG. 10) as shown in FIG. 44.

Further, the display control unit 34 displays a rectangular-shaped diagnosis region "da22" including the diagnosis target image "dt22" and the diagnosis information input screen SC3 (step S207 in FIG. 10) as shown in FIG. 44. In this case, in order to make the diagnosis information input screen SC3 conspicuous, the display control unit 34 can apply a masking on a portion other than the diagnosis information input screen SC3.

In this case, if the user selects and inputs the diagnosis information on the diagnosis information input screen SC3 and presses the "OK" button, the reception unit 32 receives the selection and input of the diagnosis information (step S208 in FIG. 10).

By performing the above described processing, the drawing of the diagnosis target image "dt22" and the diagnosis region "da22" and the selection and input of the diagnosis information are completed for the second input mode of the diagnosis target image (i.e., drawing of line pattern) in the comparison mode (second mode). As above described, the user can draw the diagnosis target image "dt22" consisted of the diagnosis target element images "e21, e22, and e23" by re-using the diagnosis target element images "e21 and "e22" as the previous image portion and drawing the diagnosis target element image "e23" alone as the new or latest image portion.

Further, if the user presses the mode switching button "b0" in step S23 and selects the comparison mode (second mode), that is, if the comparison mode (second mode) is set (step S26: YES) in the sequence of FIG. 8, the storing/reading unit 39 adds new information to the diagnosis information and the information of diagnosis target element image related to the previous development-view image selected in step S30 to temporarily store the new-information-added information in the storage unit 3000 as a separate file (step S33 in FIG. 8). For example, if the information of diagnosis target element image consisting the diagnosis target image shown in FIG. 39B corresponds to the positional coordinates indicated by the element numbers "1" and "2" of the diagnosis region number "1" (an example of first position information XY1) indicated in FIG. 5, the storing/reading unit 39 adds new information of the positional coordinates indicated by the element number "3" corresponding to the same diagnosis region number "1" (an example of second position information XY2 in FIG. 45) to the positional coordinates indicated by the element numbers "1" and "2" of the same diagnosis region number "1" as illustrated in FIG. 45 as the new or latest diagnosis target element image, which consists the diagnosis target image as shown in FIG. 39D, and stores the new-information-added information in the storage unit 3000 as a separate file. This completes the sequence of FIG. 8.

Further, as illustrated in FIG. 39D, the display control unit 34 displays the previous diagnosis target image portion "dp1" using the first position information XY1 (FIG. 45) and also displays the latest diagnosis target element image portion "dp2" using the second position information XY2 (FIG. 45).

As to the above described embodiment, by using the drawing apparatus 3, the user can draw the diagnosis target image indicating the diagnosis target on the image data (e.g., development-view image) of the structural object (e.g., tunnel), and can input the diagnosis information including the diagnosis result of the diagnosis target. As described above, since the user can directly draw the diagnosis target image indicating the diagnosis target identified on the development-view image, mistakes or errors that might occur during the document creation process can be reduced compared to the conventional methods of creating the final inspection report including the observed inspection findings chart or the like by comparing and checking a large number of documents and screens using hands and eyes of the user alone.

Further, by associating and storing the coordinates of positions of the diagnosis region and the diagnosis information of the diagnosis region using the drawing apparatus 3, the workload for creating the submission document including the diagnosis information of the structural object, such as the tunnel 8, can be reduced compared to conventional methods.

Further, since the photograph images attached to the photograph ledger use the images corresponding to the diagnosis regions on the development-view image 201, conventional manual work of pasting the observed-inspection findings photographs on the photograph ledger can be omitted, and thereby mistakes of pasting the observed-inspection findings photographs on the photograph ledger at a wrong position can be prevented.

Further, since the partial development-view image 202 can be switched between the look-up image 222a (FIG. 33A) and the look-down image 222b (FIG. 33B) as illustrated in FIG. 33, the drawing of diagnosis target image and the inputting of diagnosis information of diagnosis target image can be performed using the development-view image 201 according to the user's preference or familiarity of the look-up image 222a and the look-down image 222b, and thereby mistakes or errors that might occur during the document creation process can be reduced, in particular, prevented. Further, when submitting the final inspection report to the government office, the drawing apparatus 3 can output the look-down image, required by the government office in some countries, so that the user's error in the final inspection report, such as user's misunderstanding of the image direction, can be prevented.

Further, as illustrated in FIG. 7, since the development-view image 201 is the "look-up image" viewed from the inside of the tunnel and the attachment images attached to the photograph ledger register are required to be the "look-down image" viewed from the outside of the tunnel, report creating persons of the inspection contractor may be confused. Further, as described above, as indicated in FIG. 32, because some of the attachment images attached to the photograph ledger register are required to invert the top and bottom of the attachment images, the report creating persons of the inspection contractor may be further confused. By contrast, in the above described embodiment, since the diagnosis management server 5 can automatically prepare or create the submission document, mistakes or errors that might occur during the document creation process can be reduced, in particular, prevented.

Further, the user can draw the diagnosis target image "dt22" consisted of the diagnosis target element images "e21, e22, and e23" by re-using the diagnosis target element images "e21 and e22" as the previous diagnosis target element images and drawing the diagnosis target element image "e23" alone as the new diagnosis target element image. With this configuration, compared to conventional methods of drawing all of the diagnosis target element images in the development-view image captured for the structural object as the inspection findings, the drawing of the inspection findings can be performed with less workloads in the above described embodiment.

According to the above described example embodiment, compared to conventional methods of drawing all of the diagnosis target element images for the inspection findings in the development-view image captured for the structural object, the drawing of the diagnosis target element images for the inspection findings can be performed with less workloads.

In the above described embodiment, the structural object is exemplified as the tunnel, but not limited thereto. For example, the structural object includes piping or tubes used for transporting materials, such as gas, liquid, powder, and granular substance. Further, the structural object can be a vertical hole-shaped reinforced concrete structure, such as a hoistway used as an elevator shaft in which a lift or an elevator travels.

In the above described embodiment, the size of the diagnosis region "da11" is set greater than the size of the diagnosis target image "dt11" but not limited thereto. For example, the size of the diagnosis region "da11" can be set same as the size of the diagnosis target image "dt11."

Further, instead of the diagnosis management server 5, the drawing apparatus 3 can be used to create the submission document. In this case, the drawing apparatus 3 can create the submission document (e.g., observed inspection findings chart, photograph ledger, tunnel inspection result summary table), illustrated in FIG. 7, using the data input in step S1 (data transmitted in step S2) and the data received in step S6.

Further, in the above described embodiment, the reception unit 32 receives the drawing of the diagnosis target and the inputting of diagnosis information of the diagnosis target from the user, but not limited thereto. For example, artificial intelligence (AI) program installed on the drawing apparatus 3 or the diagnosis management server 5 can search the diagnosis target region on the development-view image 201, automatically select the diagnosis target, and automatically measure the width of the diagnosis target. Further, the selection of the diagnosis target can be also performed by a selection unit implemented by the artificial intelligence program. Further, the width measurement of the diagnosis target can be performed by a measurement unit implemented by the artificial intelligence program.

In the above described embodiment, the development-view image of the structural object is described, but not limited thereto. For example, in case of planar structural objects, such as walls and fences, the whole image showing the entire structural object can be used instead of the development-view image.

Any one of the above-described operations may be performed in various other ways, for example, in an order different from the one described above.

Numerous additional modifications and variations are possible in light of the above teachings. It is therefore to be understood that, within the scope of the appended claims, the disclosure of this patent specification can be practiced otherwise than as specifically described herein.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An apparatus for drawing an image on a development-view image of a structural object, comprising:
    circuitry configured to
        display a first development-view image of the structural object captured at a first time, a user-drawn first diagnosis target element image drawn to indicate at least a part of a first diagnosis target at a first position within the first development-view image of the structural object, and a second development-view image of the structural object captured at a second time that is later than the first time, the first development-view image and the second development-view image being superimposed on one another;
        receive a user-drawn second diagnosis target element image to indicate at least a part of a second diagnosis target at a second position within the second development-view image of the structural object captured at the second time, the first diagnosis target being a same diagnosis target as the second diagnosis target; and
        store, in a memory, first position information indicating the first position of the first diagnosis target element image within the first development-view image in association with second position information indicating the second position of the second diagnosis target element image within the second development-view image.

2. The apparatus according to claim 1, wherein the circuitry is further configured to
    receive an instruction of change in display transmittance for displaying the second development-view image, and
    change the display transmittance for displaying the second development-view image, in accordance with the received change instruction in display transmittance.

3. The apparatus according to claim 2,
    wherein the circuitry is further configured to receive an instruction of change in a first display transmittance for displaying the first development-view image and the first diagnosis target element image and change in a second display transmittance for displaying the second development-view image, for inversely and proportionally changing the first display transmittance and the second display transmittance,
    wherein the circuitry is further configured to change the first display transmittance for displaying the first development-view image and the first diagnosis target element image and the second display transmittance for displaying the second development-view image, in response to receiving the change instruction of the first display transmittance and the second display transmittance.

4. The apparatus according to claim 1,
    wherein the circuitry is further configured to receive a selection of one of (1) a first mode for displaying the second development-view image, and (2) a second mode for displaying the first development-view image, the first diagnosis target element image, and the second development-view image being superimposed on one another,
    wherein, in response to receiving selection of the second mode, the circuitry is further configured to display the first development-view image, the first diagnosis target element image, and the second development-view image superimposed on one another.

5. The apparatus according to claim 1, wherein the circuitry is further configured to
    display a diagnosis information input screen for receiving an input of diagnosis information including a diagnosis result of the first diagnosis target identified by the first diagnosis target element image and the second diagnosis target identified by the second diagnosis target element image,
    receive an input of the diagnosis information via the diagnosis information input screen, and
    store, in the memory, third position information indicating a position of a diagnosis region including a diagnosis target image indicating the second diagnosis target in the second development-view image in association with the received diagnosis information.

6. The apparatus according to claim 1, wherein the first position information indicates coordinates of a start point and coordinates of an end point of the first diagnosis target element image, and the second position information indicates coordinates of a start point and coordinates of an end point of the second diagnosis target element image.

7. The apparatus according to claim 1, wherein the structural object is a tunnel.

8. The apparatus of claim 1, wherein the first diagnosis target element image is drawn by a first user at the first position on the first development-view image,
    the second diagnosis target element image is drawn by a second user at the second position on the second development-view image when the first diagnosis target element image is being displayed, and
    the circuitry is further configured to store the first position in association with the second position after the second diagnosis target image is drawn by the second user.

9. The diagnosis system comprising:
the apparatus according to claim 1; and
a diagnosis management server that associates the first position information and the second position information.

10. A method of assisting of drawing an image on a development-view image of a structural object, the method comprising;
displaying a first development-view image of the structural object captured at a first time, a user-drawn first diagnosis target element image drawn to indicate at least a part of a first diagnosis target at a first position within the first development-view image of the structural object, and a second development-view image of the structural object captured at a second time that is later than the first time, the first development-view image and the second development-view image being superimposed on one another;
receiving a user-drawn second diagnosis target element image to indicate at least a part of a second diagnosis target at a second position within the second development-view image of the structural object captured at the second time, the first diagnosis target being a same diagnosis target as the second diagnosis target; and
storing, in a memory, first position information indicating the first position of the first diagnosis target element image within the first development-view image in association with second position information indicating the second position of the second diagnosis target element image within the second development-view image.

11. A non-transitory computer readable storage medium storing one or more instructions that, when performed by one or more processors, cause the one or more processors to execute a method of assisting of drawing an image on a development-view image of a structural object, the method comprising:
displaying a first development-view image of the structural object captured at a first time, a user-drawn first diagnosis target element image drawn to indicate at least a part of a first diagnosis target at a first position within the first development-view image of the structural object, and a second development-view image of the structural object captured at a second time that is later than the first time, the first development-view image and the second development-view image being superimposed on one another;
receiving a user-drawn second diagnosis target element image to indicate at least a part of a second diagnosis target at a second position within the second development-view image of the structural object captured at the second time, the first diagnosis target being a same diagnosis target as the second diagnosis target; and
storing, in a memory, first position information indicating the first position of the first diagnosis target element image within the first development-view image in association with second position information indicating the second position of the second diagnosis target element image within the second development-view image.

\* \* \* \* \*